United States Patent [19]

Weber

[11] 4,247,895

[45] Jan. 27, 1981

[54] DUAL MODE ARITHMETIC TEACHING APPARATUS

[76] Inventor: Randy C. Weber, 13012 St. Thomas Dr., Santa Ana, Calif. 92705

[21] Appl. No.: 18,924

[22] Filed: Mar. 9, 1979

[51] Int. Cl.³ .............................................. G09B 7/02
[52] U.S. Cl. .................................... 364/419; 434/191; 434/327
[58] Field of Search .................... 364/419, 200, 900; 35/31 C

[56] References Cited

U.S. PATENT DOCUMENTS

| | | | |
|---|---|---|---|
| 3,121,959 | 2/1964 | Vttal | 35/9 R |
| 3,584,398 | 9/1969 | Meyer et al. | 35/31 C |
| 4,089,124 | 5/1978 | Burtis et al. | 35/31 C |
| 4,114,294 | 9/1978 | Marmer | 35/31 C |

*Primary Examiner*—David H. Malzahn
*Attorney, Agent, or Firm*—Fischer and Tachner

[57] ABSTRACT

A calculator-type educational device for teaching arithmetic which provides features to motivate a student to greater learning progress including means for reporting the student's arithmetic proficiency by means of post-test statistics that are displayed after completion of a problem set. A dual mode of operation is provided, namely, a first mode in which a selected number of problems is presented for a student to solve at his own pace without any specified time limit and a second mode in which the student is presented problems in a specified period of time, the number of problems being determined solely by how rapidly the student can offer a proposed solution to each such problem.

An additional unique feature of the present invention is the availability of numerical limits and factor multiples to which the problem parameters are related.

The disclosed embodiment incorporates a microprocessor-based programmed computer in a desk-type calculator configuration.

9 Claims, 22 Drawing Figures

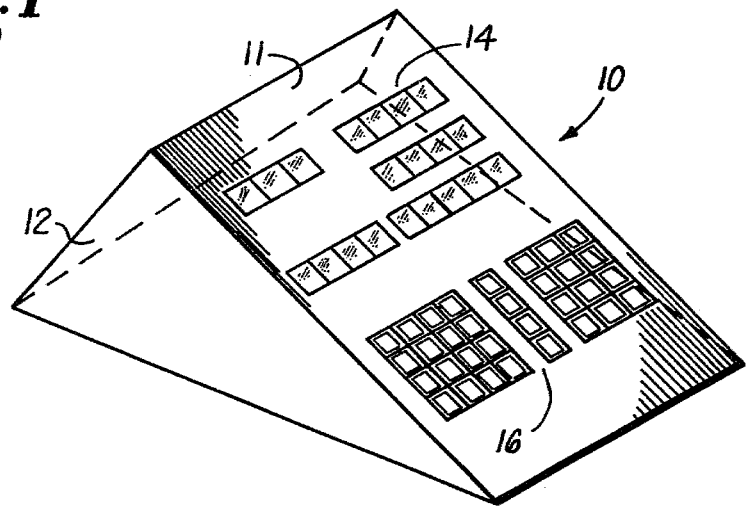
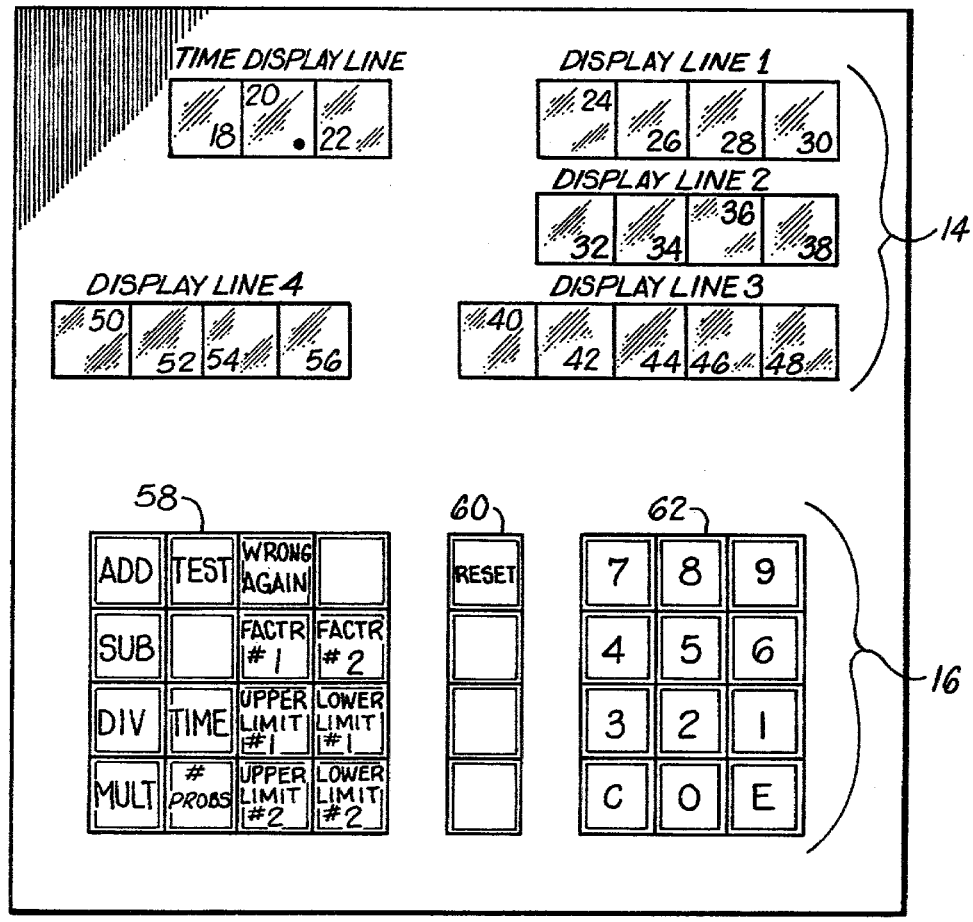

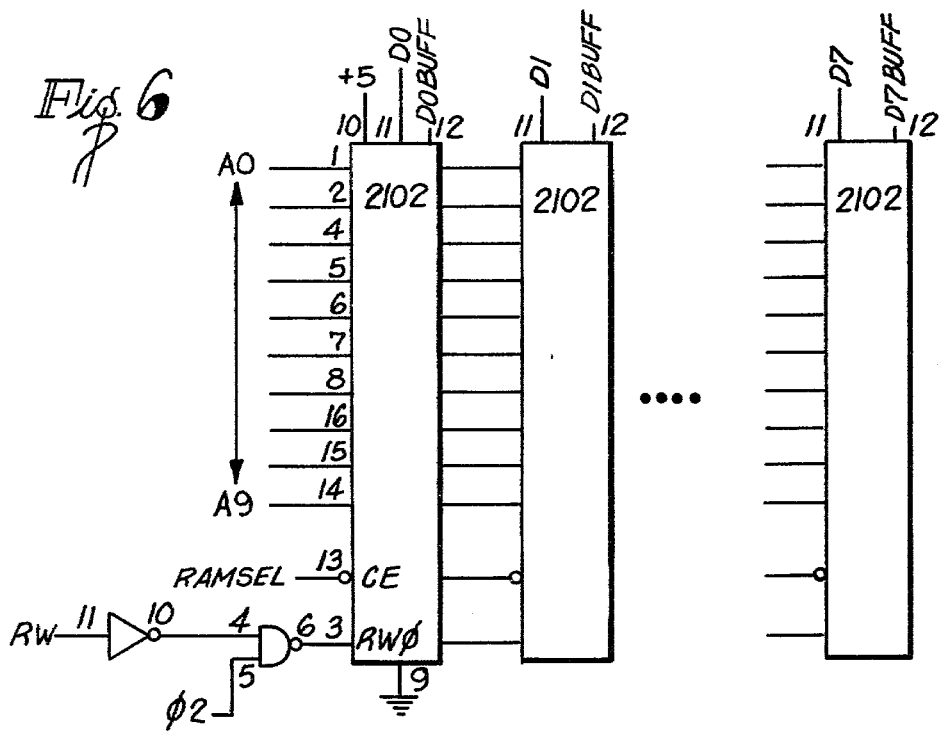
Fig. 6
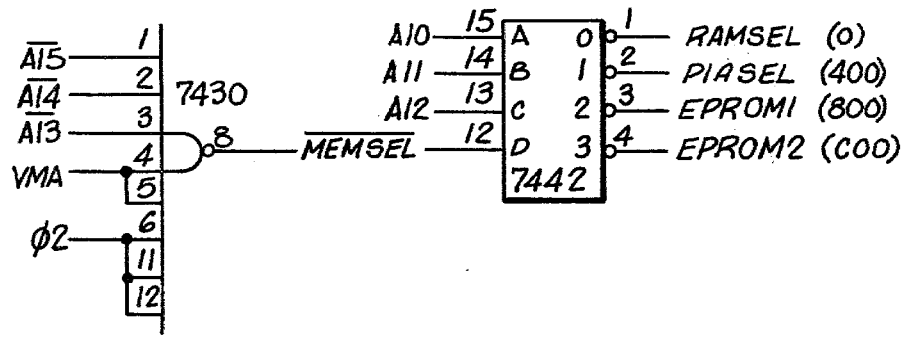
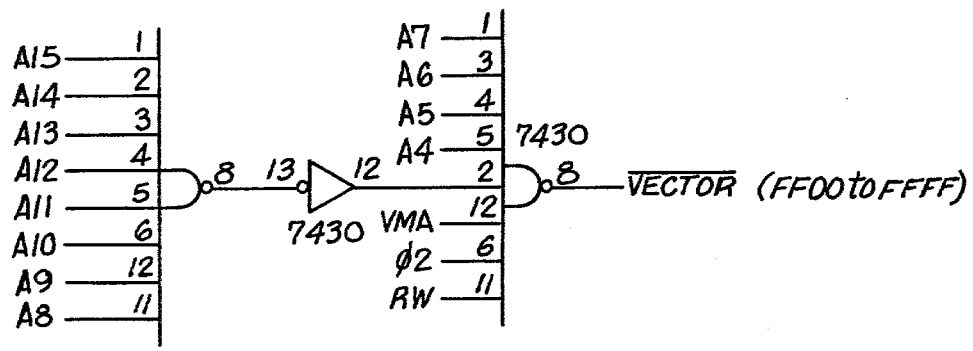
Fig. 7

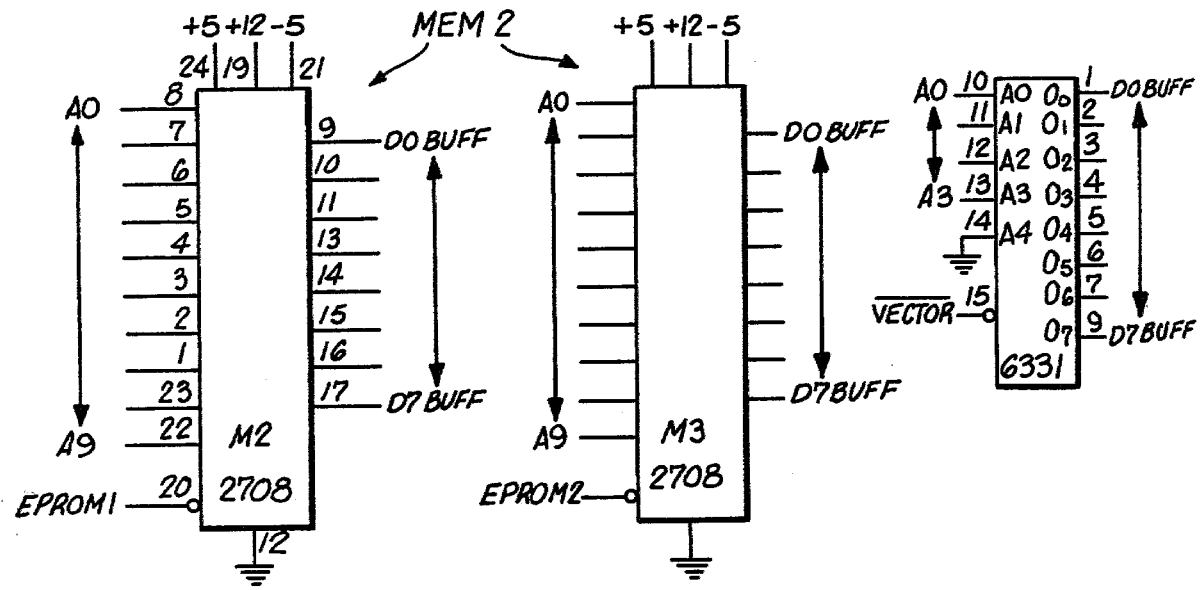
Fig. 8
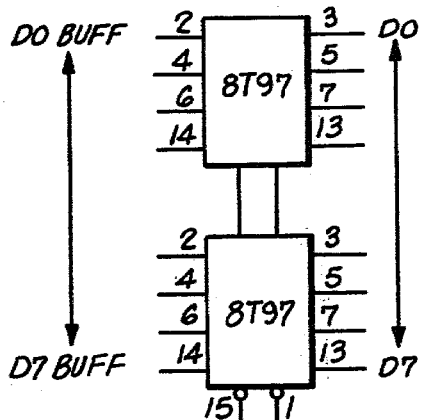
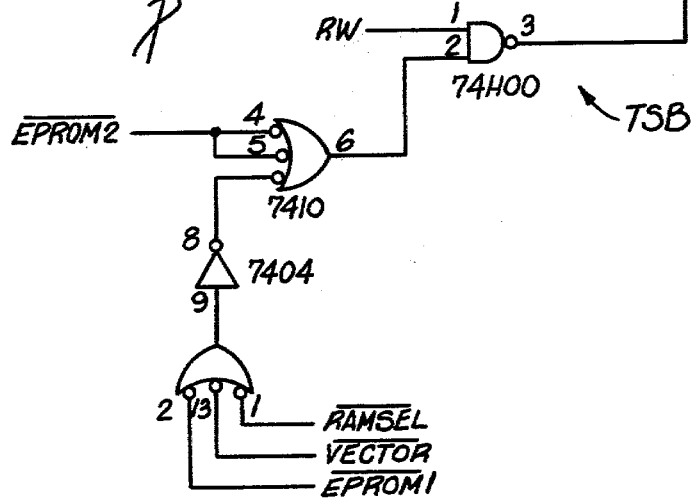
Fig. 9

TIME KEEPING SUBROUTINE

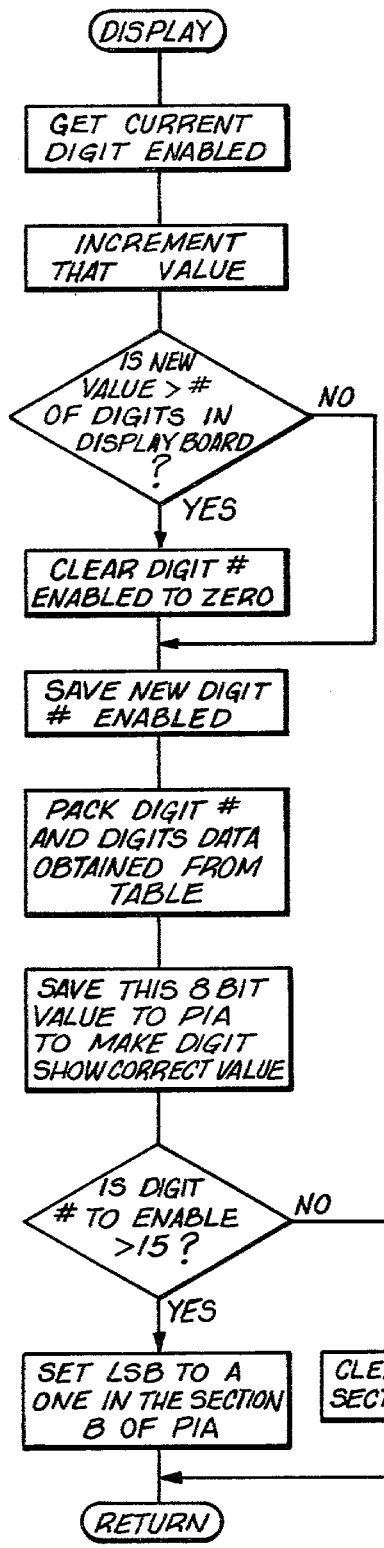
Fig. 17 MULTIPLEX DISPLAY SUBROUTINE
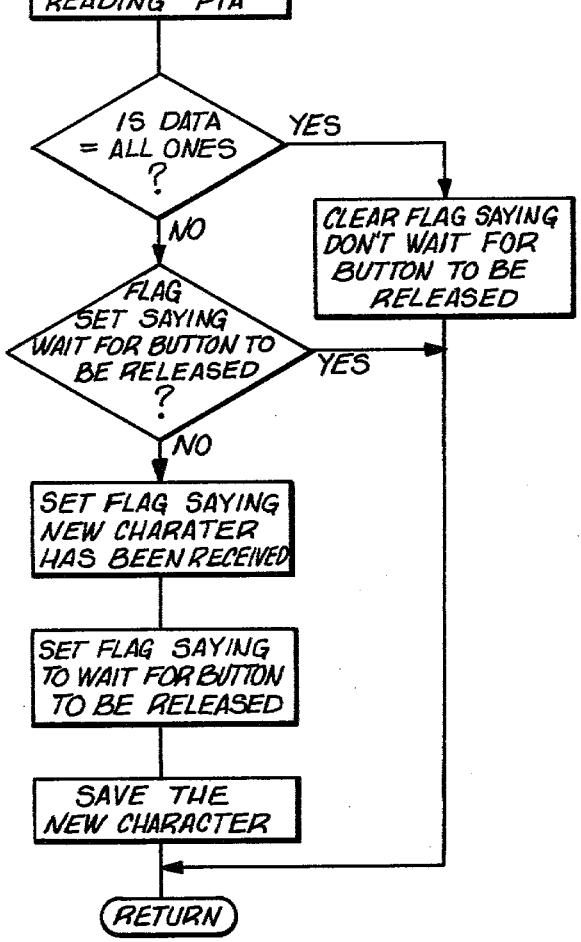
Fig. 18 SCAN KEYBOARD SUBROUTINE

DUAL MODE ARITHMETIC TEACHING APPARATUS

BACKGROUND OF THE INVENTION

1. Field of the Invention

The invention relates generally to calculator-type educational devices which electronically present a problem to a student who then selects a solution by depressing the appropriate keys on a keyboard. More specifically, the present invention relates to an arithmetic teaching device which provides certain improvements over prior art teaching devices to motivate the student to greater learning progress by keeping him informed of his arithmetic proficiency in solving arithmetic problems within teacher-defined limits.

2. Description of the Prior Art

There are numerous educational electronics devices for teaching arithmetic in which a problem to be solved by a user is generated and displayed without the answer. Typically, the user solves the problem mentally or with pencil and paper and inserts the proposed answer by depressing appropriate keys on a keyboard. The teaching device then compares the proposed answer entered by the student with the correct answer derived electronically by the teaching device and indicates whether the entered answer was correct or incorrect. By way of example, one such prior art teaching device is disclosed in U.S. Pat. No. 4,040,048 to Lien. Other calculator arithmetic teaching devices are disclosed in U.S. Pat. No. 4,051,605 to Toal et al and in U.S. Pat. No. 3,787,988 to Nakajima et al.

Although such prior art teaching machines may produce an initial sense of excitement and learning motivation due to the unique interaction with an electronic device, the child has no statistical basis upon which to perceive his own learning progress. As a result, the child is likely to eventually find that even learning arithmetic on an electronic calculator device can become dull and unrewarding, especially without the constructive feedback that a student is given by a human teacher to indicate that the student is making progress and to motivate him on to further learning.

Furthermore, prior art electronic teaching machines typically provide only one mode of problem solving, thereby further increasing the liklihood of quickly losing the student's interest and attention and further reducing a student's motivation to become competent in basic arithmetic skills. By way of example, it is well known in the education field that after a student has had ample opportunity to practice solving a set of arithmetical problems utilizing certain number sets to gain a minimum level of confidence, it is then highly advantageous to have the student practice his skills using a flashcard approach so that computation within the prescribed number limits becomes almost mechanical in nature.

SUMMARY OF THE INVENTION

The present invention overcomes the aforementioned disadvantages of the prior art by providing an electronic apparatus for teaching arithmetic, but with novel improvements comprising: dual mode of operation which reduces the liklihood of loss of interest by the student; operation of the apparatus within teacher or student prescribed mathematical limits utilizing selected number factors to further define the problem to be presented to the student; and means for presenting and reporting to the student and teacher, statistics representative of the learning progress of the student as he acquires increased competency and proficiency in solving arithmetic problems within increasing number limits.

As previously indicated, the present invention can be used by a student in either one of two modes. The first mode, designated Problem Mode, allows the student to answer arithmetic problems at his own pace determined by the amount of time the student feels he needs to comfortably practice arithmetic problems during an initial learning period. The student is given a set number of problems, each of which falls within a teacher-defined set of limits and each of which utilizes numbers that are related to teacher-defined factors. The problems are generated randomly and electronically checked to be sure that they fall within the specified limits and utilize the specified factors and are then presented to the student. The student utilizes a calculator-type keyboard to enter his answer. The invention then shows the student whether the problem was answered correctly or incorrectly and also the time it took the student to answer the problem. After a specified number of problems has been presented to the student, the invention displays statistics of the student's performance including the average response time it took to answer each problem, the percentage of problems answered correctly, the total number of problems given, and the total elapsed time to do the entire problem set. Using these statistics, and comparing them to prior similar statistics, the student may begin to form an idea of the progress he is making as he uses the apparatus in the Problem Mode.

Once the student acquires a minimum degree of confidence in his ability to correctly answer problems within specified limits, he may then resort to a second mode of operation, namely, the Flashcard Mode. The Flashcard Mode is intended to be used by the student as a fast-action math drill, much like conventional flashcards are used. Typically, if the student is successful in the Flashcard Mode, the teacher can be confident that the student can handle more difficult problems. The Flashcard Mode operation of the present invention presents the student with as many problems as possible within a teacher-defined amount of time. Thus, the student is working against the clock in an effort to answer as many problems as possible, but also to answer a high percentage of them correctly. In the Flashcard Mode, statistics are the same as those that appear after a problem set in the Problem Mode. Evaluation of the student's statistics after a Flashcard Mode test helps determine if the student should be given more difficult problems, that is, problems using higher number limits and/or problems involving a larger selection of numbers determined by selection of the factors of which these numbers are integral multiples.

It is accordingly, a principle object of the present invention to provide an electronic teaching apparatus that overcomes the drawbacks and disadvantageous omissions of the prior art.

In particular, it is an object of the present invention to provide an electronic apparatus for teaching arithmetic computation by means of a dual mode of operation, namely, a Problem Mode and a Flashcard Mode.

It is another object of the present invention to provide an electronic teaching device in which a student's learning progress is reported to the student in statistical terms that increase a student's motivation for further improving his arithmetic proficiency.

It is still a further object of the invention to provide an electronic apparatus for teaching arithmetic which includes provisions for teacher-defined numerical limits and factors for problems presented to a student for solution.

These and other objects and advantages of the present invention will become more evident below from the detailed description of a preferred embodiment of the invention, taken in conjunction with the accompanying drawings in which:

BRIEF DESCRIPTION OF THE DRAWINGS

FIG. 1 is an isometric view of a preferred embodient of the present invention suitable for desk-top use;

FIG. 2 is an enlarged view of the keyboard and display portion of the present invention;

FIG. 6 is a detailed schematic diagram of the random access memory portion of the present invention;

FIG. 7 is a detailed schematic diagram of the address decode portion of the present invention;

FIG. 8 is a detailed schematic diagram of the read-only memory portion of the present invention;

FIG. 9 is a detailed schematic diagram of the tri-state buffer portion of the present invention;

FIGS. 11 through 22 are flow chart drawings illustrating the principal program routine and subroutines thereof utilized in the present invention.

DETAILED DESCRIPTION OF A PREFERRED EMBODIMENT

Figure 3:
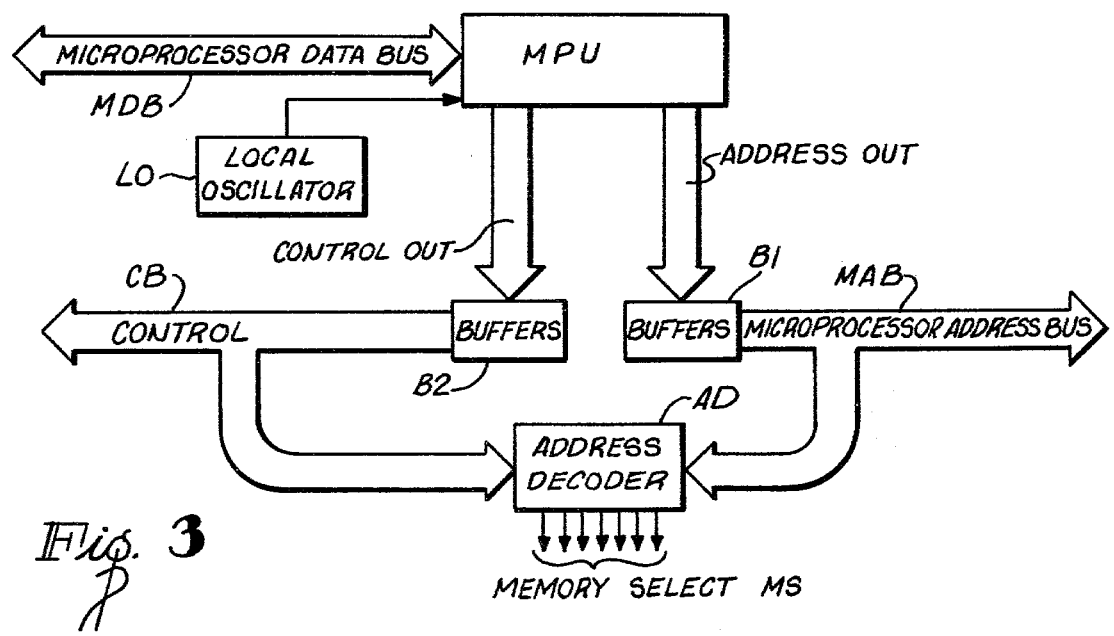
FIG. 3 is a block diagram illustrating the interface between the microprocessor unit and the various signal buses of the present invention.

Referring now to FIG. 1 there is shown therein a three-dimensional drawing of the electronic teaching apparatus 10 of the present invention illustrated in a desk-type configuration and comprising a prismoidally configured cabinet or chassis having a front viewing surface 11 upon which is mounted a display panel 14 and a keyboard panel 16. Display panel 14 and keyboard panel 16 are each disclosed in greater detail in FIG. 2. As indicated in FIG. 2, the display panel 14 comprises a plurality of 8-segment digital displays, of which digits 18, 20, and 22, comprise a time display line; of which digits 24, 26, 28, and 30 comprise display line 1; of wich digits 32, 34, 36, and 38 comprise display line 2; of which digits 40, 42, 44, 46, and 48 comprise display line 3; and of which digits 50, 52, 54, and 56 comprise display line 4. Display lines 1, 2 and 3 are located on the right side of display panel 14 while the time display line and display line 4 are located on the left side of display panel 14.

Display lines 1 and 2 are used to display the two numbers involved in the computation problem presented to the student, whether it be addition, subtraction, multiplication. When a nondivision problem is given, display line 3 is used to display the number entered by the student as the proposed solution to the problem presented; otherwise, display line 3 is the divisor and display line 2 is used to display the number entered by the student. Display line 4 displays the dividend for division problems. Display line 4 is used to also illustrate the number of problems given when the previously indicated statistics are reported to the student. Also included in the statistics reported to the student, is average response time which is displayed on the time display line wherein display digit 20 includes a decimal point indicating that display digit 22 is a tenth-of-seconds column for time display. Display lines 1 and 3 serve double duty in that they are also used to display portions of the statistical report to the student wherein display line 1 displays the percentage of correct answers to the student and display line 3 displays the total elapsed time in seconds to the student.

As also shown in FIG. 2, keyboard panel 16 comprises three keyboard sections, namely, section 58 on the left side of the keyboard, section 60 in the center of the keyboard and section 62 on the right side of the keyboard.

In the left-most section 58 of keyboard 16, the four buttons labeled ADD, SUB, DIV, and MULT, are used to select one of the four basic arithmetic operations that are to be tested. The TIME key is used to set the time allowed in a flashcard type test. Time is set in tenths of seconds. Accordingly, for a student to take a test of 20 seconds in duration, he would set the number 200 before depressing the TIME key, as will be disclosed in further detail below.

The # PROBS key is used to set the number of problems the student is to be given in a Problem Mode set.

There are two upper limit keys, namely, UPPER LIMIT #1 and UPPER LIMIT #2. These keys are depressed after entering numbers which will be the upper limits or the largest numbers to be given in each problem. By utilizing two upper limit keys one number of a problem may have a different upper limit than the other number of a problem. By way of example, this dual upper limit selection permits a teacher to select a large dividend and a small divisor for division problems. The keyboard also includes two lower limit keys, LOWER LIMIT #1 and LOWER LIMIT #2, which are used in the same manner as the upper limits but, in this case, to select the smallest numbers to be given in each problem.

The TEST key is depressed to start a problem after all the limits and other parameters have been set. The TEST key is depressed to start a problem set in either the Problem Mode or the Flashcard Mode of operation.

There are also two factor keys, FACTOR #1 and FACTOR #2, which extend the ability of the present invention to produce problems tailored to the needs of the student. There are two factor keys, one for each set of upper and lower limits, which allow the teacher to require the problems to have a specified factor. Thus, for example, the factor keys are used to cause all the numbers presented for each parameter of a particular problem set to be multiples of selected factor. For example, if the number 100 were depressed before depressing a factor button, all the numbers corresponding to that parameter of the problem presented to the student would be multiples of 100. The FACTOR #1 button controls the numbers between LOWER LIMIT #1 and UPPER LIMIT #1 so that they are integral multiples of the number depressed before depressing the FACTOR #1 key. The FACTOR #2 key is used with the UPPER LIMIT #2 key and LOWER LIMIT #2 key so that numbers given between the limits specified by the upper and lower limit for the second number are all integral multiples of the FACTOR #2 that is selected.

The WRONG AGAIN key is depressed to specify that no new problems are to be generated for the next test, but rather that the problems given are to be those from the previous problem set which the student had answered incorrectly. Thus, incorrectly answered problems from the previous test are repeated when the WRONG AGAIN key is depressed and followed by depression of the TEST key.

In the center section 60 of keyboard panel 16, only one key in the described embodiment is utilized, namely, the RESET key which is used to initialize the invention to a known state by erasing all previous numbers and entries that may in the random access memories of the computer. The RESET key is normally depressed only at the beginning of a test session when power is first applied to the invention.

The right-most portion of the keyboard 16, namely, section 62, includes the keys numbered 0 through 9 which are used to enter numbers for setting parameters for problem sets and for answering the problems presented to the student. The key labeled E is used to signal the end of an answer. Thus, when a student finishes entering his answer, the E button is depressed to indicate that the student is satisfied with his answer at that point.

The key labeled C is a clear key that the student may depress to erase previously entered numbers, should he have made an error in entering those numbers. After depressing the C key, the student may reenter a proposed answer, but he must do so before depressing the E button.

Although the above indicated multiple displays of display panel 14 and the numerous keys of keyboard panel 16 all have useful and important functions in the operation of the present invention, it is noteworthy that an additional benefit of the large number of displays and keys for operation of the present invention is that of providing the student with additional operational variety to even further interest and motivate him to utilize the educational features of the invention and thus to further improve his learning progress.

The electronic components of the present invention that are housed within the confines of chassis 12 will now be described in sufficient detail to enable one having skill in the relevant art to fabricate a preferred embodiment of the invention and for practicing the invention in what is presently contemplated by the inventor to be its best mode. Of course, it will be understood by those familiar with the electronics arts and more specifically with the microcomputer arts, that the detailed description to follow is of merely one implementation concept and that numerous alternative implementation concepts involving functionally similar components are possible, but that all such alternatives are contemplated as being within the scope of the invention as equivalents to the embodiment herein described.

Referring now to FIG. 3 which is a block diagram representation of the microprocessor portion of the present invention, it will be observed that the invention is implemented by means of a microprocessor unit hereinafter designated MPU, as well as a number of microcomputer-related devices which are designed to operate in conjunction with the MPU. In the preferred embodiment described herein, the MPU is a Motorola model M6800 microprocessor which is an N-channel MOS 8-bit microprocessor capable of addressing 65,000 bits of memory utilizing a 16-bit address bus. Further details regarding the Motorola model M6800 microprocessor unit and associated devices designed for use with the 6800 microprocessor unit, are described in the publication entitled "Microcomputer System Reference Handbook" by Motorola Incorporated, published in 1974, and are further described in a publication entitled "Microprocessor Applications Manual" by Motorola Incorporated, published by McGraw Hill in 1975. These publications provide a detailed description of programing techniques, input/output techniques, hardware characteristics, peripheral control techniques, system design techniques instruction sets, and other such detailed information that may be useful in understanding the specific characteristics of the microprocessor unit as it is utilized for implementing the present invention. Accordingly, such detailed description will not be included herein except to the extent necessary for a full understanding of the present invention.

As shown in FIG. 3, the microprocessor unit, MPU, is connected to a local oscillator, L0. Local oscillator L0 transfers a dual-phase signal to the MPU which controls the timing of the MPU and the periods during which data signals, control signals, and address signals are transferred within the microprocessor system. The MPU utilizes an address output line, designated address out, to carry 16 bits of address signals which are applied to output buffer circuits B1 and then to the microprocessor address bus MAB. The MPU also generates a number of control signals that are applied to the control out line which are also buffered, in this case, by buffer circuits B2 before being applied to control bus CB. Control bus CB and microprocessor address bus, MAB, respectively, apply signals to an address decoder, AD, which responds to the control and address signals to generate seven memory select binary signals which are used to select the memory elements beng utilized during a particular arithmetic operation. The MPU also utilizes a microprocessor data bus, MDB, upon which data signals are transferred to and fromm the MPU as well as to and from memory units, the keyboad and the displays by means of a peripheral interface adapter. These latter elements of the system are shown in block diagram form in FIG. 4.

Figure 4:
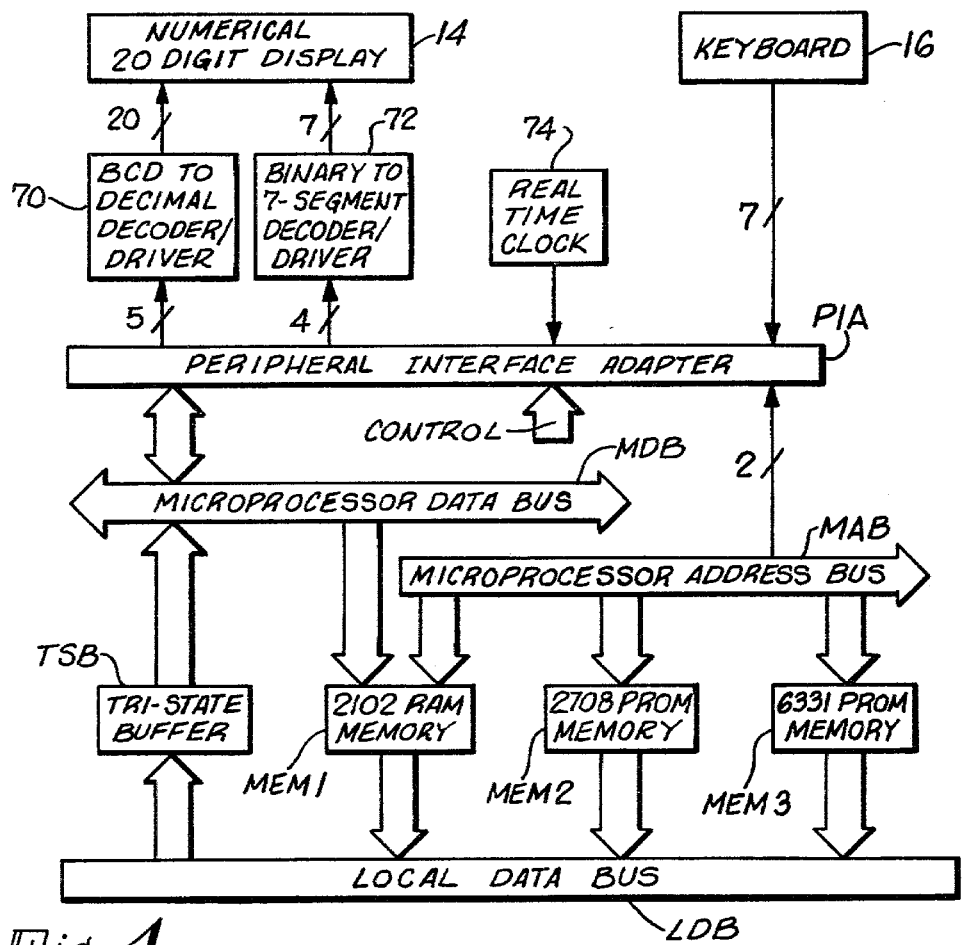
FIG. 4 is a block diagram illustrating the interface between the signal buses and the memory, keyboard, and display portions of the present invention.

As shown in FIG. 4, the microprocessor data bus, MDB, delivers data signals to the random access memory unit, MEM 1, and also to a peripheral interface adapter, PIA, which is a Motorola M6820 device, described in great detail in the aforementioned Motorola references. The microprocessor data bus, MDB, also receives data signals from the peripheral interface adapter PIA, and from tri-state buffers, TSB. Tri-state buffers TSB receive the data signals output from the memory units of the system by means of a local data bus LDB which is used to, in effect, make the data signals available at the output of the memory units until the appropriate time for transfer of the data signals onto data bus MDB.

The microprocessor address bus, MAB, is used to transfer address signals from the MPU as previously shown in FIG. 3, to the three memory units, namely, RAM memory MEM 1, and the two PROM memory units, MEM 2 and MEM 3.

The peripheral interface adapter, PIA, is a dual 8-bit bidirectional data device useable as a 16-bit register which appears to the MPU as an additional memory device. Five bits of the 16-bit register are assigned to a BCD to decimal decoder/driver 70 which is used to enable selected digits in the 20 digit display 14. Four bits of the peripheral interface adapter PIA are assigned to a binary to 7-segment decoder/driver 72 which is used to drive the appropriate segments of each selected digit in display 14. Seven bits of the peripheral interface adapter PIA receive signals from keyboard 16 to provide the system with signals representative of the input selections made by the student during operation of the invention. A real time clock, 74, is also connected to the peripheral interface adapter to provide the PIA with a periodic clock signal that is the time base for the entire system. The peripheral interface adapter also includes peripheral control lines that may be used for interfacing with additional optional equipment not shown in FIG. 4. By way of example, the two additional lines of the PIA may be used for interface with a magnetic card reader. The PIA also receives control signals from the control bus CB, generated by the microprocessor unit, and two address bits from the microprocessor address bus MAB, that determine which of the two registers, within the peripheral interface adapter, are to be used in conjunction with each memory operation.

A more detailed component description of the present invention will now be provided in conjunction with FIGS. 5 through 10.

Figure 5:
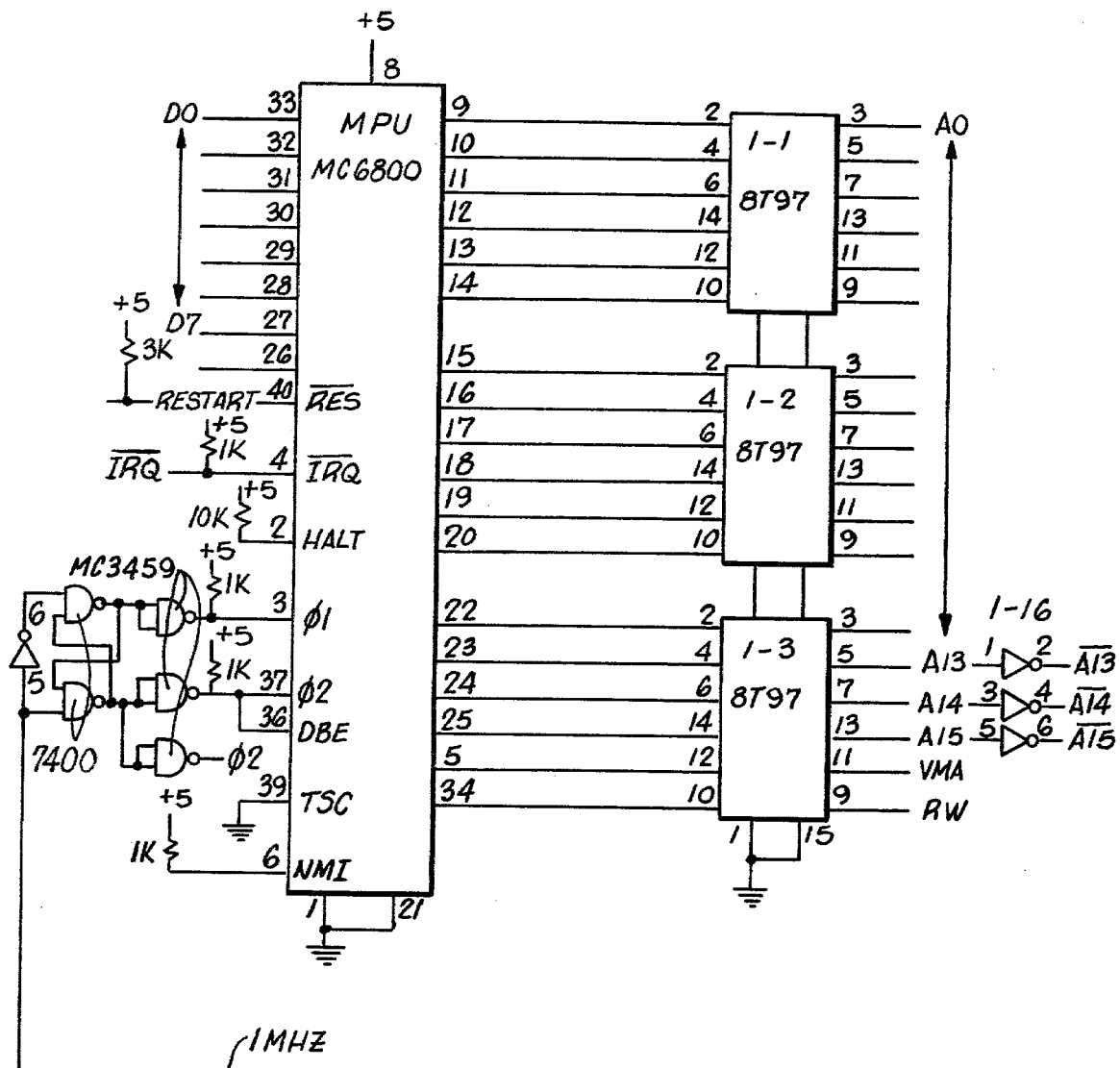
FIG. 5 is a detailed schematic drawing of the microprocessor section of the present invention.

In FIG. 5, which is a detailed schematic diagram of the microprocessor portion of the present invention, the pin connections of the MPU are illustrated. As shown in FIG. 5, the microprocessor unit, MPU, which as previously indicated is a Motorola model 6800, also referred to as a Motorola model MC6800, includes 8 data lines, sequentially labeled D0 through D7, which comprise the microprocessor data bus MDB; and 16 address lines, sequentially designated A0 through A15, which constitute the microprocessor address bus MAB. Signals on the MAB are bufferred through appropriate buffer amplifiers which, in this case, are in 3 buffer amplifier circuits manufactured by National as model 8T97. As indicated to the right of the lower most buffer amplifier 1-3 in FIG. 5, all 16 address lines comprising the microprocessor address bus are connected to inverting amplifiers, in this case TI model 7404 so that the signal logic level on the microprocessor address bus MAB is actually the inverse of the signal logic level available at the output of the microprocessor unit.

As previously indicated in conjunction with the block diagram of FIG. 3, the MPU utilizes a two-phase clock to control signal transfer within the MPU logic circuits and in conjunction with circuits to which the MPU is connected directly. As shown in FIG. 5, the local oscillator L0 comprises a 2 megahertz crystal circuit that feeds the clock terminal, C, of a 7474 D type flip-flop. This flip-flop is connected in a divide-by-two configuration with the $\overline{Q}$ output signal fed back to the D input terminal to produce a one megahertz square wave signal available at the Q terminal. This square wave signal is applied to a pair of NAND gates of a National 7400 chip and including a single inverter stage of a 7404 inverter chip to ultimately apply two out-of-phase non-overlapping clock signals $\phi$-1 and $\phi$-2 to the like designated terminals of the MPU by way of a Motorola MC3459 clock driver chip. The Phase 2 clock signal is also applied to the DBE terminal in the MPU as a data bus enable signal which enables the MPU bus driver when in a high logic state.

Certain other input terminals of the MPU are tied permanently to either ground or +5 volts DC because their logic state need not be changed during operation of the present invention. These terminals include the non-maskable interrupt terminal NMI which is tied to 5 volts DC, the three-state control terminal TSC which is tied to ground, and the halt terminal which is tied to 5 volts DC. The interrupt request terminal, IRQ, and the restart terminal RESTART are tied to 5 volts DC through a suitable pull-up resistor for open collector, voltage switching operation.

Two control lines, namely, the valid memory address line VMA and the read/write line RW, comprise the control out line of the MPU. The valid memory address line, VMA, indicates to memory and peripheral devices that thee is a valid address on the address bus MAB. The read/write line RW signals the peripheral and memory devices as to whether the MPU is in a read or write state. The signals on the VMA and RW lines at the output of the MPU are also applied to buffer amplifiers on a National model 8T97 buffer chip and are then applied to the control bus CB for use in other portions of the system as will hereinafter be described.

FIG. 6 is a schematic diagram of the random access memory portion of the present invention. As illustrated in FIG. 6, the random access memory RAM comprises eight Fairchild model 2102 RAM memory chips. Address lines A0 through A9 are applied to all eight random access memory chips simultaneously as an address for each memory chip where a bit location, corresponding to the address, is either to be read out or written into. In a read mode, the output signals, read from the respective RAM chips, appear on the output lines identified as DO buff through D7 buff. During a write mode, the data to be written into the selected memory address location appears at input lines D0 through D7 respectively. A RAM select signal RAM SEL, generated by the address decoder circuit to be discussed below in conjunction with FIG. 7, is applied to the eight RAM memory chips simultaneously when signals are to be read out from the RAM or written into the RAM. Selection between reading and writing with respect to the RAM memory is made by the logic state of the read/write signal RW generated by the microprocessor unit as previously discussed in conjunction with FIG. 5. The read/write signal RW is applied to a NAND gate to which the second input signal is the phase 2 clock signal $\phi 2$ so that the read or write function is performed at the appropriate time in the microprocessor sequence. Each of the RAM memory chips is also connected to a 5 volt DC source as shown, typically, for the D0 chip.

As previously discussed in conjunction with FIG. 3, an address decoder AD receives signals from both the control bus CB and the microprocessor address bus MAB to generate a plurality of control signals that are used to select either the peripheral interface adapter, or one of the three memory units for the particular data transfer taking place.

Details of the address decoder are provided in FIG. 7 which is a schematic diagram of the address decoder AD. As indicated in FIG. 7, the address decoder AD is used to develop five signals, namely, the ram select signal RAM SEL, the peripheral interface adapter select signal PIA SEL, the EPROM1 and EPROM2 signals and a vector signal VECTOR. As shown in the top-most portion of FIG. 7, the first four of the above listed signals are developed by using an eight-input NAND gate to which the address signals A13, A14, A15 are input, as well as the valid memory address signal VMA and the phase 2 clock signal $\phi 2$. The output signal of this multiple input NAND gate, designated MEM SEL, is applied to one of four input terminals of a 7442 4-to-10 decoder chip, the other three input signals to which are the address signals A10, A11 and A12. The vector signal output of the address decoder is developed by a combination of two eight-input NAND gates wherein the first such NAND gate, 2-17, receives address input signals A8 through A15 and wherein the second such multiple input NAND gate, 1-20, receives the inverted output of the first NAND gate as well as address signals A4 through A7, the valid memory address signals VMA, the phase 2 clock signal φ2 and the read/write signal RW. The output of multiple input NAND gate, 1-20, is the signal VECTOR.

Referring now to FIG. 8 which is a schematic illustration of the read only memory portion of the invention, it will be seen that the read only memory comprises three programmable read only memory circuit chips including a pair of Intel model 2708 proms (MEM2) and a single MMI 6631 prom (MEM3). As shown in FIG. 8, each such prom chip receives two types of input signals, namely, a plurality of address signals and a single control signal. By way of example, the Intel 2708 prom M2 at the left-most portion of FIG. 8 receives address signals A0 through A9 from the microprocessor address bus MAB. The same address lines are also applied to the second Intel 2708 prom circuit chip M3. Therefore, separate control signals, namely, EPROM1 and EPROM2, are applied respectively to enable the prom chips M2 and M3 in accordance wih which of the two memory chips is to provide the data output signal for a particular data transfer operation. As shown in the right-most portion of FIG. 8, a third programmable read only memory device MEM3, the contents of which are listed below in conjunction with Table I, utilizes input address signals A0 through A3 and the control signal, VECTOR, to also generate data signals at the appropriate time in a data transfer operation.

The output terminals of the three prom chips shown in FIG. 8 and labeled D0 BUFF through D7 BUFF, comprise the local data bus LDB as previously discussed in conjunction with FIG. 4. As previously discussed, the local data bus LDB is applied to a tristate buffer TSB the output of which feeds the microprocessor data bus MDB. The circuit of tristate buffer TSB is shown in detail in FIG. 9. As illustrated in FIG. 9, the tristate buffer TSB utilizes a pair of National Semiconductor model 8T97 buffer circuits, the input signals of which are derived from lines D0 BUFF through D7 BUFF and the output signals of which are available at lines D0 through D7. The output signals on lines D0 through D7 of the tristate buffers TSB are only available when one of the memory chips M1, M2 or M3 is being addressed.

TABLE I

| 6331 PROM CONTENTS | |
| --- | --- |
| ADDRESS (HEX) | DATA (HEX) |
| 0 | FF |
| 1 | FF |
| 2 | FF |
| 3 | FF |
| 4 | FF |
| 5 | FF |
| 6 | FF |
| 7 | FF |
| 8 | 08 |
| 9 | 09 |
| A | 08 |

TABLE I-continued

| 6331 PROM CONTENTS | |
| --- | --- |
| ADDRESS (HEX) | DATA (HEX) |
| B | 06 |
| C | 08 |
| D | 03 |
| E | 08 |
| F | 00 |

Furthermore, a transfer of data from the memory devices to the microprocessor data bus MDB is made only during a read mode so that such data does not interfere with data signals that are being input from the data bus to the random access memory device MEM1 during a write mode. Accordingly, the tristate buffer circuits are enabled only when the read/write signal RW is at the logic level representing a read mode.

The means by which the buffer circuits of TSB are enabled only at the appropriate combination of control signals, is embodied in the logic circuits shown at the lower-most portion of FIG. 9. These logic circuits apply an input signal to the enable terlminals 1 and 15 of both National 8T97 circuit chips of the tristate buffers TSB. The four control signals, EPROM1, EPROM2, RAMSEL and VECTOR are applied to a pair of multiple input NOR gates including a suitable logic inverter which, in combination, develop a signal indicating whether or not any of those control signals are at the logic level which indicates selection of a memory device. That signal is applied to a NAND gate along with the read/write signal RW and the output signal of that NAND gate is applied to the enable terminals of the tristate buffer chips.

Figure 10:
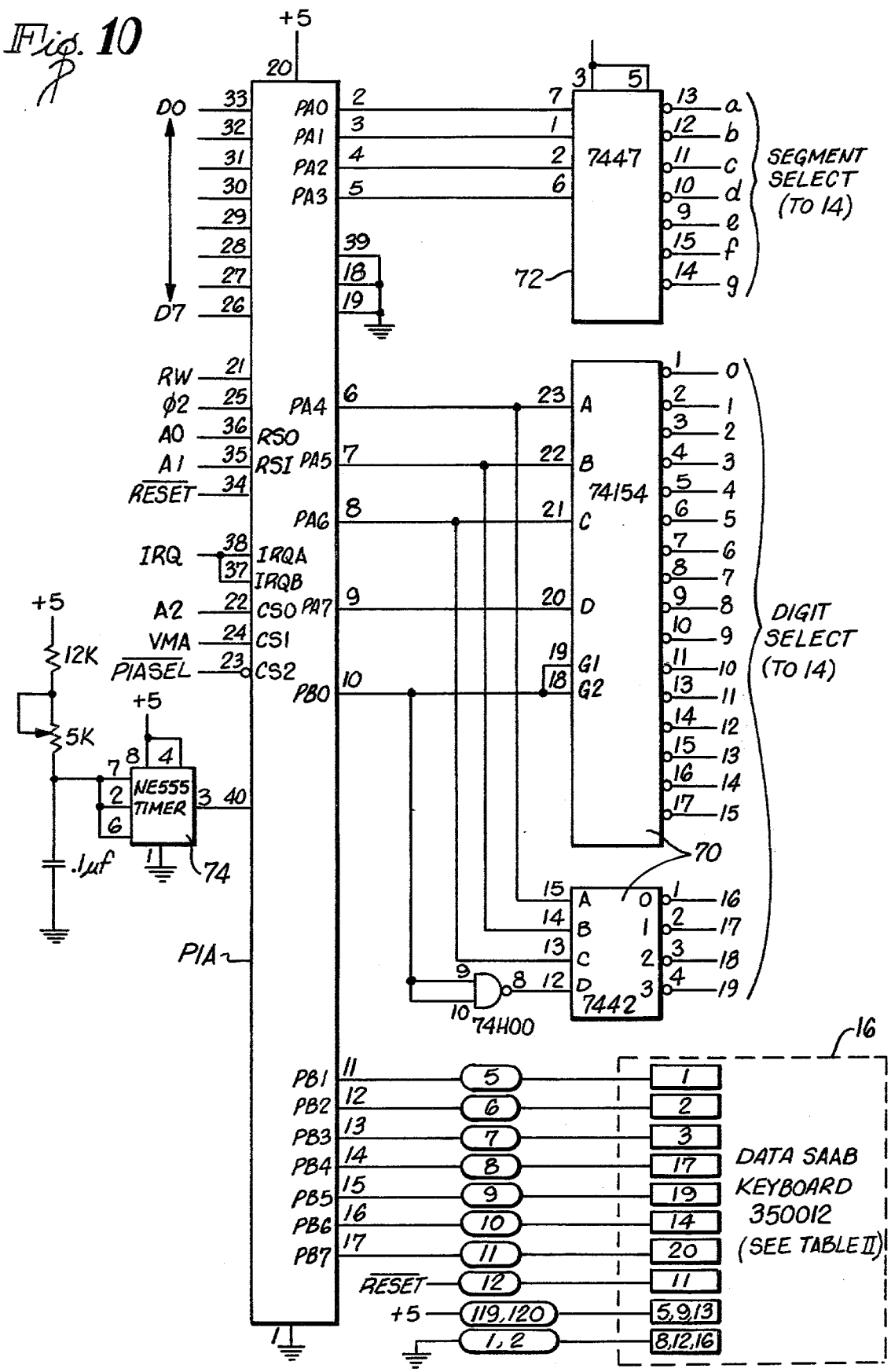
FIG. 10 is a detailed schematic diagram of the keyboard and scan electronics portion of the present invention.
Figure 11:
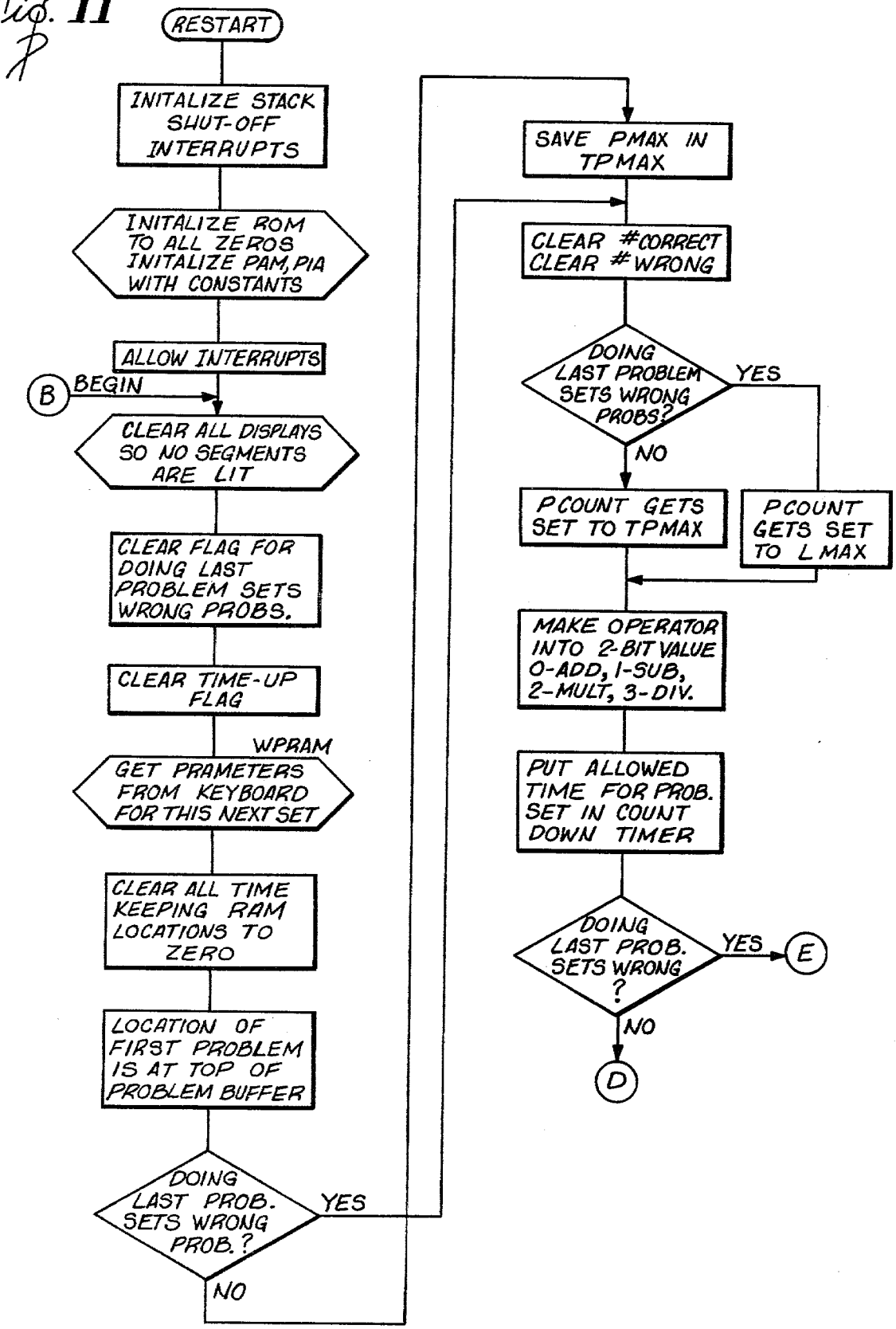
Figure 12:
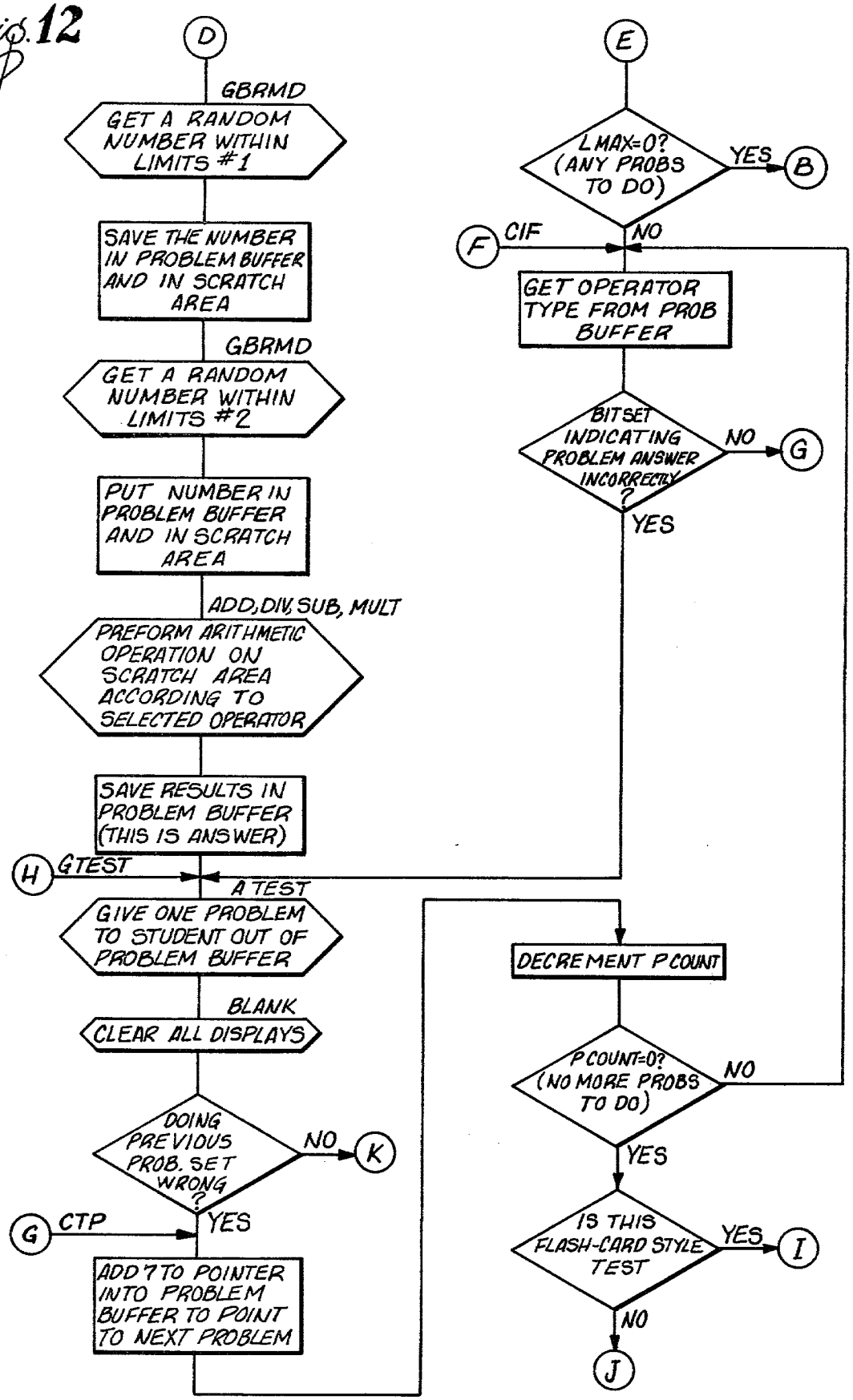
Figure 13:
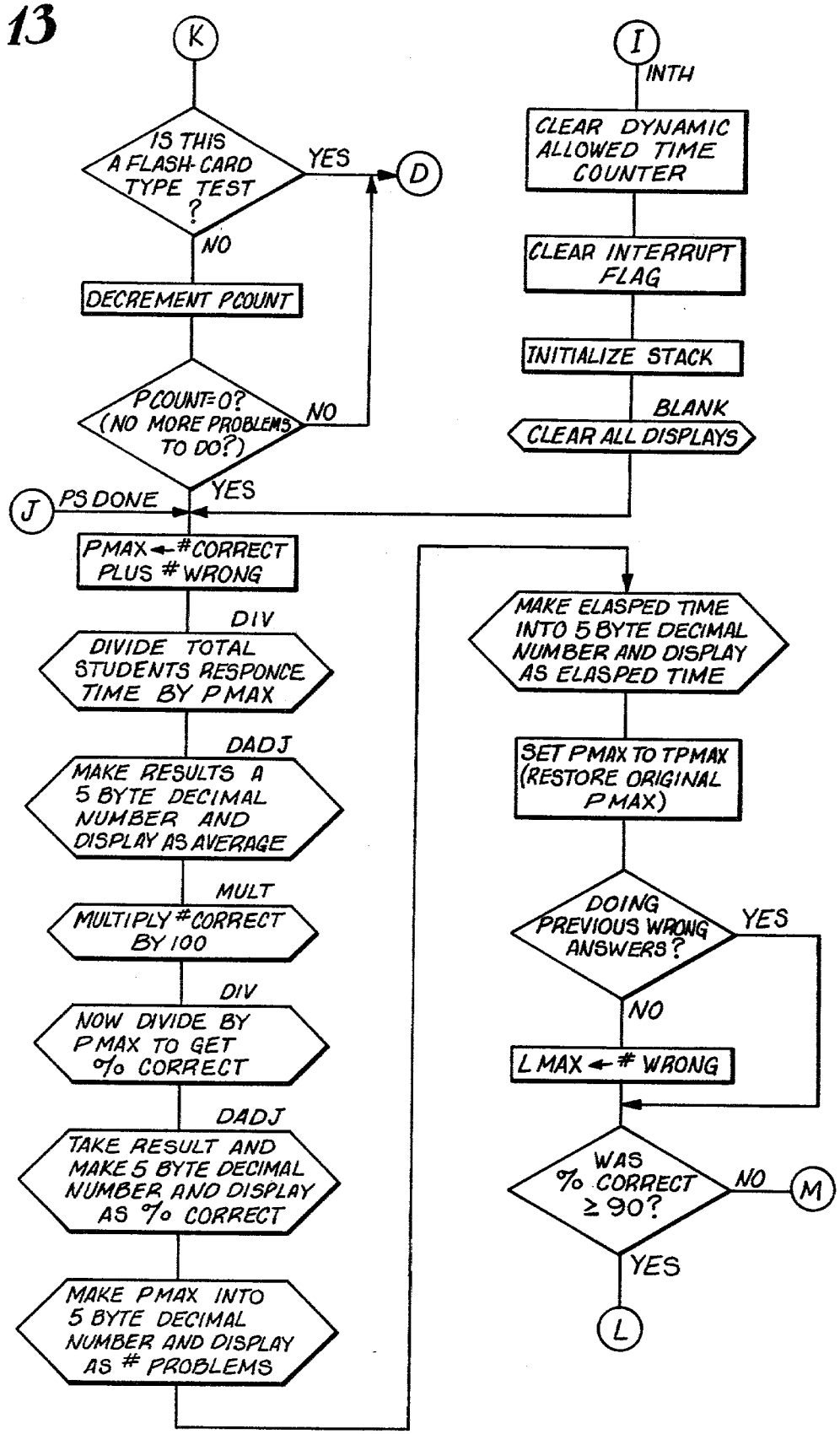
Figure 14:
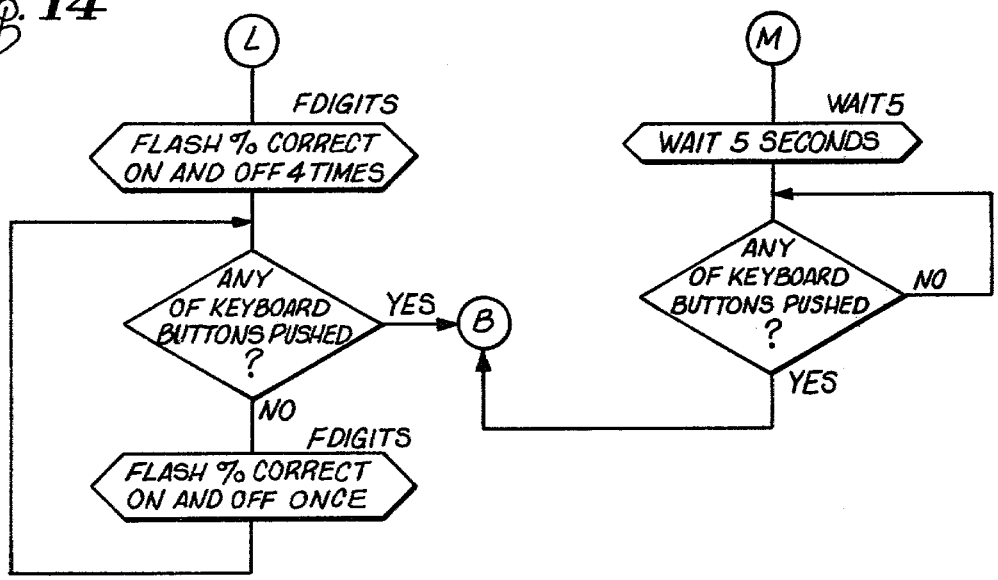
Figure 15:
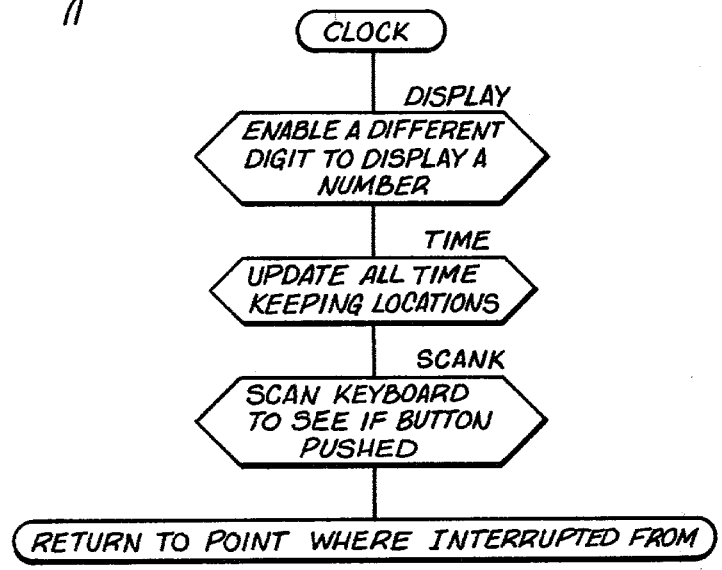
Figure 16:
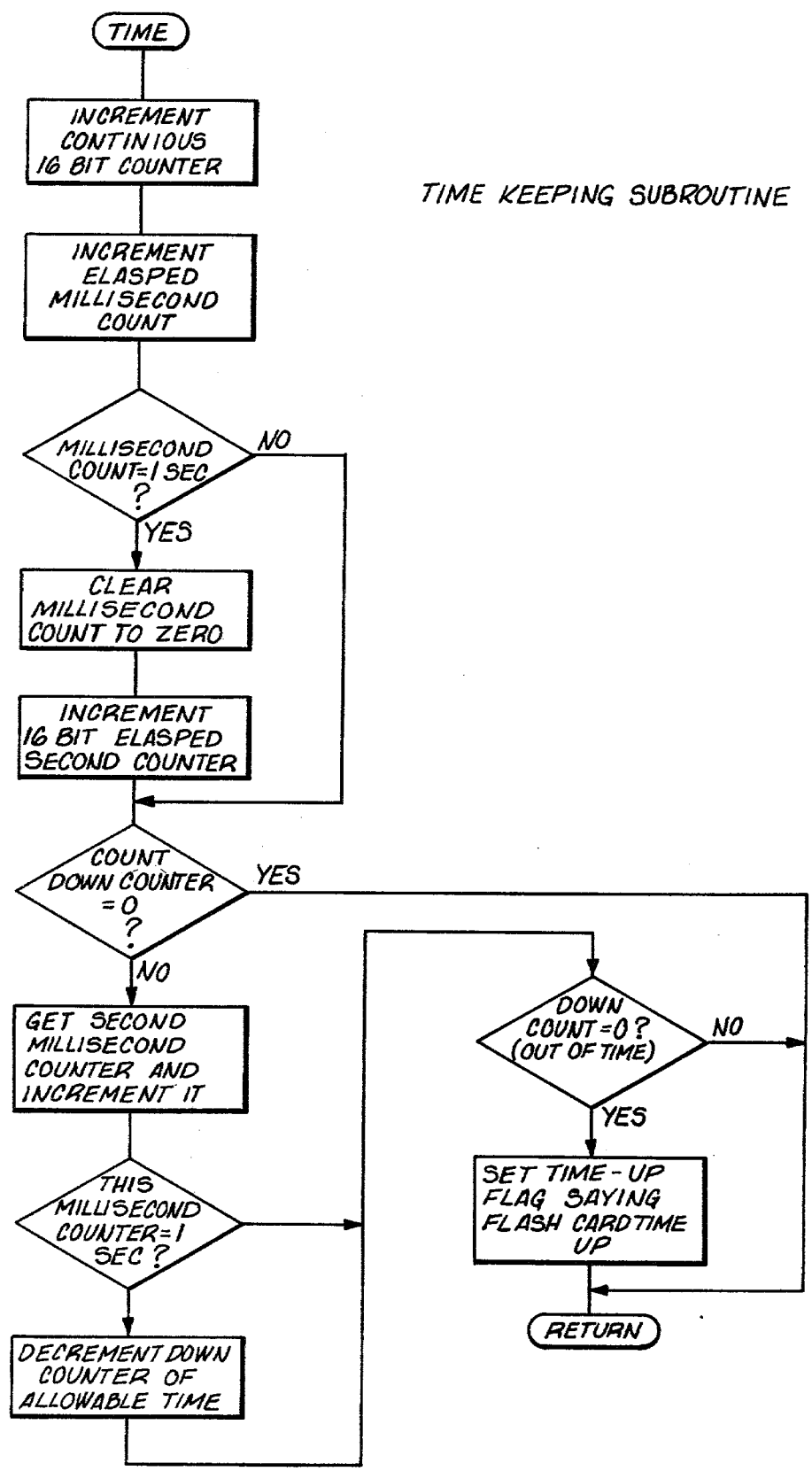
Figure 19:
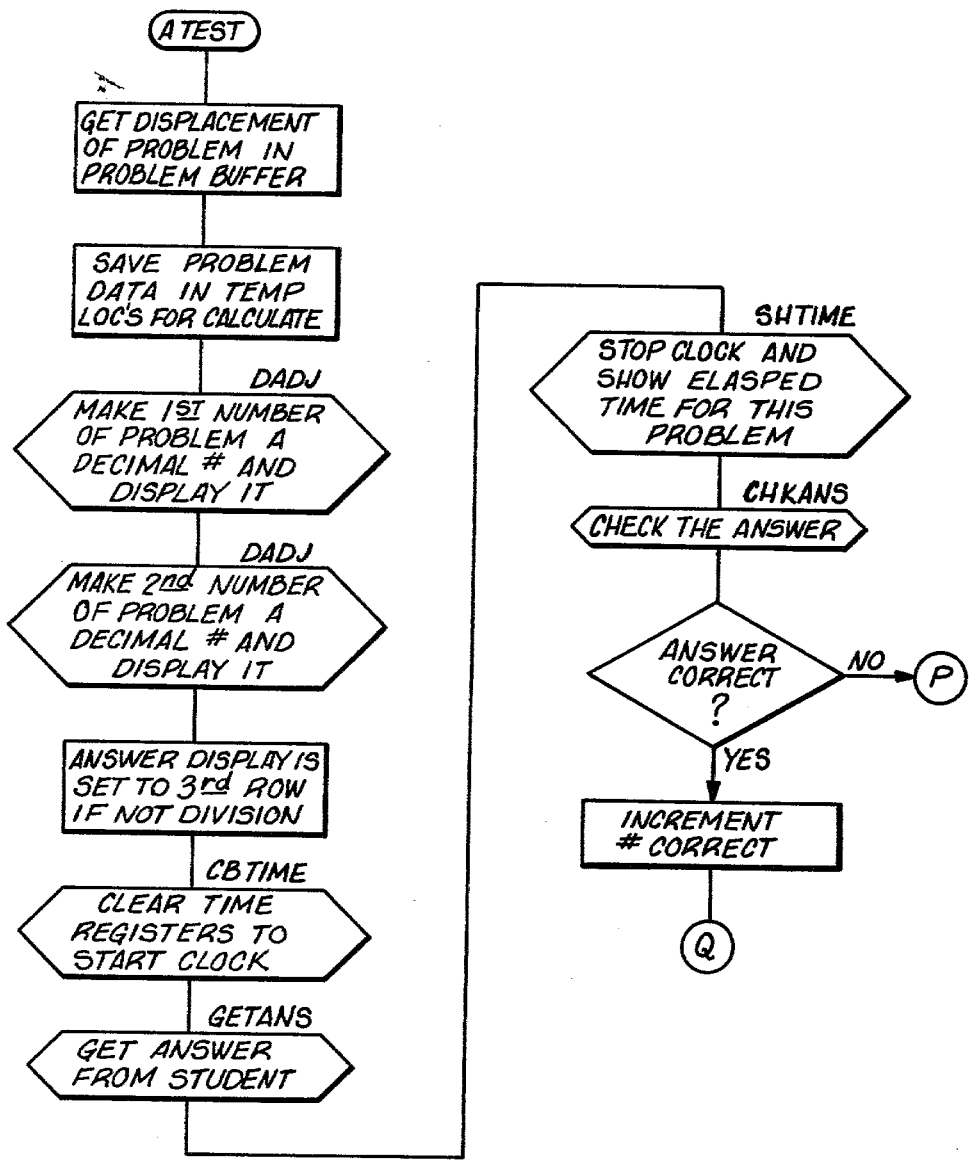
Figure 20:
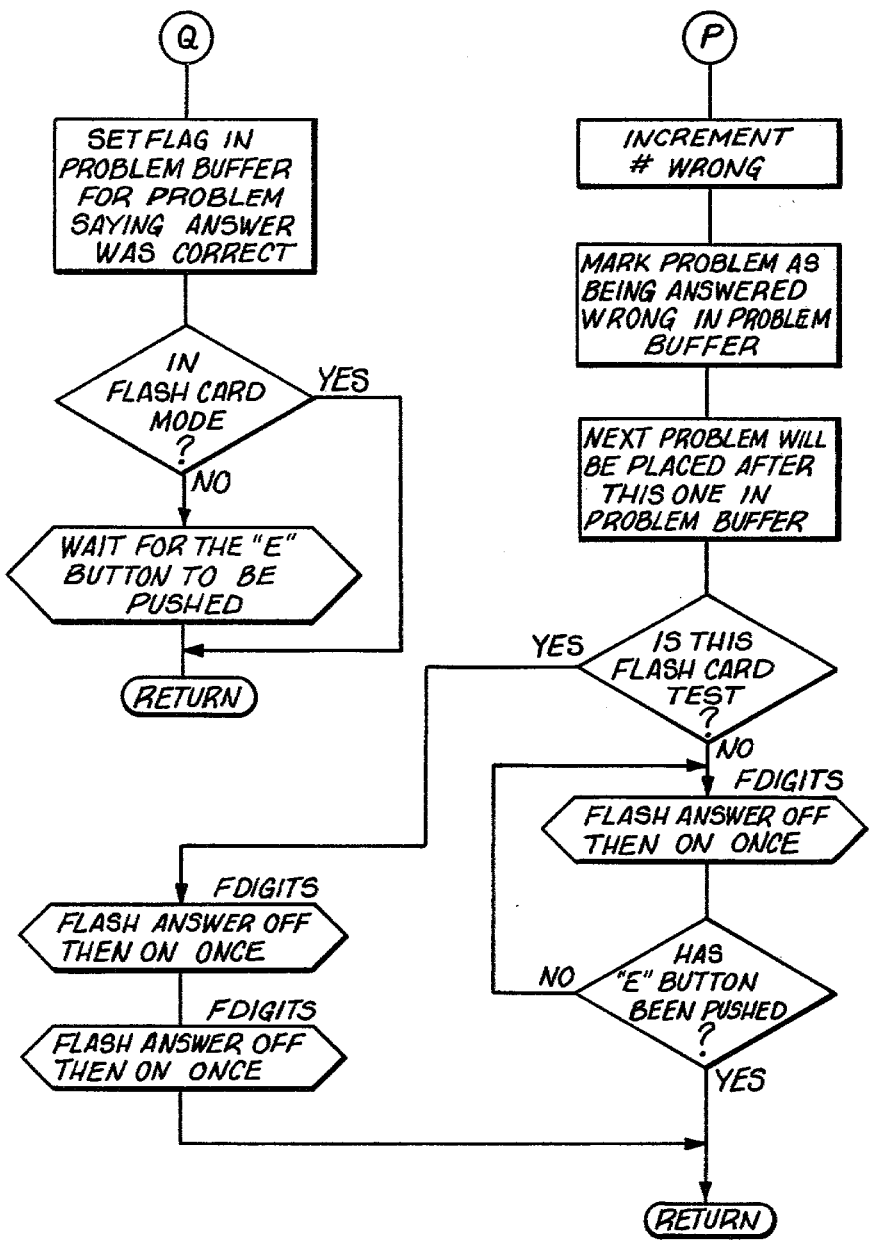
Figure 21:
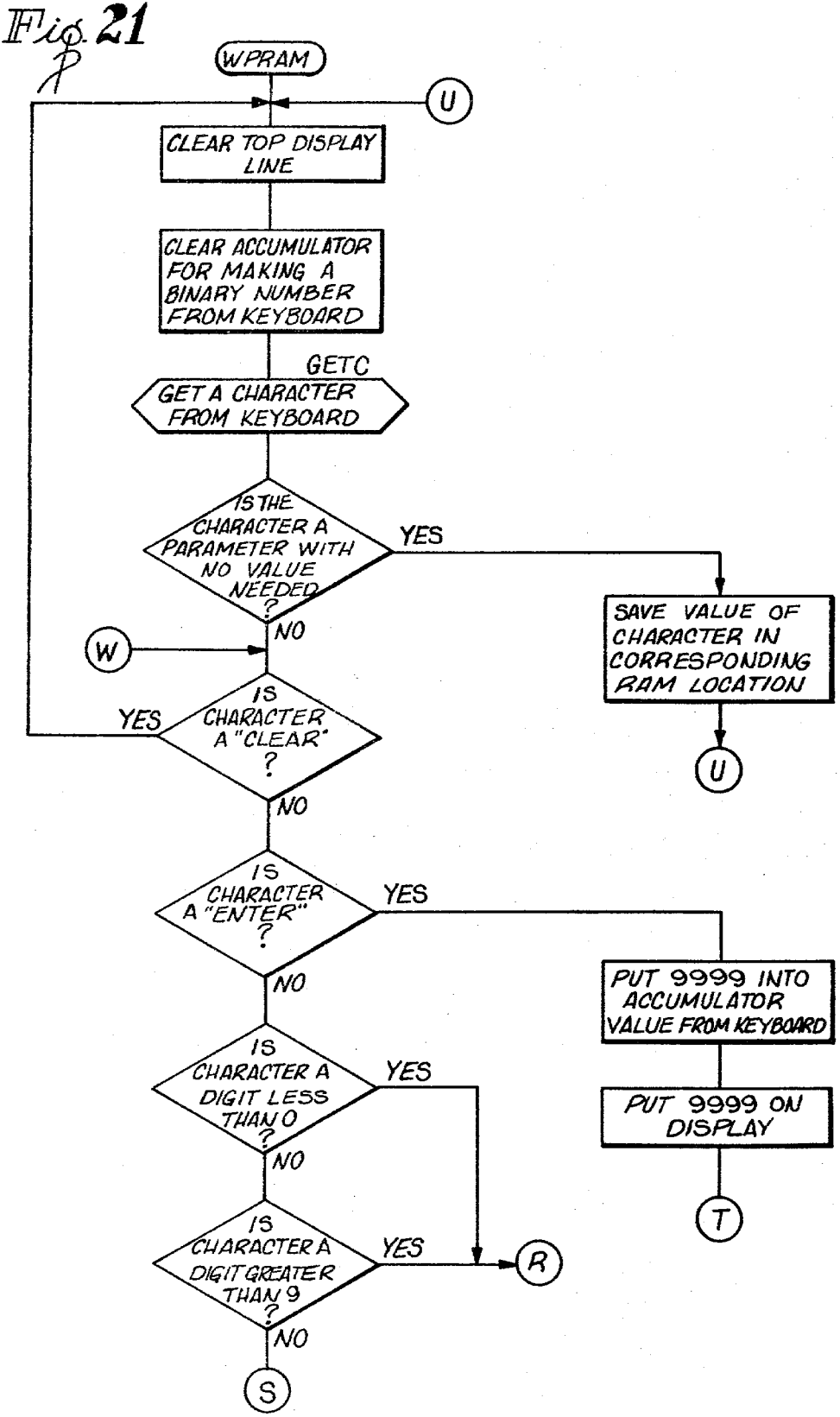
Figure 22:
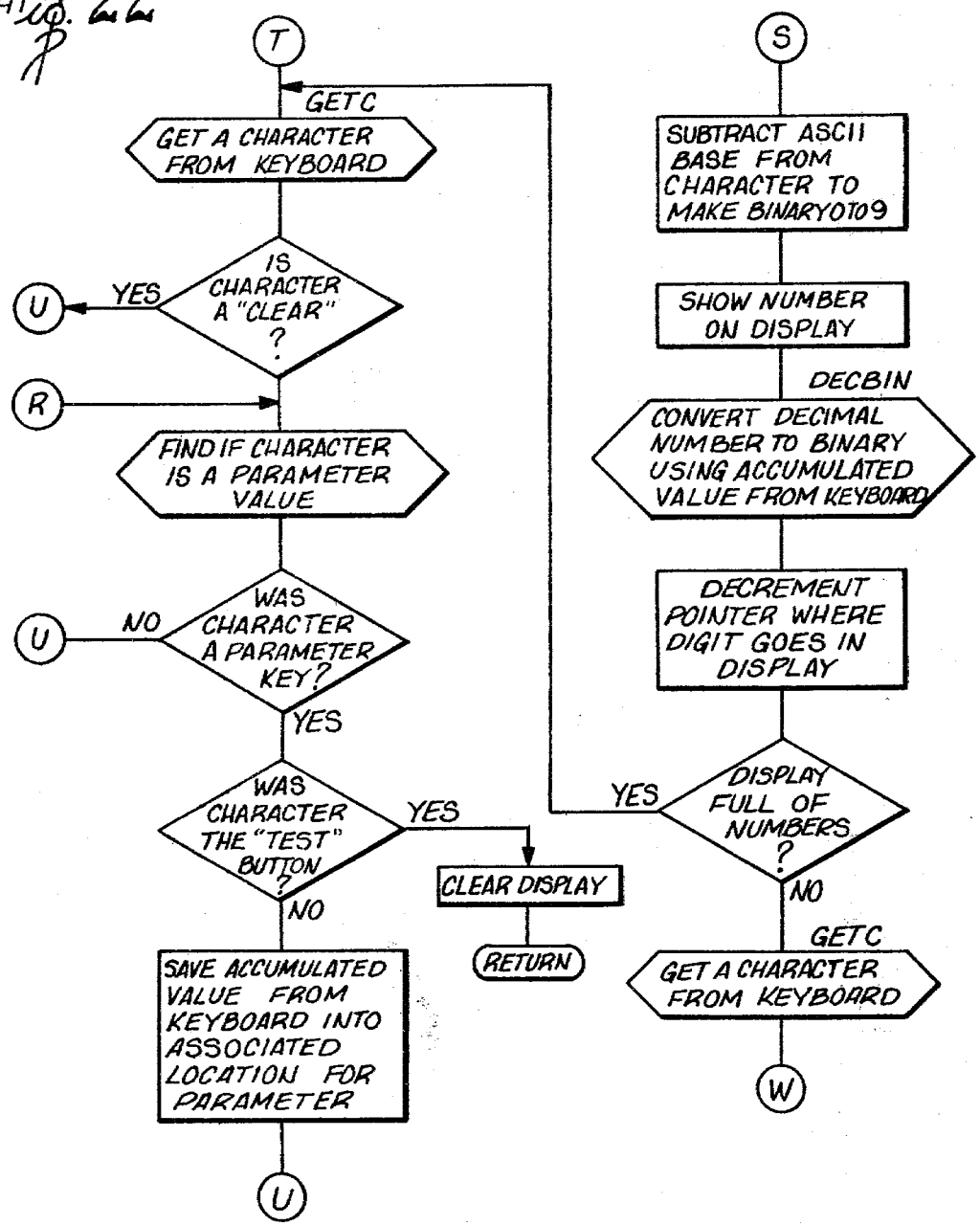

Reference will now be made to FIG. 10 which is a detailed schematic diagram illustrating the manner in which the peripheral interface adapter, PIA, interfaces with the system buses, the display and the keyboard. As shown in FIG. 10, the peripheral interface adapter is connected to the data bus comprising data lines D0 through D7, the address bus comprising address lines A0, A1 and A2, and the control bus comprising control lines RW, φ2, RESET, IRQ and PIASEL. As previously discussed in conjunction with FIG. 4, the peripheral interface adapter PIA is a dual 8-bit register which is treated by the microprocessor unit MPU as an additional memory device in the system. The purpose of the peripheral interface adapter PIA is to provide suitable data signal flow and control between the display unit 14, the keyboard unit 16 and the remainder of the system. Thus the signals on the microprocessor data bus, MDB, or more specifically, D0 through D7, are bidirectional and flow into and out of the dual 8-bit registers in the PIA. Clearly, data transfers are made from left to right in FIG. 10 into the PIA through the data bus and out of the PIA register lines PA0 through PA7 and PB0, and out to the decoder/drivers 70 and 72 before being applied to the appropriate segment select and digit select lines that are connected to the display system 14. On the other hand, data flows from right to left from the keyboard system 16 which, as illustrated in FIG. 10, in the disclosed embodiment is a DATASAAB keyboard model 350012, and into the PIA register lines PB1 through PB7 and out into the remainder of the system over the microprocessor data bus lines D0 through D7. The internal operation of the peripheral interface adapter, Motorola model MC6820, is best understood by reference to FIG. 3-4.1.2-1 on page 3-10 of the aforementioned Motorola reference "Microprocessor Applications Manual" and therefore need not be described in detail herein.

The peripheral interface adapter provides two 8-bit peripheral interface registers with bidirectional flow thereto available at the pins labeled PA0 through PA7 through PB7 respectively. The signals available on the microprocessor data bus, comprising lines D0 through D7, are also bidirectional, and provide access to data bus buffers within the peripheral interface adapter PIA for data flow between the peripheral interface internal registers and the remaining portions of the microprocessor system.

The remaining input lines to the left side of the PIA as illustrated in FIG. 10, provide means for controlling and selecting the appropriate registers internal to the peripheral interface adapter PIA and for read/write control with respect to such registers. Accordingly, the read/write signal RW, which is applied to the PIA at terminal 21 thereof, is a signal generated by the MPU to control the direction of data transfers on the data bus. A low logic state read/write signal at terminal 21 of the peripheral interface adapter, enables data transfer into the PIA on the occurrence of the $\phi 2$ signal which is applied to terminal 25 of the PIA.

Similarly, a high logic state read/write signal RW sets up the peripheral interface adapter for a transfer of data to the micrprocessor data bus on the occurrence of the $\phi 2$ signal. The two address signals, A0 and A1, which are applied respectively to pins 36 and 35 of the PIA, are the PIA register lines used to select the registers within the PIA to be written into or read out from. The three signals comprising address signal A2 and control signals VMA and PIASEL, which are applied respectively to pin numbers 22, 24, and 23 of the PIA, are chip select lines that are used to select the peripheral interface adapter for data transfer in much the same way the previously described memory select lines are used to select particular memory devices for data transfer to or from such devices.

The four lines labeled PA0 through PA3, are applied to a binary-to-7-segment decoder/driver 72 which in the disclosed embodiment is a Texas Instruments model 7447 chips which converts the binary coded four-bit input signal to an appropriate seven segment decoded output signal to select the appropriate display segments of a selected digit. The digit is selected by means of peripheral interface adapter lines PA4 through PA7 and PB0. These lines are applied to a BCD-to-decimal decoder/driver 70, which in the disclosed embodiment comprises the two chips namely, TI model 74154 and TI model 7442. The output of driver 70 comprises twenty digit select lines only one of which, at any one time, will have a signal with the appropriate logic state to enable a selected digit.

The remaining PIA register lines, PB1 through PB7, are connected to the keyboard 16, previously discussed in conjunction with FIG. 2. When a particular key is depressed by the user, the seven data lines, PB1 through PB7, take on signal logic states, the combined value of which corresponds to a seven-bit binary representation of the value assigned to that key. PB1 is the least significant bit and PB7 is the most significant bit of the seven-bit number. When no key is depressed, the data lines are all at a logic high level. A separate signal is generated by depression of the reset button which becomes the RESET signal for the system which is applied to the PIA of terminal 34 as well as to other components of the system which are cleared at the beginning of operation. The equivalent hexadecimal key value of each key of keyboard 16 is listed in Table II from which the binary signal logic condition of the signals available at PIA lines PB1 through PB7, may be discerned.

TABLE II

| KEY FUNCTION | KEY NUMBER (HEX) | CODE TO PIA | | | | | | |
|---|---|---|---|---|---|---|---|---|
| | | PB7 | PB6 | PB5 | PB4 | PB3 | PB2 | PB1 |
| ADD | 21 | 0 | 1 | 0 | 0 | 0 | 0 | 1 |
| SUB | 22 | 0 | 1 | 0 | 0 | 0 | 1 | 0 |
| DIV | 24 | 0 | 1 | 0 | 0 | 1 | 0 | 0 |
| MULT | 28 | 0 | 1 | 0 | 1 | 0 | 0 | 0 |
| TEST | 41 | 1 | 0 | 0 | 0 | 0 | 0 | 1 |
| TIME | 44 | 1 | 0 | 0 | 0 | 1 | 0 | 0 |
| #PROBS | 48 | 1 | 0 | 0 | 1 | 0 | 0 | 0 |
| FACTR#1 | 52 | 1 | 0 | 1 | 0 | 0 | 1 | 0 |
| UPPER LIM.#1 | 54 | 1 | 0 | 1 | 0 | 1 | 0 | 0 |
| UPPER LIM.#2 | 58 | 1 | 0 | 1 | 1 | 0 | 0 | 0 |
| FACTR#2 | 62 | 1 | 1 | 0 | 0 | 0 | 0 | 1 |
| LOWER LIM.#1 | 64 | 1 | 1 | 0 | 0 | 1 | 0 | 0 |
| LOWER LIM.#2 | 68 | 1 | 1 | 0 | 1 | 0 | 0 | 0 |
| 0 | 30 | 0 | 1 | 1 | 0 | 0 | 0 | 0 |
| 1 | 31 | 0 | 1 | 1 | 0 | 0 | 0 | 1 |
| 2 | 32 | 0 | 1 | 1 | 0 | 0 | 1 | 0 |
| 3 | 33 | 0 | 1 | 1 | 0 | 0 | 1 | 1 |
| 4 | 34 | 0 | 1 | 1 | 0 | 1 | 0 | 0 |
| 5 | 35 | 0 | 1 | 1 | 0 | 1 | 0 | 1 |
| 6 | 36 | 0 | 1 | 1 | 0 | 1 | 1 | 0 |
| 7 | 37 | 0 | 1 | 1 | 0 | 1 | 1 | 1 |
| 8 | 38 | 0 | 1 | 1 | 1 | 0 | 0 | 0 |
| 9 | 39 | 0 | 1 | 1 | 1 | 0 | 0 | 1 |
| E | 1C | 0 | 0 | 1 | 1 | 1 | 0 | 0 |
| C | 6F | 1 | 1 | 0 | 1 | 1 | 1 | 1 |

The above description of the electronics of the invention, including the description of the block diagram of FIGS. 3 and 4 and of the schematic diagrams of FIGS. 5 through 10, will enable those skilled in the art to fabricate the preferred embodiment of the invention from the standpoint of physical component architecture. However, to enable those of skill in the art to prepare such as assembled component architecture to operate in accordance with the best mode of the invention contemplated by the inventor, the detailed programming, or software, that is stored in the read only memory of the present invention will now be described. In addition, to more fully enable those familiar with the art to which the present invention pertains, to make and use the invention and to comprehend the interaction of the software and hardware comprising the invention, a detailed description of the operation of the invention, in conjunction with the flow chart figures of FIG. 11 through 22, is also provided below.

Table III of the appendix hereto is a comprehensive listing of the main computer program utilized in the present invention, including the subroutines which form a part of that program. Although the program is self explanatory, and will be readily understood by those familiar with the programming art, the following brief explanation of the contents of Table III will further expedite a full understanding of the program.

The listing of the program in Table III is provided in seven (7) columns which, from left to right, are the following: The left-most column is the statement number, which, as is well known in the programming art, merely provides a sequential listing of the statement lines comprising the program for convenient use of the listing. The second column to the right of the statement number column is a four (4) place instruction address which is a hexadecimal representation of the sixteen (16) binary bits comprising the contents of the microprocessor address bus MAB during system operation in carrying out the instruction, or instructions, corresponding to the statement line. Accordingly, the instruction address represents, in hexadecimal form, the binary logic state of the sixteen (16) address signals A0 ... A15 applied to the read only memory MEM2 of the system as previously discussed in conjunction with FIG. 4.

Each source statement in Table III may represent one, two or three microprocessor instruction bytes. For example, for the statement number 244, the instruction address is 0898 and corresponds in this case to a single instruction byte. It is well known that a byte is usually defined as half of the number of bits of a full word. In this embodiment the term "byte" means bits which equals two hexadecimal digits. The fact that this is a single instruction byte may be readily observed by noting that the immediately following statement number, namely 245, corresponds to the next instruction address in sequence, namely, 0899. However, in response to the instruction address 0899, three instruction bytes are used to execute the instruction. This may be observed by noting that the next instruction address in the sequence corresponding to statement number 246 is 089C which those familiar with hexadecimal format will understand, is in effect, spaced three (3) instruction address sequence numbers away from the prior instruction address 0899 on statement number 246. When an instruction address corresponds to more than one instruction byte to be carried out in the system operation corresponding to the statement line in the program, that instruction address is only the first of either two (2) or three (3) such bytes. The second and third instruction bytes are read in response to the generation of the subsequent instruction byte addresses in sequence which are not separately listed in the program of Table III.

The above will be better understood in reference to the third column of the program listing of Table III which may comprise two (2), four (4) or six (6) hexadecimal digits. For example, referring back to statement number 244 and the corresponding instruction address 0898, it will be seen that in the instruction column only two (2) digits are shown, namely 36. This number, 36, represents in hexadecimal format the eight (8) bits which comprise the eight (8) signals appearing at the output of the addressed read only memory device at terminals D0 through D7. Accordingly, the program operation carried out in response to the source statement at statement number 244, results in the generation of only one instruction byte. However, the following source statement line, namely, that corresponding to the statement number 245, has three (3) groups of eight (8) binary signals generated in response to the instruction address 0899. However, in this case, 0899 is only the first address of the first byte corresponding to the source line statement number 245. Implied therein are the two additional byte addresses, namely, 089A and 089B. The resulting binary signal output generated from the addressed ROM for each of these two sequential instruction addresses is OC and 01, respectively.

In other words, the first byte (first two hexadecimal digits) in an instruction corresponding to a source statement line in Table III, indicates to the MPU whether one or two additional bytes follow. These additional instruction bytes may be a constant or a memory address to which an instruction pertains. the MPU sequentially accesses these additional bytes as part of the instruction.

It will now be observed that by means of the listing of the program provided in Table III, one may readily learn the contents of the read only memory devices comprising MEM2 of the system.

The fourth column from left to right, is a column of labels which correspond to either a numerical value or a memory location. The use of labels as references to memory, permits programming without using specific numerical memory addresses. For example, labels are required for source statements that are the destination of jump and branch instructions. The label BEGIN 1 may identify the statement as the destination of a brach or jump instruction located elsewhere in the program. That instruction will in turn have the term BEGIN 1 in its OPERAND column to be discussed below. Labels may be up to six (6) characters long and may use any alphanumeric combination as long as the first character is alphabetic. Three signle character labels namely, A, B, and X, are reserved for referring to the microprocessor accumulators A and B and its index register, respectively. Incidentally, the accumulators and internal registers of the MC6800 MPU are discussed in the aforementioned 1975 Motorola reference at page 1–10 thereof.

The fifth column is used to indicate the operator-instruction or directive mnenonic. Up to four (4) alphanumerics may be used in this column. By way of example, LDAA is a four (4) letter mnenonic which indicates that the current OPERAND is to load the A accumulator of the microprocessor.

The next column in Table III is called the OPERAND field. This field may contain up to eight (8) numerical values, labels, or algebriac expressions. Such expressions can include arithmetic operators such as addition, subtraction, multiplication and division or a numerical value that may, for example, correspond to a memory location used in an addressing mode that involves an additional numerical address such as in indexed or extended addressing.

The last column to the right in Table III is reserved for comments. Comments are utilized during programming to improve understanding of the program by providing an indication of the purpose of each of the instructions or statements.

Because flow charts and computer listings, particularly for the commonly used Motorola MC6800 microprocessor system, are well known in the art, it is not necessary to describe in full all the flow charts of FIGS. 11 through 22 or the entire listing in Table III. However, for purposes of providing a more complete description of the present invention and to further enable complete understanding of FIGS. 11 through 22 and the corresponding listing of Table III, a portion of the listing of Table III and the corresponding flow chart of FIG. 18 will now be described by way of illustrative example.

Reference will be had now to FIG. 18 which is the flow chart for the scan keyboard subroutine SCANK and concurrently to Table III, line numbers 1437 through 1458, which include the program subroutine statements for the SCANK subroutine.

The SCANK subroutine begins with the statement at line 1443 wherein it will be observed that the instruction address 0F50 which corresponds to the following binary logic state for the signals A15 through A0, namely, 0000111101010000. In response to this instruction address the programmable read only memories of memory device MEM2 will have already been programmed to generate the data output corresponding to the hexadecimal representation B6. B6 corresponds to binary signals appearing upon the microprocessor data bus MCB, lines D7 through D0 as follows: 10110110. Similarly, the implied subsequent instruction byte addresses 0F51 and 0F52, result, respectively, in hexadecimal data output signals 04 and 06 in the three-instruction byte sequence corresponding to statement line number 1443.

As indicated in Table III, a label is used at this point, namely, the label SCANK so that the scan keyboard interrupt subroutine may be branched to or jumped to in response to a keyboard interrupt signal through the PIA from another point in the program by simply referring to the SCANK label in lieu of the actual instruction address 0F50. The instruction carried out in response to the statement at line number 1443, is the loading of the A accumulator, one of the two accumulators internal to the MPU. This instruction is represented by the mnemonic LDAA. The operand KBD indicates that it is the keyboard data which is loaded into register A and as indicated in the comments portion of Table III for line number 1443, the instruction carried out is for the process of obtaining the data available at the keyboard by means of the peripheral interface adapter PIA. The corresponding flow chart is indicated in FIG. 18. In the first rectangular block it is indicated that the operation is to get the data from the keyboard by reading the peripheral interface adapter.

The way the present system is configured, each keyboard scan occurs at the occurrence of a change in the signal applied from timer 74 to the PIA input terminal 40 as shown previously in FIG. 10. Thus the SCANK subroutine occurs periodically with a period of one (1) millisecond which is dependent upon the frequency of the timer signal generated by real time clock 74, shown in block diagram form in FIG. 4. Each time the scan of the keyboard is performed, a flag, consisting of 8 bits and called S flag which is internal to the RAM memory, is set if when the keyboard is tested to determine whether or not any of the keys have been depressed, a key has in fact been depressed and the S flag is not yet set. It is the function of the SCANK subroutine to determine whether or not there are any depressed keys. As previously discussed in conjunction with Table II, only seven (7) data lines are used to report keyboard status to the peripheral interface adapter PIA. Accordingly, before testing the PIA register to determine whether or not any of the keyboard keys have been depressed, the A accumulator contents are shifted to the right so that only the most significant seven (7) bits are tested. This is accomplished by the LSRA, a shift right logic instruction which is shown on statement line number 1444. On the following statement, line number 1445, the contents of the A accumulator are tested by comparing them with seven (7) binary ones that form a constant inherent in the instruction byte, namely 7F.

The comparison of the contents of the A accumulator, is accomplished by the dual instruction bytes generated by a sequential presentation of instruction addresses 0F54 and 0F55, both of which are implied by line statement number 1445. The comparison is denoted by the instruction mnemonic CMPA which results in the comparison of the contents of the previously loaded accumulator with the constant 7F.

The operand of the statement corresponding to statement number 1445 is the four (4) digit term #$7F. The pound sign specifies the immediate mode of addressing, (meaning the constant 7F is part of the instruction), the dollar sign specifies that the number following the $ in the operand is a hexadecimal number and the 7F is the hexadecimal number which is all ones which comprises the comparison mask to test the keyboard.

The test of the keyboard is indicated by the top-most diamond in the flow chart of FIG. 8, wherein it is indicated that the operation being conducted is the decision operation which asks the question "Is data equal to all ones?". As is well known in the art, the decision process involves a branch operation depending upon the outcome of the test. Accordingly, the next operation of the program, which corresponds to the statement at line number 1446, is a branch if not equal to zero (0) instruction BNE. In this case the number being tested for being equal to zero (0) is the result of the comparison between the contents of the A accumulator and seven (7) ones. If none of the keyboard keys is being depressed, the logic levels transferred to the corresponding input lines of the PIA, are all equal to one (1) and the comparison process between the signals generated by the keyboard and available at the registers of the PIA and the seven (7) ones, results in a zero (0) indicating that none of the keys is depressed at that time (i.e., a previously depessed key has been released). As a result, there is no branch operation and the next statement in the routine, namely, CLR is designed to clear the S flag to indicate a released key. The S flag will have been previously set by the scan operation when it was detected a key was depressed. The S flag clear operation is accomplished by the instructions corresponding to line number 1447, and then returns the program from the SCANK subroutine to the point left previously in the program by means of the RTS instruction.

The S flag is cleared to indicate that there need not be any further wait to determine whether a previously depressed key has been released. On the other hand, if the comparison process results in a non-zero answer, the subroutine SCANK branches to the program sequence beginning with the label KEY, commencing with the statement at line 1450.

The first operation in the portion of the SCANK subroutine labeled KEY, is a test of the S flag the logic of which indicates whether or not release of a previously depressed key is still being awaited. This is reflected in the flow chart by the second diamond operation of FIG. 18 which again calls for a branch operation depending upon the outcome of the test corresponding to the instructions performed by the statement at line number 1450. Only if the previously depressed key has been released would the character corresponding to the depressed key be stored. Accordingly, as noted in the statement at line number 1451, if the S flag tested in the previous statement is set to the logic level indicating that the key release has not occurred, the program branches to the statement labeled SC1 which is a return from subroutine instruction the effect of which is identical to the RTS instruction discussed previously in conjunction with the statement at line number 1448.

On the other hand, if the S flag, tested during the operation corresponding to the statement at line number 1450, indicates that the previously depressed key has been released, the program continues with the statement at line number 1452. The latter statement is a store accumulator statement wherein the contents of the A accumulator are used to set the S flag by being transferred to the allocated portion of a random access memory device in memory MEM1. It will be recalled at this point that the contents of the A accumulator must be non-zero corresponding to the seven (7) bit binary representation of the key that has been depressed. Accordingly, the instruction carried in response to the statement at line number 1452 sets the S flag which in effect indicates during subsequent scan subroutines that a new character cannot be saved until the presently depressed key has been released. The following instruction, corresponding to statement line number 1453, then increments and thus sets a new character flag indicating that a new character has been received. Finally, the contents of the A accumulator, which indicate the value of the depressed key, are stored in an appropriate portion of the random access memory device MEM1 and the program SCANK subroutine terminates at statement line number 1455, which is a return from the subroutine. The corresponding operations, namely, that of setting the two (2) flags, saving the new character and returning from the subroutine are indicated in the lower most portion of FIG. 18.

Now that the hardware and software of the present invention has been described in sufficient detail to enable those familiar with the art to make and use the present invention, typical operation of the invention will be discussed to enable the reader hereof to be more fully appraised of the advantageous use thereof.

In typical operation, the student first pressed the RESET key on keyboard 16. The system is then ready to accept parameters comprising the limits and the type of problem. There are two types of parameters to be set by the student. The first type of parameter uses some numerical value associated with it. For example, these parameters include the limit keys, the number of problems key and the time key. The second type of parameters have no value associated with them but indicate the type of operation to be performed. For example, these are employed by means of depressing the TEST, ADD, MULT, SUB, DIV, and WRONG AGAIN keys. No numbers are entered immediately before these keys are depressed.

To set the parameters associated with numbers, the student first depresses keys corresponding to the desired number associated with a particular parameter and then the associated parameter key is depressed. for example, to set the number of problems in a problem set to 10, which implies the use of the invention in the problem mode, the student depresses the one (1) and the zero (0) on keyboard 16 resulting in the display of the number ten (10) on display line one (1). The student then depresses the number of problems button. As a result, the number of problems is set to the parameter ten (10). The display is cleared after the parameter button is pushed. In the use of the keys corresponding to the second type of parameter, namely, those with which no number is associated, the student merely depresses the appropriate key at the appropriate time. For example, by depressing the ADD key, the operation presented to the student will be addition. Depression of the latter type of functional keys results in no display. It is to be noted that parameters can be entered in the present invention in any order, that is, there is no restriction on which parameter should be entered first, and a parameter can be changed merely by reentering it.

In order to more fully understand operation of the present invention, it is assumed that the following use is contemplated by a student: He wishes to practice addition by means of fifteen (15) problems of which no number is below five (5) of either of the two numbers given in each problem. He also wishes to restrict one of the two potential numbers of each problem to a maximum of twenty (20) and the other to a maximum of fifteen (15). In addition, he desires that one number always be multiples of two (2).

To enter these parameters for the problem set, the student would perform the following: First he would depress the ADD key to indicate that the invention is to be used for practice of addition problems, he would then depress the numbers one (1) and five (5), in that sequence, in response to which the top display, namely display line one (1) of display 14 will indicate a fifteen (15) has been entered. He would then depress the number of problems key, in response to which the display will go dark and the number of problems for that particular problem set will have been established. He will then depress the number five (5) key in response to which the number five (5) will appear on the top display line. He will then depress the lower limit number one (1) button to establish the number five (5) as the lowest number that may be used for at least one (1) number of the two (2) numbers given in each problem. He will repeat this process, namely, depressing the number five (5) key for the lower limit number two (2) button which will also establish the number five (5) for the second number for each problem in the problem set. He will then depress the two (2) and zero (0) keys and the upper limit number one (1) key to enter twenty (20) as the highest number for one set of numbers in the problem and repeat the process for the number fifteen (15) for upper limit number two (2) key.

Finally, he will establish the factor number relationship desired by depressing the key number one (1) and factor number one (1) for one (1) set of numbers and the key number two (2) and the factor number two (2) button for the other set of numbers. The result will be the setting of the parameters to be followed by the present invention during the ensuing test which the student may they initiate by depressing the TEST button.

When the TEST button has been depressed, a problem will immediately appear. For multiplication, addition and subtraction problems the two (2) numbers for a problem will appear on display lines 1 and 2 of display 14 (see FIG. 2). For division problems the two numbers will appear on display lines 3 and 4 of display 14 (see FIG. 2). The student then enters his proposed answer by using numeric keys. Each time the student feels his answer is ready to be evaluated, he pushes the E key to enter the proposed problem solution. Should the student make an error in entering his answer before pushing the E key, that is, an error in his own mind resulting from inadvertent depression of the key he hadn't planned on depressing, he may depress the C button to clear his answer and reenter his proposed solution.

After the student has entered his answer by pushing the appropriate numerical keys and the E button, one of two ensuing events will occur. If the student has determined that he wishes to operate the invention in its problem mode by depressing the number of problems key at the beginning of parameter entry, the time the student had taken to answer the presented problems will be displayed on the time display line shown in the upper left hand corner of display 14 in FIG. 2. In addition, if the problem was answered incorrectly, the wrong answer will flash on and off. Whatever, the result, to obtain presentation of the next problem in the problem set and in the problem mode, the student then depresses the E key again.

On the other hand, if the student has decided on use of the invention in the flashcard mode by entering a desired time interval and depressing the TIME key during the parameter entry, the next problem will be given immediately if the previous problem was answered correctly. However, if the previous problem had been answered incorrectly, the wrong answer will flash on and off twice before the subsequent problem is automatically presented to the student.

At the end of a test, which occurs either when the number of problems given equals the number of problems sought by the student in the problem mode, or if in the flashcard mode, when the allowed time for the test has expired, statistics showing the student's performance are then displayed. The percentage of correct answers, namely, the number of correct answers divided by the number of total problems presented, is displayed in display line 1 as a percentage. If the student's percentage of correct answers is ninety (90) percent or greater, the correct answer percentage will flash on and off. This feature is an extra incentive for the student to perform well to achieve the required ninety (90) percent or greater to cause the resultant statistics display to include an on and off flash. In addition, the total elapsed time the student had taken to complete the problem set will be displayed in seconds in display line 3. The average response time, in tenths of seconds, for the student to provide the correct answer to each problem will be presented in the time display line and the total number of problems presented to the student will also be displayed in display line 4.

At the completion of a test, the invention is in a mode suitable for entry of new parameters for a new test. In this mode, depression of any key will clear the display of the previously indicated statistics for the prior problem set. For example, if at this point, a numerical key number one (1) is depressed, the statistics will disappear from the display and the corresponding number one (1) will appear on the top display line. However, before this occurs at the end of a test, all parameters remain intact, that it, none of the parameters is changed from when it was last entered. Any number of parameters can be changed, including none of them. This feature is particularly useful when several students are to use the same problem parameters, thereby saving the teacher the additional effort of reentering the parameters for each student. Thus the TEST key can be depressed immediately after a first test is given to a student so that the same test parameters can be utilized in a subsequent test for a new student.

Some interesting additional aspects of the present invention can be utilized in certain circumstances. For example, by making one set of upper and lower limits, (upper limit number one (1) and lower limit number one (1)) equal to the same number, will fix one (1) of the numbers in a problem set to a constant for the entire test. For example, if the upper limit number one (1) and lower limit number one (1) were both set equal to five (5), the five (5) will always be one of the numbers in a problem set. This feature permits multiplication tables to be exercised and also permits the student to concentrate on a particular set of problems dealing with number relationships involving a constant.

Another example of such interesting effects is the use of the WRONG AGAIN key. After a student has completed a problem or flashcard test, he may depress the WRONG AGAIN key which will, when followed by depression of the TEST key, result in presentation of the incorrectly answered problems from the previous test. He may repeat this until he has answered all the presented problems correctly so that a particular problem set may be re-presented to a student with the correct answers omitted so that he may eventually gain the confidence of having answered one hundred (100) percent of the problems correctly. In addition, the use of the WRONG AGAIN key provides a built-in retest function for those problems with which a student has the most difficulty.

It will now be apparent that what has been disclosed herein is a unique calculator-type educational device for teaching arithmetic and which provides unique new features to motivate the student to greater learning progress. Such new features include means for reporting to the student his arithmetic proficiency by means of post-test statistics. It will also be apparent that the present invention includes certain features that enhance the teacher-student interaction whereby certain teacher defined limits may be established to further improve the proficiency of the student in solving arithmetic problems in a classroom environment.

Of particular importance in regard to advancement over prior art calculator type teaching aids are those features of the present invention which enhance the rate of a student learning by providing the student with variety in a dual mode of operation, namely, a problem mode and a flashcard mode, and means to gradually increase the scope of complexity of the problems presented to the student as his proficiency increases. The motivation for learning arithmetic provided by the present invention, further enhances the liklihood of continued student interest and learning progress.

A preferred embodiment for practicing the invention in the best mode presently contemplated by the applicant, has been disclosed as a microprocessor based system in a desk-type calculator configuration. Of course, it will now be apparent to those familiar with the art that the present invention is not limited to the embodiment disclosed and that many modifications and additions may be made within the scope of the invention. By way of example, it will now be apparent to those familiar with the art that the invention may be implemented in a portable hand-held type calculator configuration utilizing the latest state of the art in large scale integration that is more readily implemented in high density, smaller volume packages. In addition it will be noted that although a particular microprocessor and associated electronics have been disclosed herein, many microprocessor based systems, utilizing a variety of computer architectures, word lengths, and timing, may be readily substituted as equivalents for the embodiment herein disclosed. It will therefore be apparent that the subject invention is not to be limited except by way of the appended claims in which:

APPENDIX

TABLE III

```
 1
 2
 3      ****************************************************************
 4      *
 5      *
 6      *      6802 CONTROLLED MATH DRILLER
 7      *
 8      *
 9      *                              WRITTEN BY:  RANDY WEBER
10      *                                           MARCH 1,1978
11      *
12      ****************************************************************
13      *
14      *CONSTANTS:
15      *
16
17  0404    PIA      EQU    $404            *PIA STARTING ADDRESS
18  0014    DIGITS   EQU    20              *# OF DIGITS MULTIPLEXING
19  01F4    P5       EQU    500             *.5 SECONDS TIMEOUT CONSTANT
20  1388    S5CS     EQU    5000            *5 SECOND TIMEOUT CONSTANT
21  0406    KBD      EQU    PIA+2           *SECTION B DATA REG IS KEYBARD
22  0404    MUXOUT   EQU    PIA             *SECTION A DATA REG IS DIGIT SCAN LINES
23  0405    CNTRLA   EQU    PIA+1           *SECTION A CONTROL REG
24  0407    CNTRLB   EQU    PIA+3           *SECTION B CONTROL REG
25  00FF    MASKA    EQU    %11111111       *SECTION A DIRECTION REG MASK
26  0001    MASKB    EQU    %00000001       SECTION B DIRECTION REG MASK
27  004C    K        EQU    $4C             *RANDOM NUMBER GENERATOR CONSTANT
28  0010    C        EQU    $10
29  001C    ENTER    EQU    $1C
30  006F    CLEAR    EQU    $6F
31  0078    MAXPROB  EQU    120
32  0054    KUBND1   EQU    $54             UPPER BOUND FOR #1 RANDOM NUMBER
33  0064    KLBND1   EQU    $64             LOWER BOUND FOR #1 RANDOM NUMBER
34  0058    KUBND2   EQU    $58             UPPER BOUND FOR #2 RANDOM NUMBER
35  0068    KLBND2   EQU    $68             LOWER BOUND FOR #2 RANDOM NUMBER
36  0044    KTIME    EQU    $44             TIME ALLOWED FOR PROBLEM SET
37  0048    KNPROBS  EQU    $48                 NUMBER OF PROBLEMS PARAMETER BUTTON
38  0021    KADD     EQU    $21                 ADD OPERATOR PARAMETER BUTTON
39  0022    KSUB     EQU    $22                 SUBTRACT OPERATOR PARM BUTTON
40  0028    KMULT    EQU    $28                 MULTIPLY OPERATOR PARM. BUTTON
41  0024    KDIV     EQU    $24                 DIVIDE OPERATOR PARM. BUTTON
42  0051    KWIKOF   EQU    $51
43  0041    KTST1    EQU    $41             START TEST #1
44  0080    NOVAL    EQU    $80
45  0052    KFACT1   EQU    $52             FACTOR FOR LIMITS #1
46  0062    KFACT2   EQU    $62             FACTOR FOR LIMITS #2
47      ****************************************************************
48      ****************************************************************
49      *
50      *     RAM CONSTANTS AND ALLOCATIONS
51      *
52      ****************************************************************
53      *
54  0000             ORG    $0
55  0000    DTIME    EQU    *
56  0000    MUXTBL   RMB    1               *LS DIGIT OF TIME
57  0001             RMB    1
58  0002    LAST3    RMB    1               *MS DIGIT OF TIME
59  0003             RMB    1               *LS DIGIT OF TOP DISPLAY
60  0004             RMB    2
61  0006    LAST4A   RMB    1               *MS DIGIT OF TOP DISPLAY
62  0007             RMB    1               *LS DIGIT OF MIDDLE DISPLAY
63  0008             RMB    2
64  000A    LAST4B   RMB    1               *MS DIGIT OF MIDDLE DISPLAY
65  000B             RMB    1               *LS DIGIT OF SIDE DISPLAY
66  000C             RMB    2
67  000E    LAST4C   RMB    1               *MS DIGIT OF SIDE DISPLAY
68  000F             RMB    1               *LS DIGIT OF BOTTOM DISPLAY
69  0010             RMB    3
70  0013    LAST5    RMB    1               *MS DIGIT OF BOTTOM DISPLAY
71                                               *TEMP LOC FOR X REG
72  0014    SAVEX    RMB    2               *ANOTHER TEMP FOR X
73  0016    SAVEX1   RMB    2               *AND YET ANOTHER
74  0018    SAVEX2   RMB    2
75  001A    SAVEY3   RMB    2               *SAVE FOR B REG
76  001C    SAVEB    RMB    1               *SAVE FOR A REG
77  001D    SAVEA    RMB    1               *CURRENT VALUE OF KEY BEING SCANED
78  001E    KEYV     RMB    1               *FLAG TO WAIT FOR KEY TO BE RELEASED
79  001F    SFLAG    RMB    1               *NEW CHAR FLAG
80  0020    NWCH     RMB    1               *CHARACTER VALUE
81  0021    CHAR     RMB    1               *LAST RANDOM NUMBER
82  0022    LASTA    RMB    1
```

TABLE III (CONT.)

```
 83  0023              LAST4     RMB    1              *DITTO
 84  0024              BOUND1    EQU    *              FIRST RANDOM #'S BOUNDS
 85  0024              UBOUN1    RMB    2              UPPER BOUND FOR #1 RAMDOM #
 86  0026              FACT1     RMB    2              FACTOR FOR BOUND 1
 87  0028              LBOUN1    RMB    2              LOWER BOUND FOR #1 RAMDOM #
 88  002A              BOUND2    EQU    *              SECOND RANDOM #'S POUNDS
 89  002A              UBOUN2    RMB    2
 90  002C              FACT2     RMB    2              FACTOR FOR BOUND 2
 91  002E              LBOUN2    RMB    2
 92  0030              TCOUNT    RMB    1
 93  0031              ELT       RMB    2              ELASPED TIME
 94  0033              ELTMS     RMB    2              ELASPED TIME IN MILISECONDS
 95  0035              ALTIME    RMB    2              ALLOWABLE TIME
 96  0037              LMAX      RMB    1              LENGTH OF TABLE TO SEARCH FOR DOING LAST P.S. WRONG PROBS
 97  0038              TPMAX     RMB    1
 98  0039              WPROB     RMB    1
 99  003A              INTR      RMB    1              INTERRUPT FLAG
100  003B              STOPT     RMB    2              CURRENT ELASPED TIME
101  003D              STIME     RMB    2              PROBLEM SET ALLOWABLE TIME
102  003F              AVTIME    RMB    2              AVERAGE TIME SPENT ON A PROBLEM
103  0041              TIMEU     RMB    1                  *UPPER 8 BITS OF TIME
104  0042              TIMEL     RMB    1                  *LOWER 8 BITS OF TIME
105  0043              ANSWER    RMB    2                  *ADDRESS OF ANSWER DISPLAY
106  0045              TOPANS    RMB    2                  *TOP OF ANSWER
107  0047              MUXD      RMB    1                  *DISPLACEMENT OF CURRENT DISPLAYED DIGIT
108  0048              IN1       RMB    2                  *FIRST NUMBER OF PROBLEM IN BINARY
109  004A              IN2       RMB    2                  *SECOND NUM OF PROB IN BINARY
110  004C              ANS       RMB    2                  *ANSWER OF PROB IN BINARY
111  004E              OPR       RMB    1              OPERATOR TYPE
112  004F              PCOUNT    RMB    1              PROBLEM COUNT
113  0050              DECS      RMB    5                  *DECIMAL ADJUST STORAGE
114  0055              REM       RMB    2              REMAINDER FROM DIVIDE
115  0057              DISP      RMB    2
116  0059              DISP1     RMB    2
117  005B              PROBD     RMB    2              PROBLEM DISP IN PROBLEM TABLE
118  005D                        RMB    1              KEEP CONSISTANT FOR WPRAM
119  005E              PMAX      RMB    1              NUMBER OF PROBLEMS PARAMETER
120  005F              PVAL      RMB    2              STORAGE FOR CONVERTING DEC TO BIN
121  0061              FDS       RMB    5              FLASHING DIGIT STORAGE
122  0066              LZFLAG    RMB    1              LEADING ZEROS FLAG
123  0067              CORR      RMB    1              NUMBER OF CORRECT ANSWERS
124  0068              WRON      RMB    1              NUMBER OF WRONG ANSWERS
125  0069              M32       RMB    2              TOP 16 BITS OF MULTIPLY RESULT
126  006B              PTABLE    RMB    MAXPROB*7      PROBLEM SET SPACE
127  03B3              STACK     RMB    31             STACK AREA
128  03D2              ENDRAM    EQU    *
129  0003              TOP       EQU    LAST3+1
130  0007              MIDDLE    EQU    LAST4A+1
131  000F              BOTTOM    EQU    LAST4C+1
132  000B              SIDE      EQU    LAST4B+1
133
134  *************************************************************
135  *************************************************************
136  *
137  *        PROM CONSTANTS:
138  *
139  *************************************************************
140  *
141  0800                        ORG    $800
142
143  0800  7E 09 2B              JMP    RESTART        RESET INTERRUPT VECTOR
144  0803  7E 08 03              JMP    *              NMI INTERRUPT VECTOR
145  0806  7E 08 0E              JMP    *              SOFTWARE INTERRUPT VECTOR
146  0809  7E 0F 69              JMP    CLOCK          IRQ INTERRUPT VECOR (RTC TICKED)
147
148  080C  00        INTABLE     FCB    0              DATA
149  080D  04 05                 FDB    CNTRLA         ADDRESS
150  080F  FF                    FCB    MASKA
151  0810  04 04                 FDB    CNTRLA-1
152  0812  07                    FCB    7
153  0813  04 05                 FDB    CNTRLA
154  0815  00                    FCB    0
155  0816  04 07                 FDB    CNTRLB
156  0818  01                    FCB    MASKB
157  0819  04 06                 FDB    CNTRLB-1
158  081B  04                    FCB    4
159  081C  04 07                 FDB    CNTRLB
160  081E  0A                    FCB    10             10 PROBLEMS IS DEFALT
161  081F  00 5D                 FDB    PMAX-1         MAX # OF PROBS TO GIVE DEFALT-MAXPROB
162  0821  01                    FCB    1
163  0822  00 26                 FDB    FACT1
164  0824  01                    FCB    1
165  0825  00 2C                 FDB    FACT2          FACTOR OF 1 IS DEFALT
166  0827                        RMB    1
167  0828  FF FF                 FDB    -1             *END OF INIT TABLE
168
169  *************************************************************
170  *
171  *        FORMAT FOR STORING PROBLEM SET
172  *
173  *        BYTE 0   =     MS BYTE FIRST NUMBER OF PROBLEM (IN BINARY)
174  *        BYTE 1   =     LS BYTE FIRST NUMBER OF PROBLEM (IN BINARY)
175  *        BYTE 2   =     MS BYTE SECOND NUMBER
176  *        BYTE 3   =     LS BYTE SECOND NUMBER
177  *        BYTE 4   =     OPERATOR TYPE: 0=ADD;1=SUB;2=MULT;3=DIV
178  *        BYTE 5   =     MS BYTE OF ANSWER (IN BINARY)
179  *        BYTE 6   =     LS BYTE OF ANSWER
180  *
181  *************************************************************
182  *
```

TABLE III (CONT.)

```
183         ******************************************************
184         *
185         *   ATEST -- DO ONE PROBLEM OUT OF PROBLEM SET
186         *
187         ******************************************************
188         *
189  082A  DE 5B      ATEST  LDX   PROBD      GET ADDRESS OF NEXT PROB IN TABLE
190  082C  A6 00             LDAA  0,X        GET FIRST NUMBER AND SAVE
191  082E  97 48             STAA  IN1
192  0830  A6 01             LDAA  1,X
193  0832  97 49             STAA  IN1+1
194  0834  A6 02             LDAA  2,X
195  0836  97 4A             STAA  IN2
196  0838  A6 03             LDAA  3,X
197  083A  97 4B             STAA  IN2+1
198  083C  A6 04             LDAA  4,X
199  083E  97 4E             STAA  OPR        SAVE OPERATOR
200  0840  A6 05             LDAA  5,X
201  0842  97 4C             STAA  ANS
202  0844  A6 06             LDAA  6,X
203  0846  97 4D             STAA  ANS+1
204  0848  96 4E             LDAA  OPR
205  084A  84 03             ANDA  #3         JUST LAST 2 BITS
206  084C  48                ASLA             TABLE IS IN WORD FORMAT
207  084D  CE 08 D1          LDX   #DISTBL    GET ADDR OF TABLE
208  0850  BD 0C 48          JSR   LDIXX      LOAD INDEXED: X <---- (X+A)
209  0853  DF 1A             STX   SAVEX3
210  0855  EE 00             LDX   0,X        GET ADR OF WHERE TO PUT RESULT
211  0857  96 48             LDAA  IN1
212  0859  D6 49             LDAB  IN1+1      GET THE FIRST NUMBER...
213  085B  BD 0D E4          JSR   DADJ       ..AND MAKE INTO DECIMAL AND DISPLAY IT
214  085E  DE 1A             LDX   SAVEX3     GET TABLE ADR+1, WHICH IS NEXT DISPLAY LOC
215  0860  08                INX
216  0861  08                INX              POINT TO NEXT ADDR OF WHAT NEXT DISPLAY ADDR WILL BE
217  0862  EE 00             LDX   0,X        GET WHERE TO PUT SECOND NUMBER
218  0864  96 4A             LDAA  IN2
219  0866  D6 4B             LDAB  IN2+1      GET SECOND NUMBER
220  0868  BD 0D E4          JSR   DADJ       CONVERT TO DECIMAL AND DISPLAY
221  086B  DE 1A             LDX   SAVEX3
222  086D  08                INX
223  086E  08                INX
224  086F  08                INX              POINT TO ADDR WHICH HAS ANSWER ADDRESS
225  0870  08                INX
226  0871  EE 00             LDX   0,X        WHERE ANSWER DISPLAY IS AT
227  0873  DF 43             STX   ANSWER     SAVE FOR ANYONE WHO NEEDS IT
228  0875  BD 08 E5          JSR   CBTIME     CLEAR TIME, AND START THE CLOCK
229  0878  BD 0E 8C          JSR   GETANS     GET ANSWER FROM STUDENT
230  087B  BD 0C 7F          JSR   SHTIME     STOP CLOCK, AND SHOW ELASPED TIME
231  087E  BD 0E 82          JSR   CHKANS     CHECK THE ANSWER
232  0881  24 20             BCC   FLSH       B/PROBLEM WAS WRONG,FLASH DISPLAY TWICE
233  0883  7C 00 67          INC   CORR       INC # CORRECT
234  0886  DE 5B             LDX   PROBD      GET LOCATION OF PROB IN TABLE
235  0888  A6 04             LDAA  4,X        GET OPERATOR TYPE
236  088A  84 03             ANDA  #3         MAKE SURE JUST LOWER 2 BITS THERE
237  088C  A7 04             STAA  4,X        AND PUT BACK INTO TABLE
238  088E  DE 35             LDX   ALTIME     IS THIS A TIMED TEST?
239  0890  26 03             BNE   NOWAIT     B/YES, DON'T WAIT FOR SECOND RETURN
240  0892  BD 0B F7          JSR   WAITRET
241  0895  39         NOWAIT RTS              EXIT HOME
242
243  0896  DE 43      F2     LDX   ANSWER     WHERE TO FLASH DIGITS
244  0899  36                PSHA             SAVE # DIGITS TO FLASH
245  089A  BD 0C 01          JSR   FDIGITS    FLASH THE DISPAY ONCE
246  089C  32                PULA             GET BACK # DIGITS TO FLASH
247  089D  DE 43             LDX   ANSWER     WHERE TO FLASH
248  089F  BD 0C 01          JSR   FDIGITS    AND FLASH AGAIN
249  08A2  39                RTS
250  08A3  7C 00 68   FLSH   INC   WRON       INC # WRONG ANSWERS
251  08A6  DE 5B             LDX   PROBD      GET LOCATION OF PROB IN TABLE
252  08A8  A6 04             LDAA  4,X        GET OPERATOR TYPE
253  08AA  84 03             ANDA  #3         JUST LOWER 2 BITS
254  08AC  8B 04             ADDA  #4         SET BIT SAYING THIS PROB WAS WRONG
255  08AE  A7 04             STAA  4,X        AND PUT BACK INTO TABLE
256  08B0  96 39             LDAA  #PROB      ARE WE DOING PREVIOUS P.S.'S INCORRECT ANSWERS?
257  08B2  26 03             BNE   FLASH      B/YES. DON'T PUT INTO TABLE AGAIN
258  08B4  BD 0B F8          JSR   SAVEP      SAVE THE PROBLEM IN A TABLE
259  08B7  DE 43      FLASH  LDX   ANSWER     GET ADDR OF DISPLAY TO FLASH
260  08B9  86 04             LDAA  #4
261  08BB  8C 00 0F          CPX   #BOTTOM    ARE WE WORKING WITH 5 DIGIT ANSWER?
262  08BE  26 02             BNE   F1         B/NO, 4 DIGITS
263  08C0  86 05             LDAA  #5         YES, WE ARE.
264  08C2  DE 35      F1     LDX   ALTIME     IS THIS A TIMED TEST?
265  08C4  26 D0             BNE   F2         B/YES
266  08C6  DE 43             LDX   ANSWER     WHERE TO FLASH DIGITS
267  08C8  BD 0C 01          JSR   FDIGITS    FLASH DIGITS ON THEN OFF ONCE
268  08CB  BD 0A 96          JSR   CHKRET     CHECK TO SEE IF HE HIT ENTER KEY
269  08CE  24 E7             BCC   FLASH      B/NO, KEEP FLASHING
270  08D0  39                RTS              HE DID, LEAVE
271  08D1  08 D9      DISTBL FDB   ADTBL
272  08D3  08 D9             FDB   SBTBL
273  08D5  08 D9             FDB   MLTBL
274  08D7  08 DF             FDB   DVTBL
275
276  08D9       MLTBL  EQU   *
277  08D9       SBTBL  EQU   *
278  08D9  00 03 ADTBL FDB   TOP
279  08DB  00 07       FDB   MIDDLE
280  08DD  00 0F       FDB   BOTTOM
281
```

TABLE III (CONT.)

```
282  08DF  00 0F        DVTBL   FDB    BOTTOM
283  08E1  00 0B                FDB    SIDE
284  08E3  00 07                FDB    MIDDLE
285
286
287          *******************************
288          *
289          *    CLEAR AND BLANK TIME
290          *
291          *******************************
292          *
293  08E5  7F 00 41     CBTIME  CLR    TIMEU
294  08E8  7F 00 42             CLR    TIMEL
295  08EB  86 0F                LDAA   #$F
296  08ED  97 00                STAA   DTIME
297  08EF  97 01                STAA   DTIME+1
298  08F1  97 02                STAA   DTIME+2
299  08F3  DE 3B                LDX    STOPT         GET TIME REMAINING
300  08F5  DF 3D                STX    STIME         PUT INTO THE DYNAMIC COUNTER
301  08F7  39                   RTS
302
303          *
304          *
305          *
306  08F8  96 5B        SAVEP   LDAA   PROBD         GET CURRENT ADDR OF PROBLEM
307  08FA  D6 5C                LDAB   PROBD+1
308  08FC  CB 07                ADDB   #7            AND ADD 7 TO IT SO WE SAVE IT
309  08FE  89 00                ADCA   #0
310  0900  97 5B                STAA   PROBD
311  0902  D7 5C                STAB   PROBD+1
312  0904  39                   RTS
313          *******************************
314          *
315          *    INITIALIZER
316          *******************************
317          *
318  0905  01           INITZ   NOP                  *PREVENT TROUBLES
319  0906  0F                   SEI                  *NO INTERRUPTS
320  0907  CE 00 00             LDX    #0            *CLEAR X REG
321  090A  6F 00        I1      CLR    0,X           *CLEAR THAT LOCATION
322  090C  08                   INX                  *POINT TO NEXT LOCATION IN RAM
323  090D  8C 03 B3             CPX    #STACK        ARE WE DONE WITH WORKING RAM?
324  0910  26 F8                BNE    I1            *B/NO KEEP GOING
325  0912  CE 08 0C             LDX    #INTABLE      *GET ADDR OF INITIALIZATION TABLE
326  0915  DF 14        I2      STX    SAVEX         *SAVE ADDRESS OF TABLE ENTRY
327  0917  A6 00                LDAA   0,X           *GET DATA BYTE TO SAVE
328  0919  08                   INX                  *POINT TO ADDRESS TO PUT BYTE
329  091A  EE 00                LDX    0,X           *GET ADDR TO PUT BYTE INTO
330  091C  8C FF FF             CPX    #$FFFF        DONE?
331  091F  27 09                BEQ    I3            B/YES
332  0921  A7 00                STAA   0,X           *AND SAVE BYTE THERE
333  0923  DE 14                LDX    SAVEX         *GET BACK POINTER INTO TABLE
334  0925  08                   INX                  * AND POINT TO...
335  0926  08                   INX
336  0927  08                   INX                  *.. NEXT GROUP
337  0928  20 EB                BRA    I2            *KEEP GOING
338  092A  39           I3      RTS
339
340
341          ***********************************************
342          *
343          *    RESTART --- IT ALL BEGINS HERE
344          *
345          ***********************************************
346          *
347  092B  01           RESTART NOP
348  092C  0F                   SEI                  NO INTERRUPTS PLEASE
349  092D  8F 03 D?             LDS    #ENDRAM       GET A STACK
350  0930  BD 09 05             JSR    INITZ         INITIALIZE THE WORLD
351  0933  01                   NOP
352  0934  0E                   CLI                  OK TO DISPLAY NOTHING
353  0935  BD 0C 58     BEGIN   JSR    BLANK         CLEAR THE WORKS
354  0938  7F 00 3A             CLR    INTR          CLEAR INTERRUPT FLAG SAYING TIME IS UP
355  093B  7F 00 39             CLR    WPROB         CLEAR FLAG FOR DOING PREVIOUS P.S.'S WRONG PROBS
356  093E  BD 0A B9             JSR    WPRAM         GET WORKING LIMTS OR PARAMTERS
357  0941  CE 00 00             LDX    #0
358  0944  DF 3F                STX    AVTIME        CLEAR AVERAGE TIME/PROBLEM
359  0946  DF 31                STX    ELT           CLEAR ELASPED TIME
360  0948  DF 33                STX    ELTMS         CLEAR ELASPED TIME MILISECONDS
361  094A  7F 00 30             CLR    TCOUNT        CLEAR MILISECOND COUNTER
362  094D  CE 00 6B             LDX    #PTABLE       ADDRESS OF PROBLEM SET TABLE
363  0950  DF 5B                STX    PROBD         IS ADDR OF FIRST PROBLEM
364  0952  96 39                LDAA   WPROB         DOING LAST P.S.'S WRONG PROBLEMS?
365  0954  26 04                BNE    NONLIM        B/YES, NO NEW TPMAX SET
366  0956  96 5E                LDAA   PMAX          NUMBER OF PROBLEMS TO DO
367  0958  97 38                STAA   TPMAX         SAVE # PROBS IN TEMP, IT MAY CHANGE
368  095A  7F 00 67     NONLIM  CLR    CORR          CLEAR # PROBLEMS CORRECT
369  095D  7F 00 68     NOFT    CLR    WRON          CLEAR # WRONG
370  0960  96 38                LDAA   TPMAX         GET MAX # OF PROBLEMS
371  0962  D6 39                LDAB   WPROB         DO WRONG?
372  0964  27 02                BEQ    TMT
373  0966  96 37                LDAA   LMAX          GET LAST P.S. NUMBER WRONG
374  0968  97 4F        TMT     STAA   PCOUNT        SAVE IN DYNAMIC COUNTER
375  096A  96 4E                LDAA   OPR           GET OPERATOR TYPE
376  096C  85 20                BITA   #$20          ALREADY CALCULATE OPR TYPE?
377  096E  27 0B                BEQ    NOMAP         B/YES
378  0970  4A                   DECA
379  0971  84 07                ANDA   #7            GET JUST LOWER 3 BITS
380  0973  81 07                CMPA   #7
381  0975  26 02                BNE    NOMAP7
```

TABLE III (CONT.)

```
382  0977  86 02            LDAA   #2           MAP 7-->2
383  0979  97 4E    NOMAP7  STAA   OPR          SAVE OPERATOR TYPE
384  097B  DE 35    NOMAP   LDX    ALTIME       GET ALLOWED TIME FOR THIS PROB. SET
385  097D  DF 3B            STX    STOPT        PUT IN STOPED TIME REGISTER
386  097F  96 39            LDAA   WPROB        IS THIS A TEST OF THE PREVIOUS P.S.'S FAILURES?
387  0981  27 06            BEQ    LOOK1        B/NO, NO NEED TO CONTINUE CHECKING
388  0983  96 37            LDAA   LMAX         ANY PROBLEMS TO DO?
389  0985  27 AE            BEQ    BEGIN        B/NO, DON'T START TEST
390  0987  20 5B            BRA    CIF          JUST START GIVING PROBLEMS
391  0989  CE 00 24  LOOK1  LDX    #BOUND1      GET BOUNDS FOR THIS NUMBER
392  098C  BD 0B A6         JSR    GBRMD        GET BOUNDED RAMDOM NUMBER
393  098F  DE 5B            LDX    PROBD        GET LOC IN TABLE TO PUT PROBLEM
394  0991  A7 00            STAA   0,X          SAVE THE NUMBER
395  0993  E7 01            STAB   1,X
396  0995  97 48            STAA   IN1          AND FOR ARITHMETIC OPERATOR
397  0997  D7 49            STAB   IN1+1
398  0999  CE 00 2A  LOOK2  LDX    #BOUND2      GET BOUNDS FOR NUMBER
399  099C  BD 0B A6         JSR    GBRMD        GET BOUNDED RAMDOM NUMBER
400  099F  DE 5B            LDX    PROBD
401  09A1  A7 02            STAA   2,X
402  09A3  E7 03            STAB   3,X          SAVE IN PROBLEM TABLE
403  09A5  97 4A            STAA   IN2
404  09A7  D7 4B            STAB   IN2+1        AND FOR OPERATOR TO USE
405  09A9  96 4E            LDAA   OPR          GET OPERATOR
406  09AB  A7 04            STAA   4,X          AND SAVE IN PROB TABLE TOO
407  09AD  84 03            ANDA   #3           TAKE OFF TOP BITS
408  09AF  48              ASLA                TABLE IS IN WORD FORMAT
409  09B0  CE 0A 8E         LDX    #FTABLE      ADDR OF ARITH FUNCTS
410  09B3  BD 0C 48         JSR    LDIXX        GET (X+A) IN X
411  09B6  AD 00            JSR    0,X          AND GO THERE
412  09B8  25 02            BCS    POK          IF CARRY, THEN VALID RELATION, PUT IN PROB SET
413  09BA  20 CD            BRA    LOOK1        B/BAD RELATION BETWEEN NUMBERS, TRY AGAIN
414  09BC  DE 5B    POK     LDX    PROBD
415  09BE  A7 05            STAA   5,X          SAVE ANSWER IN PROB TABLE
416  09C0  E7 06            STAB   6,X
417  09C2  BD 08 2A  GTEST  JSR    ATEST        DO ONE PROBLEM
418  09C5  BD 0C 58         JSR    BLANK        CLEAR THE DISPLAY
419  09C8  96 39            LDAA   WPROB        ARE WE DOING LAST P.S.'S INCORRECT ANSWERED PROBLEMS?
420  09CA  27 22            BEQ    GTEST1       B/NO
421  09CC  96 5B    CTP     LDAA   PROBD        YES, ADD 7 TO PROBLEM TABLE ADDR
422  09CE  D6 5C            LDAB   PROBD+1
423  09D0  CB 07            ADDB   #7
424  09D2  89 00            ADCA   #0
425  09D4  97 5B            STAA   PROBD
426  09D6  D7 5C            STAB   PPOBD+1
427  09D8  7A 00 4F         DEC    PCOUNT
428  09DB  26 07            BNE    CIF          B/PROB SET NOT YET DONE
429  09DD  DE 35            LDX    ALTIME       IS THIS A TIMED TEST?(FLASHCARD MODE)
430  09DF  27 16            BEQ    PSDONF       B/NO, SHOW PROB SET STATISTICS
431  09E1  7E 0A A8         JMP    INTH         YES, DO PREMATURE TIME-OUT OF TEST
432  09E4  DF 5B    CIF     LDX    PROBD
433  09E6  A6 04            LDAA   4,X          GET OPERATOR VALUE
434  09E8  81 03            CMPA   #3           SEE IF THIS PROBLEM WAS WRONG
435  09EA  2F E0            BLE    CTP          B/NO, IT WAS CORRECT
436  09EC  20 D4            BRA    GTEST        DO SOME MORE PROBLEMS
437
438  09EE  DE 35    GTEST1  LDX    ALTIME       IS THIS A TIMED TEST?
439  09F0  26 97            BNE    LOOK1        B/YES, GET ANOTHER PROBLEM TO DO
440  09F2  7A 00 4F         DEC    PCOUNT       ONE PROB DOWN
441  09F5  2F 92            BNE    LOOK1        B/MORE TO DO
442  09F7  96 67    PSDONF  LDAA   CORR         GET # CORRECT ANSWERS
443  09F9  9B 68            ADDA   WRON         AND ADD # WRONG TO GET TOTAL # GIVEN
444  09FB  97 5E            STAA   PMAX         SAVE IN # PROBS GIVEN
445  09FD  7F 00 5D         CLR    PMAX-1       CLEAR UPPER BYTE
446  0A00  CE 00 5D         LDX    #PMAX-1      NUMBER OF PROBLEMS GIVEN
447  0A03  96 3F            LDAA   AVTIME       GET AVERAGE TIME
448  0A05  D6 40            LDAB   AVTIME+1
449  0A07  BD 0D 2B         JSR    DIV          AND GET AVERAGE TIME SPENT ON EACH PROB
450  0A0A  CE 00 00         LDX    #DTIME       WHERE TO PUT DECIMAL RESULT
451  0A0D  BD 0D E4         JSR    DADJ         MAKE DECIMAL AND DISPLAY IN TIME SLOT
452  0A10  4F               CLRA                TOP BYTE OF # CORRECT IS ZERO
453  0A11  D6 67            LDAB   CORR         GET # CORRECT ANSWERS
454  0A13  CE 0E 7C         LDX    #C100        CONSTANT 100
455  0A16  BD 0C CF         JSR    MULT         MULTIPLY #CORRECT*100
456  0A19  CE 00 5D         LDX    #PMAX-1      #PROBS GIVEN
457  0A1C  BD 0D 2B         JSR    DIV          DIVIDE TO GET % CORRECT
458  0A1F  D7 49            STAB   IN1+1        SAVE BINARY %(TOP BYTE SHOULD=0)
459  0A21  CE 00 03         LDX    #TOP         WHERE TO DISPLAY %
460  0A24  BD 0D E4         JSR    DADJ         MAKE DECIMAL AND DISPLAY
461  0A27  CE 00 0B         LDX    #SIDE        GET ADDR OF SIDE DISPLAY
462  0A2A  4F               CLRA
463  0A2B  D6 5E            LDAB   PMAX         DISPLAY # PROBLEMS DONE
464  0A2D  BD 0D E4         JSR    DADJ         CONVERT TO DECIMAL AND DISPLAY
465  0A30  96 31            LDAA   ELT          ELASPED TIME
466  0A32  D6 32            LDAB   ELT+1
467  0A34  CE 00 0F         LDX    #BOTTOM      WHERE TO DISPLAY TIME
468  0A37  BD 0D E4         JSR    DADJ         AND DISPLAY IT IN SECONDS
469  0A3A  96 38            LDAA   TPMAX
470  0A3C  97 5E            STAA   PMAX         RRESTORE PMAX TO ITS ORIGINAL VALUE
471  0A3E  96 39            LDAA   WPROB        DOING PREVIOUS P.S. # WRONG?
472  0A40  26 04            BNE    NONL         B/YES, NO NEW LIMIT
473  0A42  96 68            LDAA   WRON         GET # WRON
474  0A44  97 37            STAA   LMAX         SAVE AS TABLE LENGTH TO SEARCH
475  0A46  7F 00 39  NONL   CLR    WPROB        CLEAR WRONG PROBLEMS FLAG
476  0A49  7F 00 20         CLR    NWCH         CLEAR NEW CHAR FLAG
477  0A4C  D6 49            LDAB   IN1+1        GET BINARY % BACK
478  0A4E  7F 00 20         CLR    NWCH
479  0A51  C1 5A            CMPB   #90          IS HIS %=>90%
480  0A53  2D 2B            BLT    NOST         B/NO,DON'T FLASH %
481  0A55  86 04            LDAA   #4           FIVE DIGITS TO FLASH
```

TABLE III (CONT.)

```
482   0A57   CE 00 03            LDX     #TOP            WHERE TO FLASH
483   0A5A   BD 0C 01            JSR     FDIGITS         FLASH ONECE
484   0A5D   86 04               LDAA    #4              FIVE TO FLASH
485   0A5F   CE 00 03            LDX     #TOP            WHERE TO FLASH
486   0A62   BD 0C 01            JSR     FDIGITS         AND FLASH AGAIN
487   0A65   86 04               LDAA    #4              AND AGAIN
488   0A67   CE 00 03            LDX     #TOP
489   0A6A   BD 0C 01            JSR     FDIGITS         FLASH 3RD TIME
490   0A6D   7F 00 20            CLR     NWCH            CLEAR NEW CHAR FLAG
491   0A70   86 04      FPER     LDAA    #4              FLASH AGAIN
492   0A72   CE 00 03            LDX     #TOP
493   0A75   BD 0C 01            JSR     FDIGITS
494   0A78   7D 00 20            TST     NWCH            ANY NEW CHARS
495   0A7B   27 F3               BEQ     FPER            B/NO, KEEP FLASHING
496   0A7D   7E 09 35            JMP     BEGIN           YES, GO HANDLE THEM
497
498
499   0A80   BD 0C 6D   NOST     JSR     WAIT5           WAIT 5 SECONDS BEFORE CONTINUING
500   0A83   7F 00 20            CLR     NWCH            CLEAR CHAR FLAG
501   0A86   7D 00 20   WCHAR    TST     NWCH            ANY NEW CHARS?
502   0A89   27 FB               BEQ     WCHAR           WIAT FOR ONE
503   0A8B   7E 09 35            JMP     BEGIN           START OVER AGAIN
504
505   0A8E   0D 8B      FTABLE   FDB     ADDR
506   0A90   0D 94               FDB     SUBR
507   0A92   0D A9               FDB     MULTR
508   0A94   0D BF               FDB     DIVNR
509
510            ******************************
511            *
512            * CHKRET -- CHECK IF AN ENTER KEY HAS BEEN PUSHED
513            *
514            * RETURNS WITH CARRY=0 IF NOT; CARRY=1 IF IT HAS
515            *
516            ******************************
517            *
518   0A96   7D 00 20   CHKRET   TST     NWCH            SEE IF A CHAR HAS BEEN RECEIVED
519   0A99   27 0B               BEQ     NRET            B/NO LEAVE
520   0A9B   96 21               LDAA    CHAR            GET THE CHAR
521   0A9D   81 1C               CMPA    #ENTER          WAS IT AN ENTER?
522   0A9F   26 05               BNE     NRET            B/NO, LEAVE
523   0AA1   7F 00 20            CLR     NWCH            YES, CLEAR CHAR FLAG
524   0AA4   0D                  SEC                     SET CARRY=1
525   0AA5   39                  RTS                     GO HOME
526
527   0AA6   0C         NRET     CLC                     CLEAR CARRY
528   0AA7   39                  RTS                     RETURN
529
530            * ALLOWED TIME IS UP
531            * FOR TIMED TEST
532            * WHEN PROGRAM EXECUTES HERE
533
534            *
535   0AA8   CE 00 00   INTH     LDX     #0
536   0AAB   DF 3D               STX     STIME           CLEAR ALLOWED TIME
537   0AAD   7F 00 3A            CLR     INTR            CLR INTERRUPT FLAG
538   0AB0   8E 03 D2            LDS     #ENDRAM         GET RID OF ALL RETURN ADDR BEFORE THIS
539   0AB3   BD 0C 58            JSR     BLANK           CLEAR ALL DISPLAYS
540   0AB6   7E 09 F7            JMP     PSDONE
541            ******************************
542            *
543            * WPRAM -- GET WORKING PARAMETERS FOR PROBLEM SET
544            *
545            ******************************
546            *
547   0AB9   86 0F      WPRAM    LDAA    #$F             CLEAR THE DISPLAY WHICH IS USED IN ENTRIES
548   0ABB   97 03               STAA    TOP
549   0ABD   97 04               STAA    TOP+1
550   0ABF   97 05               STAA    TOP+2
551   0AC1   97 06               STAA    TOP+3
552   0AC3   7F 00 5F            CLR     PVAL
553   0AC6   7F 00 60            CLR     PVAL+1
554   0AC9   BD 0C A6            JSR     GETC            GET SOMETHING FROM KEYBOARD
555   0ACC   8B 80               ADDA    #NOVAL          FIRST CHAR MAY BE A NOVALUE OPERATOR
556   0ACE   CE 0B 3E            LDX     #ACTTABLE
557   0AD1   BD 0B DF            JSR     SERCH           GO SEE IF IT IS
558   0AD4   80 80               SUBA    #NOVAL
559   0AD6   8C FF FF            CPX     #$FFFF          DID IT EXSIST IN THE TABLE?
560   0AD9   27 04               BEQ     NOOPR           B/NO, IT NEEDS A VALUE WITH IT
561   0ADB   A7 00               STAA    0,X             SAVE THE CHARACTER IN THE PARAMETER SLOT
562   0ADD   20 DA               BRA     WPRAM           GET NEXT WORKING PARAMETER
563
564   0ADF   CE 00 06   NOOPR    LDX     #TOP+3          WHERE TO DISPLAY NUMBERS
565   0AE2   81 6F      WP1      CMPA    #CLEAR          WAS IT A 'CLEAR' KEY?
566   0AE4   27 D3               BEQ     WPRAM           B/YES, START THIS ONE OVER AGAIN
567   0AE6   81 1C               CMPA    #ENTER          IS IT AN 'ENTER' KEY?
568   0AE8   27 40               BEQ     WMAX            B/YES, MAKE THE ENTRY VALUE=9999
569   0AEA   81 30               CMPA    #'0             ENSURE WE HAVE A NUMBER NOW
570   0AEC   2D 1D               BLT     GPRAM           B/NO, MUST BE PARAMTER NAME
571   0AEE   81 39               CMPA    #'9
572   0AF0   2E 19               BGT     GPRAM           B/TOO LARGE, MUST BE PARAMTER NAME
573   0AF2   80 30               SUBA    #$30            MAKE ASCII NUMBER INTO DECIMAL NUMBER
574   0AF4   A7 00               STAA    0,X             SAVE IN DISPLAY TABLE SO HE SEES NUMBER
575   0AF6   BD 0B 6B            JSR     DECBIN          CONVERT DECIMAL TO BINARY
576   0AF9   09                  DEX                     NEXT PLACE TO PUT DIGIT HE TYPES IN
577   0AFA   8C 00 02            CPX     #TOP-1          HE AT MAX DIGITS TO ENTER?
578   0AFD   27 05               BEQ     GPC             B/YES, GET PARAMETER NAME, OR A CLEAR
579   0AFF   BD 0C A6            JSR     GETC            GET ANOTHER CHARACTER
580   0B02   20 DE               BRA     WP1
581   0B04   BD 0C A6   GPC      JSR     GETC            NOW GET WHICH PARAMETER THIS VALUE BELONGS TO
```

TABLE III (CONT.)

```
582  0B07  81 6F            CMPA   #CLEAR         IF CLEAR, START OVER AGAIN
583  0B09  27 AE            BEQ    WPRAM
584  0B0B  CF 0B 3E   GPRAM LDX    #ACTTABLE      TABLE TO SEARCH FOR CHARACTER IN
585  0B0E  BD 0B DF         JSR    SRCH           FIND CHARACTER, RETURN ADDR IN X OF WHERE PARM GOES
586  0B11  8C FF FF         CPX    #$FFFF         NOT FOUND?
587  0B14  27 A3            BEQ    WPRAM          B/NO, KEEP GETTING PARAMETERS
588  0B16  86 0F            LDAA   #$F            CLEAR DISPLAY VALUE
589  0B18  8C FF FE         CPX    #$FFFE         IS HE DONE ENTERING PARAMETERS?
590  0B1B  27 14            BEQ    DPRAM          B/YES, LEAVE
591  0B1D  BD 0B D6         JSR    SEED           GENERATE A SEED FOR RAMDOM # GEN.
592  0B20  96 5F            LDAA   PVAL           GET UPPER BYTE OF PARAMETER
593  0B22  D6 60            LDAB   PVAL+1         GET LOWER BYTE OF PARM
594  0B24  A7 00            STAA   0,X            SAVE VALUE ENTERED AT PARAMETER LOC
595  0B26  E7 01            STAB   1,X
596  0B28  20 8F            BRA    WPRAM          GET ANOTHER PARAMETER
597
598  0B2A  CE 27 0F   WMAX  LDX    #9999          GET MAXIMUM
599  0B2D  DF 5F            STX    PVAL           PUT IN ACCUMULATED VALUE
600  0B2F  86 09            LDAA   #9             PUT NINES INTO DISPLAY
601  0B31  97 03      DPRAM STAA   TOP
602  0B33  97 04            STAA   TOP+1
603  0B35  97 05            STAA   TOP+2
604  0B37  97 06            STAA   TOP+3
605  0B39  81 0F            CMPA   #$F            IS THIS CLEAR DISPLAY?
606  0B3B  26 C7            BNE    GPC            B/NO, CONTINUE ON
607  0B3D  39               RTS                   EXIT HOME
608
609  0B3E  54         ACTTAB FCB   KUBND1
610  0B3F  00 24            FDB    UBOUN1
611  0B41  64               FCB    KLBND1
612  0B42  00 28            FDB    LBOUN1
613  0B44  58               FCB    KUBND2
614  0B45  00 2A            FDB    UBOUN2
615  0B47  68               FCB    KLBND2
616  0B48  00 2E            FDB    LBOUN2
617  0B4A  52               FCB    KFACT1
618  0B4B  00 26            FDB    FACT1
619  0B4D  62               FCB    KFACT2
620  0B4E  00 2C            FDB    FACT2
621  0B50  44               FCB    KTIME
622  0B51  00 35            FDB    ALTIME
623  0B53  48               FCB    KNPROBS        NUMBER OF PROBLEMS TO GIVE KEY
624  0B54  00 5D            FDB    PMAX-1
625  0B56  41               FCB    KTST1          START TEST
626  0B57  FF FE            FDB    $FFFE
627  0B59  A1               FCB    KADD+NOVAL              THIS KEY NEEDS NO ASSOCIATED VALUE
628  0B5A  00 4E            FDB    OPR
629  0B5C  A2               FCB    KSUB+NOVAL
630  0B5D  00 4E            FDB    OPR
631  0B5F  A4               FCB    KDIV+NOVAL
632  0B60  00 4E            FDB    OPR
633  0B62  A8               FCB    KMULT+NOVAL
634  0B63  00 4E            FDB    OPR
635  0B65  D1               FCB    KWPROB+NOVAL
636  0B66  00 39            FDB    WPROB
637  0B68  FF               FCB    $FF
638  0B69  FF FF            FDB    $FFFF          END OF TABLE
639
640
641                 *********************
642                 *
643                 * DECBIN -- MAKE DECIMAL NUMBER INTO BINARY NUMBER
644                 *
645                 *********************
646                 *
647  0B6B  36         DECBIN PSHA                  SAVE CHAR
648  0B6C  37                PSHB                  SAVE B
649  0B6D  97 1D             STAA   SAVEA         SAVE THE NUMBER TO ADD TO ACCUMULATED VALUE
650  0B6F  D6 60             LDAB   PVAL+1        COPY PVAL TO SAVEX3
651  0B71  D7 1B             STAB   SAVEX3+1
652  0B73  D6 5F             LDAB   PVAL
653  0B75  D7 1A             STAB   SAVEX3
654  0B77  78 00 60          ASL    PVAL+1        MULT LOWER BYTE BY 2
655  0B7A  79 00 5F          ROL    PVAL          MULT UPPER BYTE BY 2 WITH CARRY FROM LOWER BYTE
656  0B7D  78 00 60          ASL    PVAL+1        MULT BY 4
657  0B80  79 00 5F          ROL    PVAL
658  0B83  78 00 60          ASL    PVAL+1        MULT BY 8
659  0B86  79 00 5F          ROL    PVAL
660  0B89  78 00 1B          ASL    SAVEX3+1      MULT BY 2
661  0B8C  79 00 1A          ROL    SAVEX3
662  0B8F  D6 1A             LDAB   SAVEX3        GET UPPER BYTE OF WORD
663  0B91  DB 5F             ADDB   PVAL          ADD BOTH UPPERS TO GET 10*UPPER BYTE
664  0B93  96 1B             LDAA   SAVEX3+1      NOW ADD LOWER BYTES
665  0B95  9B 60             ADDA   PVAL+1
666  0B97  24 01             BCC    DEC1
667  0B99  5C                INCB                 PROPAGATE CARRY TO UPPER BYTE
668  0B9A  9B 1D      DEC1   ADDA   SAVEA         ADD IN NEW NUMBER
669  0B9C  24 01             BCC    DEC2
670  0B9E  5C                INCB                 PROPAGATE CARRY
671  0B9F  97 60      DEC2   STAA   PVAL+1
672  0BA1  D7 5F             STAB   PVAL          AND SAVE BACK VALUE WITH ADDED DIGIT
673  0BA3  33                PULB                 RESTORE B
674  0BA4  32                PULA                 RESTORE CHAR
675  0BA5  39                RTS
676                 *****************************
677                 *
678                 * GBRMD -- GET BOUNDED RAMDOM NUMBER
679                 *
680                 *        WILL RETURN A,B WITH A NUMBER BETWEEN LBOUND & UBOUND
681                 *        IN MULTIPLES OF FACT
682                 *****************************
```

TABLE III (CONT.)

```
683
684   0BA6  DF 1A              *
685   0BA8  BD 0E 1C    GBRMD  STX   SAVEX3      SAVE ADDR OF BOUNDS
686   0BAB  A6 00              JSR   CREATE      GET RAMDOM NUMBER FROM 0 TO .99999
687   0BAD  E6 01              LDAA  0,X
688   0BAF  08                 LDAB  1,X         GET UPPER BOUND
689   0BB0  08                 INX
690   0BB1  BD 0D 2B            INX              MAKE X POINT TO FACT IN THE TABLE
691   0BB4  CB 01              JSR   DIV         AND DIVIDE UPPER LIMIT BY FACTOR TO GET NEW UPPER LIM
692   0BB6  89 00              ADDB  #1                INCREMENT THE LIMT
693   0BB8  CF 00 22           ADCA  #0
694   0BBB  BD 0C CF           LDX   #LASTA      GET ADDR OF RAMDOM #
695   0BBE  96 69              JSR   MULT        DO 32 BIT MULTIPLY, OF WHICH THE TOP 16 BITS WE USE
696   0BC0  D6 6A              LDAA  M32         GET TOP...
697   0BC2  DE 1A              LDAB  M32+1       ..16 BITS OF 32 BIT RESULT
698   0BC4  08                 LDX   SAVEX3      GET ADDR OF LIMITS
699   0BC5  08                 INX
700   0BC6  BD 0C CF           INX               POINT TO FACT IN TABLE
701   0BC9  DE 1A              JSR   MULT        GET THE RAMDOM NUMBER TIMES FACTOR
702   0BCB  A1 04              LDX   SAVEX3      GET BACK POINTER TO TABLE
703   0BCD  25 D7              CMPA  4,X         IS NUMBER GREATER THAN SMALLEST ALLOWABLE?
704   0BCF  22 04              BCS   GBRMD       B/NO GET ANOTHER
705   0BD1  E1 05              BHI   GBOK        B/NUMBER OK IF MS BYTE IS GREATER
706   0BD3  25 D1              CMPB  5,X
707   0BD5  39                 BCS   GBRMD       B/NO GET ANOTHER
708                     GBOK   RTS
709
710                    ***********************************
711                    *
712                    * SEED -- GET SEED TO START OFF RAMDOM NUMBER GENERATOR FROM RTC
713                    *
714                    ***********************************
715   0BD6  96 41      SEED   LDAA  TIMEU
716   0BD8  97 22             STAA  LASTA
717   0BDA  96 42             LDAA  TIMEL
718   0BDC  97 23             STAA  LASTB
719   0BDE  39                RTS
720
721
722                    ***********************************
723                    *
724                    * SERCH -- SEARCH FOR (A) IN TABLE SPECIFIED BY (X)
725                    *
726                    *           RETURN ADDRESS FOLLOWING LOCATION WITH (A) IN IT
727                    *
728                    ***********************************
729                    *
730   0BDF  A1 00      SERCH  CMPA  0,X         WE FIND (A) THERE
731   0BE1  27 10             BEQ   HIT         B/YES
732   0BE3  08                INX               POINT TO ADDRESS FOLLOWING VALUE
733   0BE4  DF 1A             STX   SAVEX3      SAVE POINTER INTO TABLE
734   0BE6  EE 00             LDX   0,X         GET ADDRESS OF VALUE ABOVE
735   0BE8  8C FF FF          CPX   #$FFFF      END OF TABLE?
736   0BEB  27 09             BEQ   SER1        B/YES
737   0BED  DE 1A             LDX   SAVEX3      RESTORE POINTER
738   0BEF  08                INX
739   0BF0  08                INX               POINT TO BEGINNING OF NEXT VALUE TO CHECK
740   0BF1  20 EC             BRA   SERCH       GO AGAIN
741
742   0BF3  08         HIT    INX               POINT TO ADDRESS
743   0BF4  EE 00             LDX   0,X         GET ADDR IN X
744   0BF6  39         SER1   RTS               GO HOME
745
746                    ***********************************
747                    *
748                    * WAITRET -- WAIT FOR STUDENT TO PUSH ENTER KEY BEFORE RETURNING
749                    *
750                    ***********************************
751                    *
752   0BF7  7F 00 21   WAITRET CLR  CHAR        CLEAR THE CHAR
753   0BFA  96 21      WR1    LDAA  CHAR        GET THE CHAR
754   0BFC  81 1C             CMPA  #ENTER      IS IT AN ENTER?
755   0BFE  26 FA             BNE   WR1         B/NO, KEEP WAITING FOR ONE
756   0C00  39                RTS               NOW GO HOME
757
758                    ***********************************
759                    *
760                    * FDIGITS -- FLASH THE NUMBER OF DIGITS SPECIFIED BY A STARTING AT *
761                    *
762                    *           FLASH ON. THEN OFF ONCE. RETURN
763                    *
764                    ***********************************
765                    *
766   0C01  97 1D      FDIGITS STAA  SAVEA
767   0C03  DF 18             STX   SAVEX2      SAVE ADDR TO OPERATE ON
768   0C05  E6 00      SVE1   LDAB  0,X         GET VALUE OF DIGIT IN DISPLAY TABLE
769   0C07  37                PSHB              SAVE ONTO STACK
770   0C08  08                INX               NEXT DIGIT IN TABLE
771   0C09  4A                DECA              DEC COUNT
772   0C0A  26 F9             BNE   SVE1
773   0C0C  96 1D             LDAA  SAVEA       RESTORE COUNT
774   0C0E  CE 00 61          LDX   #FDS        FLASHING DIGITS STORAGE TABLE
775   0C11  33         SVF2   PULB              GET DIGIT
776   0C12  E7 00             STAB  0,X         SAVE IN TEMP STORAGE
777   0C14  08                INX
778   0C15  4A                DECA
779   0C16  26 F9             BNE   SVE2
780   0C18  DE 18             LDX   SAVEX2
781   0C1A  96 1D             LDAA  SAVEA
782   0C1C  C6 0F             LDAB  #$F         GET A BLANK COMMAND FOR DIGIT
```

TABLE III (CONT.)

```
785  0C1E  E7 00      CLDISP  STAB   0,X           SAVE INTO DISPLAY TABLE
784  0C20  08                 INX
785  0C21  4A                 DECA
786  0C22  26 FA              BNE    CLDISP
787  0C24  CE 01 F4            LDX    #P5           TIME CONSTANT TO WAIT POINT 5 SECONDS
788  0C27  BD 0C 74            JSR    WAIT          WAIT .5 SECONDS
789  0C2A  96 1D               LDAA   SAVEA         RESTORE COUNT
790  0C2C  CE 00 61            LDX    #FDS          TABLE WHERE VALUES ARE TEMPORARLY SAVED
791  0C2F  E6 00      SVE3    LDAB   0,X
792  0C31  37                 PSHB
793  0C32  08                 INX
794  0C33  4A                 DECA
795  0C34  26 F9              BNE    SVE3          PUT VALUES ONTO STACK
796  0C36  DE 18              LDX    SAVEX2
797  0C38  96 1D              LDAA   SAVEA         COUNT
798  0C3A  33         SVE4    PULB
799  0C3B  E7 00              STAB   0,X           SAVE BACK INTO DISPLAY TABLE
800  0C3D  08                 INX
801  0C3E  4A                 DECA
802  0C3F  26 F9              BNE    SVE4
803  0C41  CE 01 F4           LDX    #P5           WAIT POINT 5 SECONDS
804  0C44  BD 0C 74           JSR    WAIT
805  0C47  39                 RTS
806
807          ***************************************
808          *
809          * LDIXX -- LOAD INDEXED INTO X:  X <--- (X+A)
810          *
811          ***************************************
812          *
813  0C48  DF 57      LDIXX   STX    DISP          SAVE X SOMEPLACE
814  0C4A  9B 58              ADDA   DISP+1        ADD A TO LOWER BYTE
815  0C4C  97 58              STAA   DISP+1        PUT BACK
816  0C4E  24 03              BCC    LDI1          PROPOGATE CARRY
817  0C50  7C 00 57           INC    DISP
818  0C53  DE 57      LDI1    LDX    DISP          GET X+A INTO X
819  0C55  EE 00              LDX    0,X           GET (X+A) INTO X
820  0C57  39                 RTS                  RET HOM
821
822          ***************************************
823          *
824          *       BLANK BOARD -- CAUSES ALL DISPLAYS TO GO DARK
825          *
826          ***************************************
827          *
828  0C58  86 0F      BLANK   LDAA   #$0F          *GET CODE TO BLANK DIGIT
829  0C5A  C6 14              LDAB   #DIGITS       *NUMBER OF TIMES TO DO
830  0C5C  CE 00 00           LDX    #MUXTBL       *ADDRESS OF DISPLAY TABLE
831  0C5F  A7 00      B1      STAA   0,X           *AND PUT CODE INTO TABLE
832  0C61  08                 INX                  *NEXT ADDR IN TABLE
833  0C62  5A                 DECB                 *DEC COUNT
834  0C63  26 FA              BNE    B1            *KEEP GOING
835  0C65  39                 RTS                  *RETURN HOME
836
837          ***************************************
838          ***************************************
839          *
840          *       WAIT1 -- WAIT 1 SECONDS BEFORE RETURNING
841          *
842          ***************************************
843          *
844  0C66  CE 03 E8   WAIT1   LDX    #1000         TIME CONSTANT FOR 1 SECONDS
845  0C69  BD 0C 74           JSR    WAIT          DO THE WAIT
846  0C6C  39                 RTS                  BACK HOME AGAIN
847
848          ***************************************
849
850          ***************************************
851          *
852          *  WAIT5 --- WAIT 5 SECONDS BEFORE CONTINUING
853          *
854          ***************************************
855          *
856  0C6D  CE 13 88   WAIT5   LDX    #5000         5 SECONDS
857  0C70  BD 0C 74           JSR    WAIT
858  0C73  39                 RTS
859          ***************************************
860
861          ***************************************
862          *
863          *       WAIT --- WAIT UNTIL RTC COUNT IN TIMEL & TIMEU = (X)
864          *
865          ***************************************
866
867  0C74  7F 00 42   WAIT    CLR    TIMEL
868  0C77  7F 00 41           CLR    TIMEU
869  0C7A  9C 41      WT1     CPX    TIMEU
870  0C7C  26 FC              BNE    WT1
871  0C7E  39                 RTS
872
873          ***************************************
874          ***************************************
875
876          *       SHOW TIME -- DISPLAY THE ELASPED TIME
877          *
878          ***************************************
879          *
880  0C7F  DE 3D      SHTIME  LDX    STIME         GET TIME LEFT IN THIS PROB SET
881  0C81  DF 3B              STX    STOPT         SAVE IN STOPPED TIME REGISTER
```

TABLE III (CONT.)

```
882  0C83  86 00           LDAA   #0              STOP THE CLOCK NOW
883  0C85  97 3D           STAA   STIME
884  0C87  97 3E           STAA   STIME+1
885  0C89  96 41           LDAA   TIMEU
886  0C8B  D6 42           LDAB   TIMEL
887  0C8D  CE 0E 7C        LDX    #C100                *GET CONSTANT 100
888  0C90  BD 0D 2B        JSR    DIV                  *DO A DIVIDE BY 100
889  0C93  36              PSHA          SAVE A
890  0C94  37              PSHB          SAVE B
891  0C95  DB 40           ADDB   AVTIME+1      ADD IN AVERAGE TIME SO FAR
892  0C97  99 3F           ADCA   AVTIME
893  0C99  97 3F           STAA   AVTIME
894  0C9B  D7 40           STAB   AVTIME+1      SAVE NEW TIME BACK
895  0C9D  33              PULB          RESTORE B
896  0C9E  32              PULA          AND A TOO
897  0C9F  CE 00 00        LDX    #DTIME               *PUT INTO MUXTABLE UNDER TIME DISPLAY
898  0CA2  BD 0D E4        JSR    DADJ                 *MAKE INTO 3 DIGIT DECIMAL NUMBER
899  0CA5  39              RTS                         *EXIT HOME
900
901          **********************************************
902          **********************************************
903          *
904          *     GET CHAR --- GET A CHARACTER FROM KEYBOARD INTO A REG
905          *
906          **********************************************
907          *
908  0CA6  7D 00 3A  GETC  TST    INTR          DID OUR TIME RUN OUT?
909  0CA9  26 0B           BNE    INTH1         B/YES GO HANDLE IT
910  0CAB  7D 00 20        TST    NWCH          IS THERE A NEW CHARACTER WAITING?
911  0CAE  27 F6           BEQ    GETC                 *B/NO, WAIT FOR ONE
912  0CB0  7F 00 20        CLR    NWCH                 *CLEAR FLAG
913  0CB3  96 21           LDAA   CHAR                 *GET CHAR
914  0CB5  39              RTS                         *EXIT
915  0CB6  7E 0A A8  INTH1 JMP    INTH
916
917          **********************************************
918
919
920          *****************
921          *
922          * GETD -- GET DECIMAL VALUE FROM KEYBOARD IN REG A
923          *
924          *****************
925          *
926  0CB9  BD 0C A6  GETD  JSR    GETC
927  0CBC  81 1C           CMPA   #ENTER
928  0CBE  27 0E           BEQ    RGETD                B/YES, RETURN RIGHT AWAY
929  0CC0  81 6F           CMPA   #CLEAR
930  0CC2  27 0A           BEQ    RGETD                B/YES, RETURN RIGHT AWAY
931  0CC4  81 30           CMPA   #'0           IF NOT ENTER OR CLEAR, CHECK IF DIGIT
932  0CC6  2D F1           BLT    GETD          B/NOT A DIGIT, WAIT FOR ONE
933  0CC8  81 39           CMPA   #'9           CHECK UPPER LIMITS
934  0CCA  2E ED           BGT    GETD
935  0CCC  80 30           SUBA   #$30          SUBTRACT ASCII BASE
936  0CCE  39        RGETD RTS                  BACK HOME
937
938          **********************************************
939          **********************************************
940          *
941          *     MULTIPLY -- A,B TIMES (X),(X+1). LOWER 16 BITS OF RESULT IN A,B
942          *                                     TOP 16 BITS RESULT IN M32,M32+1
943          *
944          **********************************************
945          *
946  0CCF  7F 00 69  MULT  CLR    M32
947  0CD2  7F 00 6A        CLR    M32+1         CLEAR TOP 16 BITS OF 32 BIT RESULT
948  0CD5  37              PSHB
949  0CD6  36              PSHA
950  0CD7  A6 01           LDAA   1,X
951  0CD9  36              PSHA
952  0CDA  A6 00           LDAA   0,X
953  0CDC  36              PSHA
954  0CDD  86 10           LDAA   #16
955  0CDF  36              PSHA
956  0CE0  30              TSX
957  0CE1  A6 03           LDAA   3,X
958  0CE3  97 69           STAA   M32
959  0CE5  D7 6A           STAB   M32+1
960  0CE7  4F              CLRA
961  0CE8  5F              CLRB
962  0CE9  58        M1    ASLB
963  0CEA  49              ROLA
964  0CEB  79 00 6A        ROL    M32+1
965  0CEE  79 00 69        ROL    M32
966  0CF1  68 02           ASL    2,X
967  0CF3  69 01           ROL    1,X
968  0CF5  24 13           BCC    M2
969  0CF7  EB 04           ADDB   4,X
970  0CF9  A9 03           ADCA   3,X
971  0CFB  24 0D           BCC    M2            NO PROPOGATE CARRY TO TOP 16 BITS
972  0CFD  36              PSHA          SAVE A
973  0CFE  96 6A           LDAA   M32+1
974  0D00  8B 01           ADDA   #1
975  0D02  97 6A           STAA   M32+1
976  0D04  24 03           BCC    M3
977  0D06  7C 00 69        INC    M32
978  0D09  32        M3    PULA          RESTORE A
979  0D0A  6A 00     M2    DEC    0,X
980  0D0C  26 DB           BNE    M1
981  0D0E  31              INS
```

TABLE III (CONT.)

```
982   0D0F  31                  INS
983   0D10  31                  INS
984   0D11  31                  INS
985   0D12  31                  INS
986   0D13  7D 00 6A            TST    M32+1        MAKE SURE RESULT FITS IN 4 DIGITS FOR PROBLEM SET
987   0D16  26 11               BNE    NOMULT       B/CAN'T USE IN PROBLEM SET
988   0D18  7D 00 69            TST    M32
989   0D1B  26 0C               BNE    NOMULT
990   0D1D  81 27               CMPA   #$27
991   0D1F  2E 08               BGT    NOMULT
992   0D21  2D 04               BLT    OKMULT
993   0D23  C1 0F               CMPB   #$F
994   0D25  2E 02               BGT    NOMULT
995   0D27  0D          OKMULT  SEC
996   0D28  39                  RTS
997
998   0D29  0C          NOMULT  CLC
999   0D2A  39                  RTS
1000
1001                    *       0,X - COUNT
1002                    *       1,X - MS BYTE OF MULTIPLICAND
1003                    *       2,X - LS BYTE OF
1004                    *       3,X - MS BYTE OF MULTIPLYER
1005                    *       4,X - LS BYTE OF
1006                    *       5,X - MS BYTE OF RETURN ADDR
1007                    *       6,X - LS BYTE OF RETURN ADDR
1008
1009                    ************************************************
1010                    ************************************************
1011                    *
1012                    *       DIVIDE -- A,B DIVIDED BY (X),(X+1)--->A,B
1013                    *
1014                    ************************************************
1015                    *
1016   0D2B  37         DIV     PSHB
1017   0D2C  36                 PSHA
1018   0D2D  A6 00              LDAA   0,X
1019   0D2F  E6 01              LDAB   1,X
1020   0D31  81 00              CMPA   #0           CHECK TO SEE IF DIV BY ZERO
1021   0D33  26 0A              BNE    NZ1          B/NO
1022   0D35  C1 00              CMPB   #0
1023   0D37  26 06              BNE    NZ1          B/NO
1024   0D39  32                 PULA                RESTORE REGS
1025   0D3A  33                 PULB
1026   0D3B  4F                 CLRA
1027   0D3C  5F                 CLRB                RETURN A ZERO AT ANY RATE
1028   0D3D  20 4A              BRA    NODIV        NO DIV BY ZERO, FOLKS.
1029
1030   0D3F  37         NZ1     PSHB
1031   0D40  36                 PSHA
1032   0D41  34                 DES
1033   0D42  30                 TSX
1034   0D43  86 01              LDAA   #1
1035   0D45  6D 01              TST    1,X
1036   0D47  2B 0B              BMI    D2
1037   0D49  4C         D1      INCA
1038   0D4A  68 02              ASL    2,X
1039   0D4C  69 01              ROL    1,X
1040   0D4E  2B 04              BMI    D2
1041   0D50  81 11              CMPA   #17
1042   0D52  26 F5              BNE    D1
1043   0D54  A7 00      D2      STAA   0,X          *AND SAVE COUNT
1044   0D56  A6 03              LDAA   3,X
1045   0D58  E6 04              LDAB   4,X
1046   0D5A  6F 03              CLR    3,X
1047   0D5C  6F 04              CLR    4,X
1048
1049   0D5E  E0 02      D3      SUBB   2,X
1050   0D60  A2 01              SBCA   1,X
1051   0D62  24 07              BCC    D4
1052   0D64  EB 02              ADDB   2,X
1053   0D66  A9 01              ADCA   1,X
1054   0D68  0C                 CLC
1055   0D69  20 01              BRA    D5
1056
1057   0D6B  0D         D4      SEC
1058   0D6C  69 04      D5      ROL    4,X
1059   0D6E  69 03              ROL    3,X
1060   0D70  64 01              LSR    1,X
1061   0D72  66 02              ROR    2,X
1062   0D74  6A 00              DEC    0,X
1063   0D76  26 E6              BNE    D3
1064   0D78  31                 INS
1065   0D79  31                 INS
1066   0D7A  31                 INS
1067   0D7B  97 55              STAA   REM          SAVE MS BYTE OF REMAINDER
1068   0D7D  D7 56              STAB   REM+1        SAVE LS BYTE OF REMAINDER
1069   0D7F  32                 PULA
1070   0D80  33                 PULB
1071   0D81  4D                 TSTA                CHECK TO BE SURE NON-ZERO ANSWER
1072   0D82  26 03              BNE    DODIV        IF NOT ZERO, THEN VALID RELATION
1073   0D84  5D                 TSTB
1074   0D85  27 02              BEQ    NODIV
1075   0D87  0D         DODIV   SEC                 SUCCESSFUL DIVIDE, PUT IN PROB SET
1076   0D88  39                 RTS
1077
1078   0D89  0C         NODIV   CLC                 BAD RELATION, DON'T PUT IN PROB SET
1079   0D8A  39                 RTS
1080
```

TABLE III (CONT.)

```
1081
1082                    ****************************************************
1083                    *
1083                    *       ADDR -- ADD IN1 PLUS IN2 RESULT IN A,B
1084                    *
1085                    ****************************************************
1086                    ;
1087   0D8B  BD 0D B7   ADDR    JSR     GPAIR           GET PARMS
1088   0D8E  EB 01              ADDB    1,X                    *ADD LOWER BYTES
1089   0D90  A9 00              ADCA    0,X                    *ADD UPPER BYTES
1090   0D92  0D                 SEC                     LET BE PUT IN PROBLEM SET
1091   0D93  39                 RTS                            *RETURN
1092                    ****************************************************
1093
1094
1095                    ****************************************************;
1096                    *
1097                    *       SUBR -- SUBTRACT IN2 FROM IN1 RESULT IN A,B
1098                    *
1099                    ****************************************************
1100                    *
1101   0D94  BD 0D B7   SUBR    JSR     GPAIR
1102   0D97  A1 00              CMPA    0,X             MAKE SURE A,B > X,X+1
1103   0D99  25 0C              BCS     NOSUB
1104   0D9B  22 04              BHI     DOSUB           IF GREATER, THEN DO SUBTRACT
1105   0D9D  E1 01              CMPB    1,X
1106   0D9F  25 06              BCS     NOSUB
1107   0DA1  E0 01      DOSUB   SUBB    1,X                    *SUB LOWER BYTES
1108   0DA3  A2 00              SBCA    0,X                    *AND UPPER BYTES
1109   0DA5  0D                 SEC                     LET THIS GO INTO PROB SET
1110   0DA6  39                 RTS                            *EXIT HOME
1111
1112   0DA7  0C         NOSUB   CLC                     DON'T PUT IN PROB SET
1113   0DA8  39                 RTS
1114                    ****************************************************
1115
1116                    ****************************************************
1117                    *
1118                    * MULTR -- MULTIPLY IN1 TIMES IN2 RESULT IN A,B
1119                    *
1120                    ****************************************************
1121                    *
1122   0DA9  BD 0D B7   MULTR   JSR     GPAIR           GET PARAMETERS
1123   0DAC  BD 0C CF           JSR     MULT
1124   0DAF  39                 RTS
1125
1126                    ****************************************************
1127
1128
1129                    ****************************************************
1130                    *
1131                    * DIVR -- DIVIDE IN1 BY IN2 RESULT IN A,B
1132                    *
1133                    ****************************************************
1134                    *
1135   0DB0  BD 0D B7   DIVR    JSR     GPAIR           GET VALAUES
1136   0DB3  BD 0D 2B           JSR     DIV
1137   0DB6  39                 RTS
1138
1139                    ****************************************************
1140
1141
1142
1143                    ********************
1144                    *
1145                    * GPAIR -- GET PARAMTERS IN A,B AND (X),(X+1)
1146                    *
1147                    ********************
1148                    *
1149   0DB7  96 48      GPAIR   LDAA    IN1
1150   0DB9  D6 49              LDAB    IN1+1
1151   0DBB  CE 00 4A           LDX     #IN2
1152   0DBE  39                 RTS
1153                    ****************************************************
1154
1155                    ****************************************************
1156                    *
1157                    *  DIVIDE WITH NO REMAINDER
1158                    *
1159                    ****************************************************
1160                    *
1161   0DBF  BD 0D B7   DIVNR   JSR     GPAIR           GET VALUES
1162   0DC2  BD 0D 2B           JSR     DIV             DO THE DIVIDE
1163   0DC5  24 1B              BCC     ILLQ            RETURN IF ILLEGIAL DIVIDE
1164   0DC7  CE 00 00           LDX     #0
1165   0DCA  9C 55              CPX     REM             IS REMAINDER ZERO?
1166   0DCC  26 02              BNE     NODNR           REMAIDER IS NON-ZERO,DON'T DO DIVIDE
1167   0DCE  0D                 SEC                     THIS DIVIDE PROB IS OK TO USE
1168   0DCF  39                 RTS
1169
1170   0DD0  CE 00 24   NODNR   LDX     #BOUND1         GET BOUND FOR DIVIDEND
1171   0DD3  BD 0B A6           JSR     GBRMD           GET ANOTHER RAMDOM NUMBER
1172   0DD6  DE 5B              LDX     PROBD           GET PROB DISP IN TABLE
1173   0DD8  A7 00              STAA    0,X             AND SAVE VALUE IN TABLE
1174   0DDA  E7 01              STAB    1,X             BOTH BYTES
1175   0DDC  97 48              STAA    IN1
1176   0DDE  D7 49              STAB    IN1+1           AND SAVE IN REG
1177   0DE0  20 DD              BRA     DIVNR           AND TRY AGAIN
1178   0DE2  0C         ILLQ    CLC                     CLEAR CARRY==ILLEGIAL DIVISION
1179   0DE3  39                 RTS
```

TABLE III (CONT.)

```
1281  0E71  08                       INX                             *NEXT DIVISOR
1282  0E72  8C 0E 82                 CPX      #KTABLE+10             *ARE WE DONE?
1283  0E75  26 C4                    BNE      DAA1                   *B/NO, KEEP GOING
1284  0E77  39            DAA6       RTS
1285
1286  0E78  27 10         KTABLE     FDB      10000
1287  0E7A  03 E8                    FDB      1000
1288  0E7C  00 64         C100       FDB      100
1289  0E7E  00 0A                    FDB      10
1290  0E80  00 01         CON1       FDB      1
1291             ***************************************************
1292             ***************************************************
1293             *
1294             *   COMPARE CORRECT ANSWER TO STUDENT'S ANSWER WHICH IS ON STACK
1295             *
1296             *   C=0 IF WRONG,  C=1 IF CORRECT
1297             *
1298             ***************************************************
1299             *
1300  0E82  DE 4C         CHKANS     LDX      ANS                    GET EXPECTED ANSWER
1301  0E84  9C 5F                    CPX      PVAL                   COMPARE TO ENTERED VALUE
1302  0E86  26 02                    BNE      WRONG                  B/WRONG ANSWER
1303  0E88  0D                       SEC                             SET CARRY ---> CORRECT ANSWER
1304  0E89  39                       RTS
1305
1306  0E8A  0C            WRONG      CLC                             CLEAR CARRY ---> WRONG ANSWER
1307  0E8B  39                       RTS
1308
1309             ***************************************************
1310             *
1311             *   GET ANSWER FROM KEYBOARD AND DISPLAY NUMBER IN PROPER ANSWER
1312             *   POSITION.
1313             *   RETURNS 5 BCD DIGITS IN TOP OF STACK* MS DIGIT ON TOP.
1314             *
1315             ***************************************************
1316             *
1317  0E8C  7F 00 5F      GETANS     CLR      PVAL                   CLEAR DECIMAL TO BINARY ACCUMULATORS
1318  0E8F  7F 00 60                 CLR      PVAL+1
1319  0E92  BD 0C B9      GA1        JSR      GETD                   *GET A CHAR FROM KEYBOARD
1320  0E95  DE 43                    LDX      ANSWER                 GET ADDRESS OF ANSWER
1321  0E97  81 09                    CMPA     #9                     *CHECK IF DIGIT
1322  0E99  2E F7                    BGT      GA1                    *MUST HAVE AT LEAST ONE ENTRY
1323  0E9B  BD 0B 6B                 JSR      DECBIN                 CONVERT DECIMAL # TO BINARY
1324  0E9E  C6 01                    LDAB     #1                     ONE CHAR RECEIVED SO FAR
1325  0EA0  A7 00         GT1        STAA     0,X                    *AND PUT CHAR INTO DISPLAY TABLE
1326  0EA2  BD 0C B9      GT1A       JSR      GETD                   *AND GET ANTOER CHAR
1327  0EA5  81 6F                    CMPA     #CLEAR                 *IS IT A 'CLEAR' BUTTON?
1328  0EA7  27 27                    BEQ      CLER                   *B/YES, CLEAR AND START ALL OVER
1329  0EA9  81 1C                    CMPA     #ENTER                 *IS IT AN 'ENTER' BUTTON?
1330  0EAB  27 36                    BEQ      ADONE                  *B/YES, HE'S DONE WITH ANSWER
1331  0EAD  37                       PSHB                            *SAVE COUNT
1332  0EAE  36                       PSHA                            *SAVE CHAR RECEIVED
1333  0EAF  BD 0B 6B                 JSR      DECBIN                 CONVERT CHAR TO BINARY
1334  0EB2  DF 14                    STX      SAVEX                  *SAVE POINTER TO ANSWER DISPLAY
1335  0EB4  A6 00         GT2        LDAA     0,X                    *GET TOP DIGIT
1336  0EB6  A7 01                    STAA     1,X                    *SHIFT DIGIT TO LEFT IN ANSWER DISPLAY
1337  0EB8  09                       DEX                             *POINT TO NEXT GROUP TO SHIFT UP
1338  0EB9  5A                       DECB                            *DEC COUNTER
1339  0EBA  26 F8                    BNE      GT2                    *SHIFT ANSWER UP TO MAKE ROOM FOR NEW DIGIT
1340  0EBC  32                       PULA                            *RESTORE NEW CHAR
1341  0EBD  33                       PULB                            *RESTORE CHAR COUNTER
1342  0EBE  5C                       INCB                            *IN CHAR COUNT
1343  0EBF  A7 01                    STAA     1,X                    DISPLAY NEW DIGIT
1344  0EC1  DE 14                    LDX      SAVEX                  *RESTORE POINTER TO ANSWER DISPLAY
1345  0EC3  8C 00 09                 CPX      #LAST4B-1              *IS THIS A 4 DIGIT ANSWER?
1346  0EC6  27 1C                    BEQ      AWAIT                  *B/YES, WAIT FOR AN ENTER
1347  0EC8  8C 00 12                 CPX      #LAST5-1               *IS THIS A 5 DIGIT ANSWER
1348  0ECB  27 17                    BEQ      AWAIT                  *B/YES, WAIT FOR AN ENTER
1349  0ECD  08                       INX                             *POINT TO NEXT TOP DIGIT OF ANSWER DISPLAY
1350  0ECE  20 D2                    BRA      GT1A                   *GET SOME MORE
1351
1352  0ED0  86 0F         CLER       LDAA     #$F                    *CLEAR DISPLAY COMMAND
1353  0ED2  DE 43                    LDX      ANSWER
1354  0ED4  A7 00         GT3        STAA     0,X                    *PUT INTO DISPLAY TABLE
1355  0ED6  8C 00 0A                 CPX      #LAST4B
1356  0ED9  27 B1                    BEQ      GETANS
1357  0EDB  8C 00 13                 CPX      #LAST5
1358  0EDE  27 AC                    BEQ      GETANS
1359  0EE0  08                       INX
1360  0EE1  20 F1                    BRA      GT3
1361
1362  0EE3  39            ADONE      RTS
1363
1364  0EE4  BD 0C B9      AWAIT      JSR      GETD                   *WAIT FOR AN ENTER
1365  0EE7  81 1C                    CMPA     #ENTER                 *IS IT AN 'ENTER'
1366  0EE9  27 F8                    BEQ      ADONE
1367  0EEB  81 6F                    CMPA     #CLEAR                 *IS IT A 'CLEAR'
1368  0EED  27 E1                    BEQ      CLER
1369  0EEF  20 F3                    BRA      AWAIT                  *WAIT FOR HIM TO STOP FOOLING AROUND
1370
1371             ***************************************************
1372             ***************************************************
1373             *
1374             *   INTERRUPT ROUTINE TO MULIPLEX THE OUTPUT DISPLAYS
1375             *
1376             ***************************************************
1377             *
1378  0EF1  96 47         DISPLAY    LDAA     MUXD                   *GET DIGIT DISPLACEMENT
1379  0EF3  4C                       INCA                            *NEXT DIGIT TO DISPLAY
1380  0EF4  81 14                    CMPA     #DIGITS                *ARE WE DONE WITH THIS PASS?
```

TABLE III (CONT.)

```
1180                         ************************************************
1181                         *
1182                         *   DECIMAL ADJUST -- MAKE A,B INTO 5 DIGIT BCD NUMBER AND
1183                         *                     PUT CORRECT NUMBER OF DIGITS INTO ADDRESS
1184                         *                     SPECIFIED BY X.
1185                         *
1186                         ************************************************
1187                         *
1188  0DE4  DF 18     DAIJ   STX    SAVEX2        *SAVE ADDRESS TO PUT DIGITS
1189  0DE6  CE 00 50         LDX    #DECS         *LOAD WORKING AREA
1190  0DE9  BD 0E 33         JSR    DA            *MAKE A,B INTO 5 DIGIT BCD STRING
1191  0DEC  CE 00 50         LDX    #DECS         *GET ADDR OF DIGITS, LS DIGIT FIRST
1192  0DEF  C6 05            LDAB   #5            *COUNT
1193  0DF1  A6 00     DA1    LDAA   0,X           *GET DIGIT
1194  0DF3  36               PSHA                 *SAVE DIGIT
1195  0DF4  08               INX
1196  0DF5  5A               DECB                 *DEC COUNT
1197  0DF6  26 F9            BNE    DA1           *PUSH ALL 5 ONTO STACK
1198  0DF8  DE 18            LDX    SAVEX2        *GET ADDRESS TO PUT DIGITS
1199  0DFA  32               PULA                 *GET A DIGIT
1200  0DFB  A7 00            STAA   0,X
1201  0DFD  08               INX
1202  0DFE  32               PULA
1203  0DFF  A7 00            STAA   0,X
1204  0E01  08               INX
1205  0E02  32               PULA
1206  0E03  A7 00            STAA   0,X
1207  0E05  8C 00 02         CPX    #LAST3        *WAS THIS A 3 DIGIT RESULT?
1208  0E08  27 0F            BEQ    QUIT3
1209  0E0A  08               INX
1210  0E0B  32               PULA
1211  0E0C  A7 00            STAA   0,X
1212  0E0E  8C 00 12         CPX    #LAST5-1      *ARE WE DOING 5 DIGITS?
1213  0E11  26 07            BNE    QUIT4
1214  0E13  08               INX
1215  0E14  32               PULA
1216  0E15  A7 00            STAA   0,X
1217  0E17  20 02            BRA    QUIT
1218
1219  0E19  31       QUIT3   INS
1220  0E1A  31       QUIT4   INS
1221  0E1B  39       QUIT    RTS                  *AND AWAY WE GO
1222
1223                         ************************************************
1224                         ************************************************
1225                         *
1226                         *   RAMDON NUMBER GENERATOR
1227                         *
1228                         *       RETURNS A,B WITH 16 BIT RAMDON NUMBER WHICH FITS
1229                         *       INSIDE FOUNDRIES SPECIFIED BY X BOUN X.
1230                         *
1231                         ************************************************
1232                         *
1233  0E1C  DF 1A     CREATE STX    SAVEX3        SAVE X, IT MAY BE IN USE
1234  0E1E  CE 00 22         LDX    #LASTA        LAST RAMDOM NUMBER
1235  0E21  86 02            LDAA   #2
1236  0E23  C6 29            LDAB   #41
1237  0E25  BD 0C CF         JSR    MULT          GET LAST RAMDOM NUMBER*553
1238  0E28  CB 05            ADDB   #5
1239  0E2A  89 11            ADCA   #17
1240  0E2C  97 22            STAA   LASTA
1241  0E2E  D7 23            STAB   LASTB
1242  0E30  DE 1A            LDX    SAVEX3        RESTORE X
1243  0E32  39               RTS
1244                         ************************************************
1245                         *
1246                         *   DECIMAL ADJUST A,B PUT INTO (X),(X+1),(X+2),(X+3),(X+4)
1247                         *   BLANK LEADING ZEROS.
1248                         *
1249                         ************************************************
1250                         *
1251  0E33  DF 14     DA     STX    SAVEX         *SAVE X* IT MIGHT BE IN USE
1252  0E35  7F 00 66         CLR    LZFLAG        CLEAR LEADING ZEROS FLAG
1253  0E38  CE 0E 78         LDX    #KTABLE       *GET CONSTANTS TABLE ADDR
1254  0E3B  7F 00 1D  DAA1   CLR    SAVEA         *CLEAR ACCUMALATOR
1255  0E3E  8C 0E 80         CPX    #CON1         LAST DIGIT?
1256  0E41  26 03            BNE    DAA2          B/NO,DON'T FORCE
1257  0E43  7C 00 66         INC    LZFLAG        MAKE A ZERO PRINT
1258  0E46  E0 01     DAA2   SUBB   1,X           *DO LOWER 8 BITS
1259  0E48  A2 00            SBCA   0,X           *DO UPPER 8 BITS
1260  0E4A  25 08            BCS    DAA5
1261  0E4C  7C 00 66         INC    LZFLAG        DON'T BLANK ZEROS NOW
1262  0E4F  7C 00 1D         INC    SAVEA         *DO ADD TO ACCUMALATOR
1263  0E52  20 F2            BRA    DAA2
1264                         *NOW WORK ON NEXT DIGIT
1265  0E54  EB 01     DAA5   ADDB   1,X           *PUT BACK CONSTANT WICH OVERFLOWED
1266  0E56  A9 00            ADCA   0,X
1267  0E58  36               PSHA                 *SAVE REG, WE NEED SPACE
1268  0E59  DF 16            STX    SAVEX1
1269  0E5B  DE 14            LDX    SAVEX         *GET ADDR WHERE TO PUT RESULT
1270  0E5D  96 1D            LDAA   SAVEA         *GET VALUE OF BCD DIGIT
1271  0E5F  26 07            BNE    DAA7          *IF ZERO, THEN MAKE BLANK CODE
1272  0E61  7D 00 66         TST    LZFLAG        DO WE BLANK ZEROS?
1273  0E64  26 02            BNE    DAA7          B/NO, WE HAVE A NUMBER PRECEADING THIS ZERO
1274  0E66  86 0F            LDAA   #$F           *SET BLANK CODE
1275  0E68  A7 00     DAA7   STAA   0,X           *SAVE DIGIT
1276  0E6A  32               PULA                 *RESTORE A
1277  0E6B  08               INX
1278  0E6C  DF 14            STX    SAVEX         SAVE ADDR FOR NEXT DIGIT
1279  0E6E  DE 16            LDX    SAVEX1        *GET DISP INTO CONST TABLE
1280  0E70  08               INX
```

TABLE III (CONT.)

```
1381  0EF6  2D 01              BLT   DS1
1382  0EF8  4F                 CLRA
1383  0EF9  97 47       DS1    STAA  MUXD        PUT BACK VALUE FOR NEXT TIME
1384  0EFB  7F 00 59           CLR   DISP1       *CLEAR UPPER BYTE
1385  0EFE  97 5A              STAA  DISP1+1     *PUT ADDR IN LOWER BYTE
1386  0F00  DE 59              LDX   DISP1       *LOAD X WITH ADDR
1387  0F02  F6 04 06           LDAB  KBD         *GET SECTION B PIA DATA
1388  0F05  C4 FE              ANDB  #$FE        *CLEAR THE LSB
1389  0F07  48                 ASLA              *SHIFT DISPLAY NUMBER TO MAKE..
1390  0F08  48                 ASLA
1391  0F09  48                 ASLA              *..ROOM FOR DISPLAY'S VALUE
1392  0F0A  48                 ASLA
1393  0F0B  24 01              BCC   DS2         *5TH BIT SET IF CARRY
1394  0F0D  5C                 INCB
1395  0F0E  F7 04 06    DS2    STAB  KBD         *REPLACE SECT. B WITH MODIFIED LSB
1396  0F11  AB 00              ADDA  0,X         *PICK UP DISPLAY'S VALUE FROM TABLE
1397  0F13  B7 04 04           STAA  MUXOUT      *SAVE TO PIA MUX LINES
1398  0F16  39                 RTS
1399                    *******************************************
1400                    *******************************************
1401                    *
1402                    *   TIME -- INTERRUPT ROUTINE TO KEEP TRACK OF ELASPED TIME
1403                    *
1404                    *******************************************
1405                    *
1406  0F17  96 42       TIME   LDAA  TIMEL
1407  0F19  8B 01              ADDA  #1
1408  0F1B  97 42              STAA  TIMEL
1409  0F1D  24 03              BCC   TIM1
1410  0F1F  7C 00 41           INC   TIMEU
1411  0F22  DE 33       TIM1   LDX   ELTMS       GET ELASPED TIME MILISECONDS COUNT
1412  0F24  08                 INX               INCREMENT
1413  0F25  DF 33              STX   ELTMS       SAVE BACK
1414  0F27  8C 03 E8           CPX   #1000       AT ONE SECOND YET?
1415  0F2A  26 0B              BNE   TIM2        B/NO
1416  0F2C  7F 00 33           CLR   ELTMS       CLEAR UPPER BYTE OF MILISECOND COUNT
1417  0F2F  7F 00 34           CLR   ELTMS+1     AND CLEAR LOWER BYTE
1418  0F32  DE 31              LDX   ELT         GET ELASPED TIME
1419  0F34  08                 INX               INCREMENT IT
1420  0F35  DF 31              STX   ELT         SAVE IT BACK
1421  0F37  DE 3D       TIM2   LDX   STIME       GET TIME WE ARE COUNTING DOWN TO ZERO
1422  0F39  27 14              BEQ   TIM3        B/ALREADY ZERO, DON'T INTERRUPT AGAIN
1423  0F3B  96 30              LDAA  TCOUNT      GET MS COUNTER
1424  0F3D  4C                 INCA
1425  0F3E  97 30              STAA  TCOUNT
1426  0F40  81 64              CMPA  #100        WE UP TO 100MS = .1SEC?
1427  0F42  2D 0B              BLT   TIM3        B/NO, KEEP WAITING
1428  0F44  7F 00 30           CLR   TCOUNT      YES, CLEAR MS COUNTER
1429  0F47  09                 DEX               DEC ALLOWED TIME
1430  0F48  DF 3D              STX   STIME       SAVE FOR NEXT TIME
1431  0F4A  26 D6              BNE   TIM1        B/NOT ZERO YET
1432  0F4C  7C 00 3A           INC   INTR        SET INTERRUPT FLAG
1433  0F4F  39          TIM3   RTS
1434
1435                    *******************************************
1436                    *******************************************
1437                    *
1438                    *   SCAN KEYBOARD INTERRUPT ROUTINE
1439                    *
1440                    *******************************************
1441                    *
1442
1443  0F50  B6 04 06    SCANK  LDAA  KBD         GET DATA FROM PIA
1444  0F53  44                 LSRA              ONLY 7BIT ASCII
1445  0F54  81 7F              CMPA  #$7F        IS THERE ANY BUTTONS PUSHED?
1446  0F56  26 04              BNE   KEY         B/YES, SEE IF WE ACKNOLLAGE
1447  0F58  7F 00 1F           CLR   SFLAG       KEY RELEASED FLAG
1448  0F5B  39                 RTS
1449
1450  0F5C  7D 00 1F    KEY    TST   SFLAG       DOES BUTTON HAVE TO BE RELEASED FIRST?
1451  0F5F  26 07              BNE   SC1         B/YES
1452  0F61  97 1F              STAA  SFLAG       ANY NON-ZERO # MEANS BUTTON MUST BE RELEASED BEFORE NEW CHAR
1453  0F63  7C 00 20           INC   NWCH        NEW CHAR FLAG
1454  0F66  97 21              STAA  CHAR        SAVE CHAR
1455  0F68  39          SC1    RTS               AND BACK HOME
1456
1457                    *******************************************
1458                    *******************************************
1459                    *
1460                    *   MAIN INTERRUPT HANDLER --- RTC INTERRUPTS HERE
1461                    *
1462                    *******************************************
1463                    *
1464  0F69  B6 04 04    CLOCK  LDAA  PIA                 CLEAR THE INTERRUPT
1465  0F6C  BD 0E F1           JSR   DISPLAY
1466  0F6F  BD 0F 17           JSR   TIME
1467  0F72  BD 0F 50           JSR   SCANK
1468  0F75  3B                 RTI                       *RETURN FROM INTERRUPT
1469
1470
1471                           END
```

I claim:

1. In an electric arithmetic teaching apparatus of the type having:
   a keyboard having numerical value keys for entering numerical parameters of arithmetic problems to be presented to a student and for entering proposed solutions to problems presented to the student;
   a display for indicating the numerical parameters of problems presented to the student and the proposed solution entered by the student; and
   a programmed computer for generating arithmetic problems for presentation, for processing proposed solutions, and for indicating by means of the display whether or not such proposed solutions are correct; the improvement comprising:
   means on said keyboard, including a key of no numerical value, for selecting a first mode of operation in which a selected number of problems are presented to the student for solution without a time limit;
   means on said keyboard, including a key of no numerical value, for selecting a second mode of operation in which problems are presented to the student for solution within a selected time limit; and
   means within said programmed computer responsive to said first mode selecting means and to said second mode selecting means for controlling problem presentation and processing in accordance with the selected mode of operation.

2. The improvement recited in claim 1, wherein said first mode selecting means comprises:
   a key on said keyboard which, when depressed in sequence with selected numerical value keys on said keyboard, establishes said number of problems for said first mode in conjunction with said computer responsive means; and wherein said second mode selecting means comprises:
   a key on said keyboard which, when depressed in sequence with selected numerical value keys on said keyboard, establishes said time limit for said second mode in conjunction with said computer responsive means.

3. The improvement recited in claim 2 further comprising:
   means on said keyboard for selecting separate ranges for said numerical parameters to be presented to a student, each such range being defined by an upper limit and a lower limit, each such limit being selectable by means of a key on said keyboard which, when depressed in sequence with selected numerical value keys on said keyboard, establishes said limit in conjunction with said computer responsive means.

4. The improvement recited in claim 3 further comprising:
   means on said keyboard for selecting numerical factors of which the respective numerical parameters of problems presented to a student are multiples;
   said selecting numerical factors means comprising a key on said keyboard which, when depressed in sequence with selected numerical value keys on said keyboard, establishes said factors in conjunction with said computer responsive means.

5. The improvement recited in claim 4 further comprising:
   means in said programmed computer and in said display for determining and displaying statistics related to a student's problem solution performance and comprising:
   means in said programmed computer and in said display for determining and displaying percentage of problems answered correctly;
   means in said programmed computer and in said display for determining and displaying average response time to answer a problem;
   means in said programmed computer and in said display for determining and displaying total number of problems presented; and
   means in said programmed computer and in said display for determining and displaying total elapsed time for doing a set of problems.

6. The improvement recited in claim 5 further comprising:
   means in said programmed computer and in said display for storing and re-presenting in a subsequent problem set arithmetic problems answered incorrectly during presentation of a previous problem set.

7. An electronic arithmetic teaching apparatus comprising:
   a keyboard having numerical value keys for entering numerical parameters of arithmetic problems to be presented to a student and for entering proposed solutions to problems presented to the student, said keyboard also having keys numerical value;
   a display for indicating the parameters and numerical values of problems presented to the student and the proposed solution entered by the student by means of said keyboard;
   a programmed computer connected to said keyboard and to said display for generating arithmetic problems for presentation for processing proposed solutions, and for indicating by means of said display whether or not such proposed solutions are correct; and
   means on said keyboard, including at least two of said keys without numerical value, for selecting either of two modes of operation said two modes comprising a first mode in which a selected number of problems are presented to the student for solution without a time limit and a second mode in which problems are presented to the student for solution within a selected time limit.

8. An electronic arithmetic teaching apparatus comprising:
   a keyboard having numerical value keys for entering numerical parameters of arithmetic problems to be presented to a student and for entering proposed solutions to problems presented to the student, said keyboard also having keys without numerical value;
   a display for indicating the parameters and numerical values of problems presented to the student and the proposed solution entered by the student by means of said keyboard;
   a programmed computer connected to said keyboard and to said display for generating arithmetic problems for presentation, for processing proposed solutions, and for indicating by means of said display whether or not such proposed solutions are correct; and
   means on said keyboard for selecting separate ranges for said numerical parameters to be presented to a student, each such range being defined by an upper limit and a lower limit, each such limit being selectable by means of a key on said keyboard which when depressed in sequence with selected numerical keys on said keyboard establishes said limit in conjunction with said programmed computer.

9. The apparatus recited in claim 8 further comprising:

means on said keyboard for selecting numerical factors of which the respective numerical parameters of problems presented to a student are multiples; and said numerical factors selecting means comprising a key on said keyboard which, when depressed in sequence with selected numerical value keys on said keyboard, establishes said factors in conjunction with said programmed computer.

* * * * *